(12) United States Patent
Kubota et al.

(10) Patent No.: US 9,916,908 B2
(45) Date of Patent: Mar. 13, 2018

(54) GAS SUPPLY APPARATUS AND AIR OR NITROGEN SUPPLY APPARATUS OF NUCLEAR PLANT

(71) Applicant: Hitachi-GE Nuclear Energy, Ltd., Hitachi-shi, Ibaraki (JP)

(72) Inventors: Ryo Kubota, Hitachi (JP); Kenji Onodera, Hitachi (JP); Yoshihisa Kiyotoki, Hitachi (JP)

(73) Assignee: Hitachi-GE Nuclear Energy, Ltd., Hitachi-shi (JP)

( * ) Notice: Subject to any disclaimer, the term of this patent is extended or adjusted under 35 U.S.C. 154(b) by 561 days.

(21) Appl. No.: 14/528,522

(22) Filed: Oct. 30, 2014

(65) Prior Publication Data

US 2015/0117585 A1    Apr. 30, 2015

(30) Foreign Application Priority Data

Oct. 30, 2013 (JP) ................................. 2013-225569
Dec. 17, 2013 (JP) ................................. 2013-259680

(51) Int. Cl.
*G21C 9/00* (2006.01)
*F15B 13/043* (2006.01)
(Continued)

(52) U.S. Cl.
CPC .............. *G21C 9/00* (2013.01); *F15B 13/043* (2013.01); *F16K 31/02* (2013.01); *G21C 9/004* (2013.01);
(Continued)

(58) Field of Classification Search
CPC . F16K 31/02; F16K 17/00; G21C 9/00; F15B 13/043; Y10T 137/87209
See application file for complete search history.

(56) References Cited

U.S. PATENT DOCUMENTS 5,390,724 A * 2/1995 Yamauchi et al. ... B22D 39/026
164/147.1
5,684,846 A * 11/1997 Meneely et al. ......... G21C 9/00
376/247
(Continued)

FOREIGN PATENT DOCUMENTS

EP    2 775 180 A2    9/2014
JP    5-80191 A    4/1993
(Continued)

OTHER PUBLICATIONS

Extended European Search Report dated May 27, 2015 (seven (7) pages).

*Primary Examiner* — Kevin Lee
(74) *Attorney, Agent, or Firm* — Crowell & Moring LLP

(57) ABSTRACT

A gas supply apparatus of the present invention includes a gas discharge line of a first electromagnetic valve having s a switching valve placed therein, and a second electromagnetic valve placed between the switching valve and a gas supply source. The switching valve switches between a gas discharge from the first electromagnetic valve and a gas supply to the first electromagnetic valve. At the time of a normal operation, the second electromagnetic valve opens a gas discharge line side and closes a switching valve side, and when the power source is lost, the second electromagnetic valve opens the switching valve side and closes the gas discharge line side. In this way, even when the power source is lost, an operating valve can not only be operated remotely but also be operated safely by a remote operator.

8 Claims, 39 Drawing Sheets

(51) Int. Cl.
*F16K 31/02* (2006.01)
*G21C 9/004* (2006.01)
*G21D 1/02* (2006.01)
*G21D 3/06* (2006.01)

(52) U.S. Cl.
CPC ............... *G21D 1/02* (2013.01); *G21D 3/06* (2013.01); *Y02E 30/40* (2013.01); *Y10T 137/87209* (2015.04)

(56) References Cited

U.S. PATENT DOCUMENTS

| | | | |
|---|---|---|---|
| 2009/0016904 A1* | 1/2009 | Mannen et al. | ........ F04B 37/12 417/279 |
| 2011/0249784 A1 | 10/2011 | Yamazaki et al. | |
| 2013/0214588 A1* | 8/2013 | Kiel et al. | ............ B60T 13/683 303/6.01 |

FOREIGN PATENT DOCUMENTS

| JP | 2012-230058 A | 11/2012 |
|---|---|---|
| JP | 2013-104867 A | 5/2013 |
| JP | 2013-140079 A | 7/2013 |

\* cited by examiner

GAS SUPPLY APPARATUS AND AIR OR NITROGEN SUPPLY APPARATUS OF NUCLEAR PLANT

CLAIM OF PRIORITY

The present application claims priority from Japanese Patent application serial Nos. 2013-225569, filed on Oct. 30, 2013, and 2013-259680, filed on Dec. 17, 2013, the content of which are hereby incorporated by reference into this application.

BACKGROUND OF THE INVENTION (Field of the Invention)

The present invention relates to a gas supply apparatus and an air or nitrogen supply apparatus of a nuclear plant. The present invention relates to a gas supply apparatus suitable for a part provided with an electromagnetic valve placed in the middle of a piping so as to switch between an operation of opening a valve and an operation of closing the valve, for example, an air-operated valve placed in the nuclear plant and an air or nitrogen supply apparatus of a nuclear plant.

(Description of Related Art)

Various kinds of plants including a nuclear power plant are installed with piping for letting gas such as air, nitrogen, or steam and liquid such as water flow. The piping is provided with electrically operated valves and air or nitrogen operated valves which are operated by electricity or compressed air or compressed nitrogen activated by an opening operation for letting fluid in the piping flow or a closing operation for stopping the flow or by an electric signal or an air pressure signal to thereby control flow and pressure.

In particular, as to the air or nitrogen operated valve placed in the nuclear plant, in order to switch between an operation of opening a valve and an operation of closing the valve, an electromagnetic valve is placed in the middle of an air or nitrogen piping system. For example, when a station blackout (SBO) is caused, the coil of the electromagnetic valve is non-excited and air or nitrogen from an air or nitrogen supply source is reduced in pressure to thereby perform a failsafe operation. However, after that, electricity cannot be supplied from a power source and the air or nitrogen cannot be supplied from the air or nitrogen supply source, so that the air or nitrogen operated valve cannot be operated, which is likely to produce a trouble in operating the air or nitrogen operated valve thereafter.

In this way, because the electricity cannot be supplied from the power source and the air or nitrogen cannot be supplied from the air or nitrogen supply source, there is a possibility that the air or nitrogen operated valve cannot be operated. Hence, it is required to provide an apparatus that can be safely operated remotely even at the time of an emergency (for example, when the SBO is caused) and that does not perform an incorrect operation (an unintended operation) at the time of a normal operation (when the power source is secured and a normal operation is performed or during a normal standby).

On the other hand, a technique that can safely process hydrogen to prevent hydrogen explosion and prevent a nuclear reactor building from being broken even in a case in which the SBO is caused and in which the hydrogen generated in a reactor pressure vessel leaks to the inside of the nuclear reactor building is described in Japanese Patent Application Laid-Open No. 2012-230058 (Patent Document 1).

SUMMARY OF THE INVENTION

A gas supply apparatus of the present invention is characterized by including: an operating valve that is placed in the middle of a piping for letting at least gas in a plant flow and that operates a valve main body by the gas flowing in the piping; a first electromagnetic valve that is placed in the middle of the piping and that opens or closes a flow of the gas to the operating valve; and a gas supply source that supplies the first electromagnetic valve with the gas, in which a gas discharge line of the first electromagnetic valve has a switching valve placed therein and has a second electromagnetic valve placed between the switching valve and the gas supply source, in which the switching valve switches between a gas discharge from the first electromagnetic valve and a gas supply to the first electromagnetic valve, in which when a power source is lost, the switching valve is switched to connection to the gas supply source so as to supply the first electromagnetic valve with the gas, in which at the time of a normal operation, the second electromagnetic valve opens a gas discharge line side and closes a switching valve side, and in which when the power source is lost, the second electromagnetic valve opens the switching valve side and closes the gas discharge line side.

Further, an air or nitrogen supply apparatus of a nuclear plant of the present invention is characterized by including: a main steam relief safety valve, which is placed in the middle of a piping branched from a main steam piping for supplying steam from a reactor pressure vessel contained in a reactor container to a turbine building and which is opened when pressure in a nuclear reactor is made not less than a specified value to thereby relieve main steam in the main steam piping, or an air or nitrogen operated valve for opening an opening/closing valve, which is placed in the middle of a piping placed in an emergency gas control system for discharging gas in the reactor container having the reactor pressure vessel contained therein from a gas discharge tower, when the pressure in the reactor container is made not less than a specified value to thereby discharge the gas in the reactor container from the emergency gas control system; a cylinder for opening the main steam relief safety valve, or a cylinder for supplying the opening/closing valve with a driving force so as to open the air or nitrogen operated valve; a first electromagnetic valve for opening/closing a flow of air or nitrogen to the cylinder; and an air or nitrogen supply source for supplying the first electromagnetic valve with the air or nitrogen, in which a gas discharge line of the first electromagnetic valve has a switching valve placed therein and has a second electromagnetic valve placed between the switching valve and the air or nitrogen supply source for supplying the air or nitrogen, in which the switching valve switches between a gas discharge from the first electromagnetic valve and a gas supply to the first electromagnetic valve, in which when a power source is lost, the switching valve is switched to connection to the air or nitrogen supply source so as to supply the first electromagnetic valve with the air or nitrogen, in which at the time of a normal operation, the second electromagnetic valve opens a gas discharge line side and closes a switching valve side, and in which when the power source is lost, the second electromagnetic valve opens the switching valve side and closes the gas discharge line side.

Still further, an air or nitrogen supply apparatus of a nuclear plant of the present invention is characterized by including: a pressurizer relief valve, which is placed in a pressurizer connected to a reactor pressure vessel by a piping and for holding pressure and water level of the reactor pressure vessel and forcibly reduces pressure of the pressurizer as required, or a main steam relief safety valve, which relieves steam in a steam generator connected to the reactor pressure vessel by a piping and for supplying the reactor pressure vessel with cooling water; a cylinder for supplying the pressurizer relief valve with air or nitrogen stored therein so as to open the pressurizer relief valve, or a cylinder for supplying the main steam relief safety valve with air or nitrogen stored therein so as to open the main steam relief safety valve; a first electromagnetic valve placed in the middle of the piping and for opening/closing a flow of air or nitrogen to the cylinder; and an air or nitrogen supply source for supplying the first electromagnetic valve with the air or nitrogen, in which a gas discharge line of the first electromagnetic valve has a switching valve placed therein and has a second electromagnetic valve placed between the switching valve and the air or nitrogen supply source for supplying the air or nitrogen, in which the switching valve switches between a gas discharge from the first electromagnetic valve and a gas supply to the first electromagnetic valve, in which when a power source is lost, the switching valve is switched to connection to the air or nitrogen supply source so as to supply the first electromagnetic valve with the air or nitrogen, in which at the time of a normal operation, the second electromagnetic valve opens a gas discharge line side and closes a switching valve side, and in which when the power source is lost, the second electromagnetic valve opens the switching valve side and closes the gas discharge line side.

Still further, a gas supply apparatus of the present invention is characterized by including: an operating valve that is placed in the middle of a piping for letting at least gas in a plant flow and that operates a valve main body by the gas flowing in the piping; a first electromagnetic valve that is placed in the middle of the piping and that opens or closes a flow of the gas to the operating valve; a first gas supply source and a second gas supply source that supply the first electromagnetic valve with the gas; a first switching valve that is placed in a gas discharge line of the first electromagnetic valve and that switches between a gas discharge from the first electromagnetic valve and a gas supply to the first electromagnetic valve and that is switched to connection to the second gas supply source so as to supply the first electromagnetic valve with the gas when a power supply is lost; and an isolation valve that is placed in the middle of a piping on a second gas supply source side of the first switching valve and that prevents a leak to a gas supply side of the first switching valve, in which the isolation valve is provided with a second electromagnetic valve, and in which when the first electromagnetic valve cannot be operated, the second electromagnetic valve is operated and opened by a second power source different from a power source at the time of a normal operation, thereby supplying the first switching valve with the gas from the second gas supply source.

Still further, an air or nitrogen supply apparatus of a nuclear plant of the present invention is characterized by including: a main steam relief safety valve, which is placed in the middle of a piping branched from a main steam piping for supplying steam from a reactor pressure vessel contained in a reactor container to a turbine building and which is opened when pressure in a nuclear reactor is made not less than a specified value to thereby relieve main steam in the main steam piping, or an air or nitrogen operated valve for opening an opening/closing valve, which is placed in the middle of a piping placed in an emergency gas control system for discharging gas in the reactor container having the reactor pressure vessel contained therein from a gas discharge tower, when the pressure in the reactor container is made not less than a specified value to thereby discharge the gas in the reactor container from the emergency gas control system; a cylinder for opening the main steam relief safety valve, or a cylinder for supplying the opening/closing valve with a driving force so as to open the air or nitrogen operated valve; a first electromagnetic valve for opening/closing a flow of air or nitrogen to the cylinder; a first air or nitrogen supply source and a second air or nitrogen supply source each of which supplies the first electromagnetic valve with air or nitrogen; a first switching valve that is placed in a gas discharge line of the first electromagnetic valve and that switches between a gas discharge from the first electromagnetic valve and a gas supply to the first electromagnetic valve and that is switched to connection to the second air or nitrogen supply source so as to supply the first electromagnetic valve with air or nitrogen when a power source is lost; and an isolation valve that is placed in the middle of a piping on a second air or nitrogen supply source side of the first switching valve and that prevents a leak to a gas supply side of the first switching valve, in which the isolation valve is provided with a second electromagnetic valve, and in which when the first electromagnetic valve cannot be operated, the second electromagnetic valve is operated and opened by a second power source different from a power source at the time of a normal operation to thereby supply the first switching valve with air or nitrogen from the second air or nitrogen supply source.

Still further, an air or nitrogen supply apparatus of a nuclear plant of the present invention is characterized by including: a pressurizer relief valve, which is placed in a pressurizer connected to a reactor pressure vessel by a piping and for holding pressure and water level of the reactor pressure vessel and forcibly reduces pressure of the pressurizer as required, or a main steam relief valve, which relieves steam in a steam generator connected to the reactor pressure vessel by a piping and for supplying the reactor pressure vessel with cooling water; a cylinder for supplying the pressurizer relief valve with air or nitrogen stored therein so as to open the pressurizer relief valve, or a cylinder for supplying the main steam relief valve with air or nitrogen stored therein so as to open the main steam relief valve; first electromagnetic valves, one of which is placed in the middle of the piping and opens/closes a flow of air or nitrogen to the cylinder for supplying the pressurizer relief valve with the air or nitrogen, the other of which is placed in the middle of the piping and opens/closes a flow of air or nitrogen to the cylinder for supplying the main steam relief valve with the air or nitrogen; a first air or nitrogen supply source and a second air or nitrogen supply source, each of which supplies each of the first electromagnetic valves with air or nitrogen; first switching valves, each of which is placed in a gas discharge line of each of the first electromagnetic valves and switches a gas discharge from each of the first electromagnetic valves and a gas supply to each of the first electromagnetic valves and is switched to connection to each of the second air or nitrogen supply sources so as to supply each of the first electromagnetic valves with air or nitrogen when a power source is lost; and isolation valves, each of which is placed in the middle of a piping on a second air or nitrogen supply source side of each of the first switching valves and prevents a leak to a gas supply side of each of the first switching valves, in which each of the isolation valves is provided with each of second electromagnetic valves, and in which when each of the first electromagnetic valves cannot be operated, each of the second electromagnetic valves is operated and opened by each of second power sources different from a power source at the time of a normal operation to thereby supply each of the first switching valves with air or nitrogen from each of the second air or nitrogen supply sources.

According to the present invention, it is possible to produce an effect of not only operating an operating valve such as an air-operated valve remotely even when a power source is lost but also operating the operating valve safely by a remote operator.

DETAILED DESCRIPTION OF THE PREFERRED EMBODIMENTS

Figure 1:
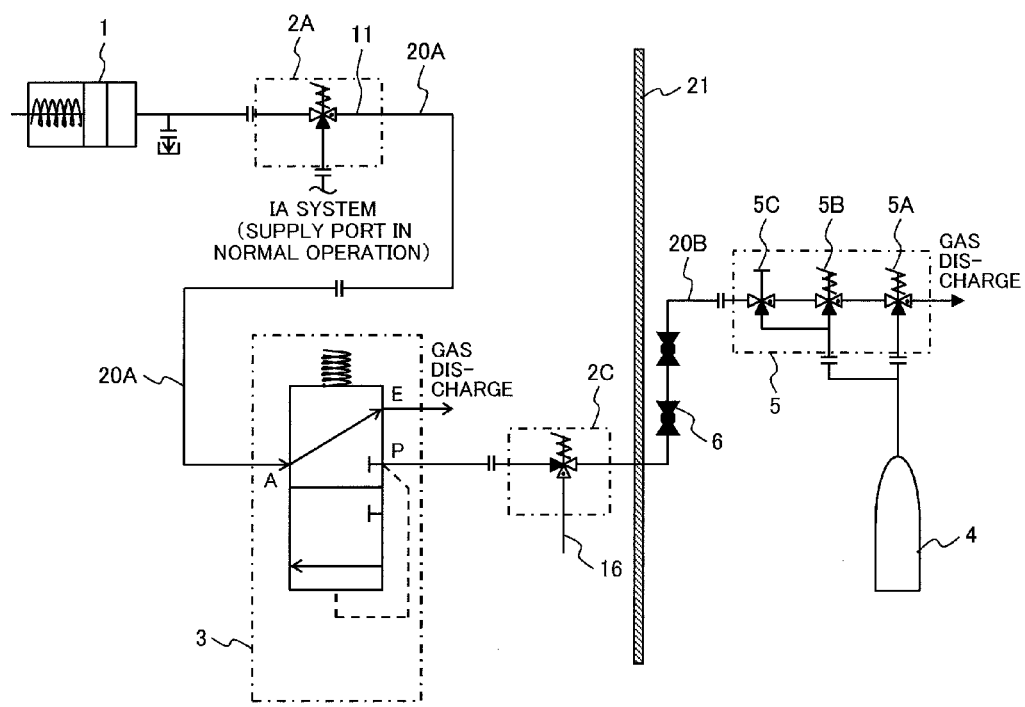
FIG. 1 is a diagram to show an embodiment 1 of a gas supply apparatus of the present invention and a state in which a switching valve is connected to a gas discharge side of a first electromagnetic valve.

Usually, it is possible to switch between an operation of opening an air or nitrogen operated valve and an operation of closing the valve by turning on or off the power source of an electromagnetic valve placed in the middle of an air or nitrogen piping system for supplying air or nitrogen which is the power of the valve. However, when the power source is lost, because of the loss of the power source and the loss of air or nitrogen source for power, the power source of the electromagnetic valve for opening or closing the air or nitrogen operated valve cannot be turned on or off and the air or nitrogen that becomes power cannot be supplied to the air or nitrogen operated valve, so that the air or nitrogen operated valve cannot be operated remotely from the outside.

However, in an accident event severer than a design basis accident, it is necessary to operate a necessary air or nitrogen operated valve remotely from the outside by a power source and an air or nitrogen source for power, which are different from a power source and an air or nitrogen source for power in a normal operation, without affecting the operating characteristics of the air or nitrogen operated valve.

In particular, in a nuclear power plant, in order that an air or nitrogen operated valve in a reactor container can be opened or closed at the time of an emergency such as the SBO, an electromagnetic valve for operation needs to be placed outside the reactor container and to be connected to a power source such as a battery, which is different from a power source in the normal operation. Further, it needs to be taken into account to eliminate an effect on an operating characteristic such as an operating time required of the air or nitrogen operated valve and to discharge air for operation to the outside of the reactor container. It is necessary to secure an operating source of an air or nitrogen supply apparatus that takes these factors into account and that can be used when the power source is lost.

However, in the patent document 1 described above is described a means for preventing the nuclear reactor building from being broken even when the SBO is caused and hydrogen generated in the reactor pressure vessel leaks into the nuclear reactor building, but it is never described how to secure an operating source of an air or nitrogen supply apparatus used when the power source is lost and how to prevent an unintended operation (incorrect operation) at the time of a normal operation.

The present invention has been made in view of the above points. An objective of the present invention is to provide a gas supply apparatus and an air or nitrogen supply apparatus of a nuclear plant that can remotely operate an operating valve such as an air operated valve when a power source is lost and that can be safely operated by a remote operator.

Hereinafter, a gas supply apparatus of the present invention and an air or nitrogen supply apparatus of a nuclear plant will be described on the basis of embodiments shown in the drawings. Here, in the respective drawings, a valve shown in black shows a valve in "a closed state" and a valve shown in white shows a valve in "an open state". Further, as to a reference character, same reference characters are used for same constituent parts and the description of the part described before will be omitted.

[Embodiment 1]

Figure 2:
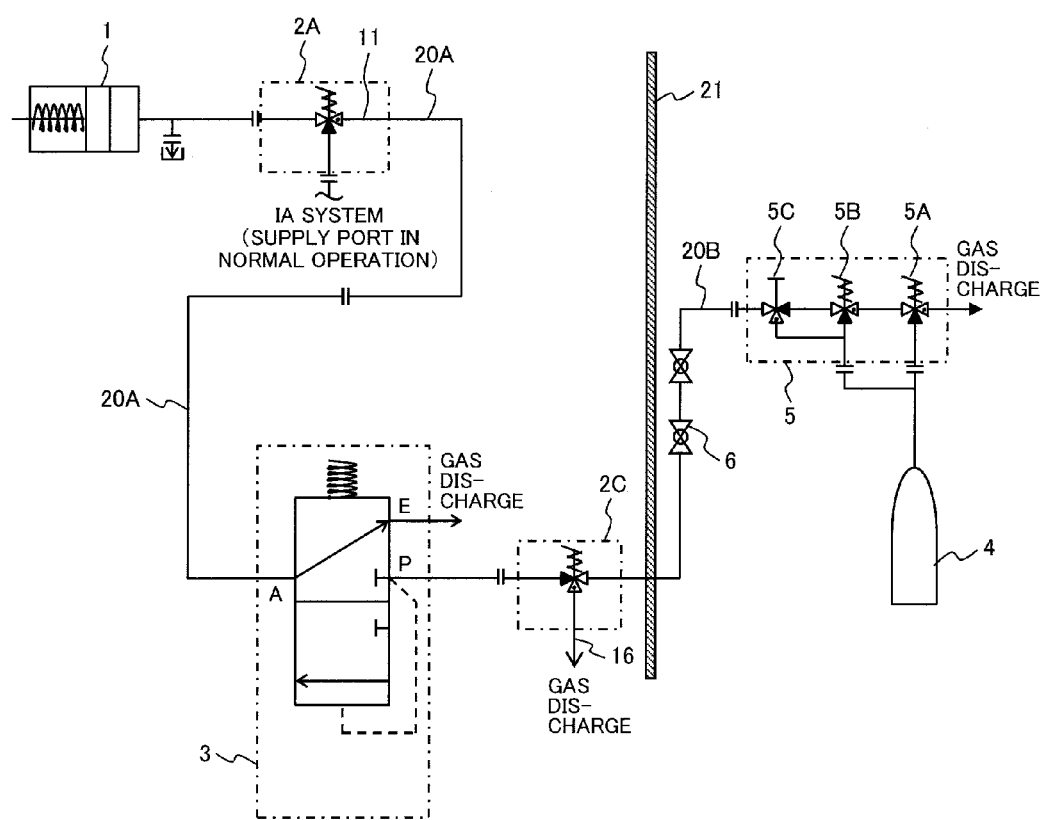
FIG. 2 is a diagram to show the embodiment 1 of the gas supply apparatus of the present invention and a state in which a gas passage of a second electromagnetic valve is switched to a gas discharge side.
Figure 3:
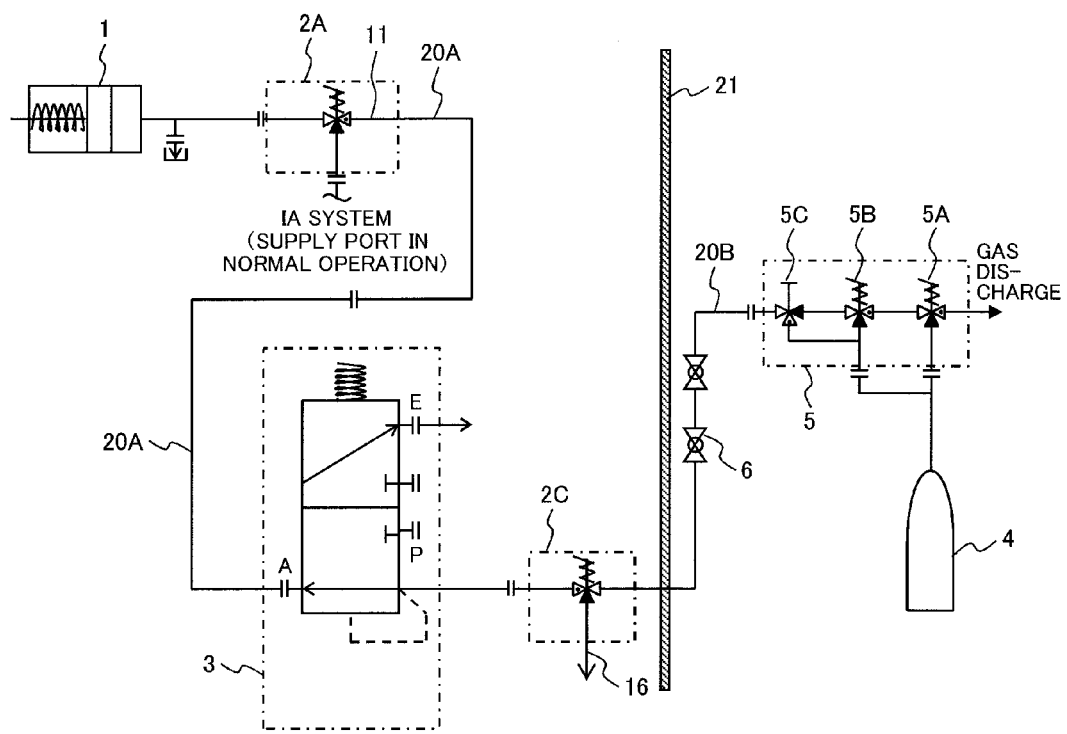
FIG. 3 is a diagram to show a state in which the switching valve is switched to a gas supply side of the first electromagnetic valve from the state shown in FIG. 1.

FIGS. 1 to 3 show an embodiment 1 of a gas supply apparatus of the present invention. The embodiment 1 has, for example, an air-operated valve actuator 1 for opening/closing a valve main body (not shown in the drawing) and the air-operated valve actuator 1 is operated by a first electromagnetic valve 2A placed in the middle of a piping 20A in a building 21. In other words, when a power source of the first electromagnetic valve 2A is turned on, the first electromagnetic valve 2A is supplied with air or nitrogen for control from an IA system of a supply port (instrument air supply system), whereby the air-operated valve actuator 1 is operated. After the operation of the air-operated valve actuator 1 is completed, when the power source of the first electromagnetic valve 2A is turned off, the air or nitrogen for control of the air-operated valve actuator 1 is discharged from a gas discharge port of the first electromagnetic valve 2A through a route of A→E of a switching valve 3 which will be described later, whereby the air-operated valve actuator 1 is returned to a state before the operation.

Further, in the present embodiment, a piping 20B placed between the switching valve 3 in the building 21 and a bomb 4, which is placed outside the building 21 and is an air or nitrogen supply source for supplying air or nitrogen, has a second electromagnetic valve 2C placed in the building 21. At the time of a normal operation, the second electromagnetic valve 2C opens a gas discharge line 16 side and closes a switching valve 3 side (see FIG. 2), whereas when the power source is lost, the second electromagnetic valve 2C opens the switching valve 3 side and closes the gas discharge line 16 side (see FIG. 3). The piping 20B, which is placed between the second electromagnetic valve 2C and the bomb 4 and outside the building 21, has a third electromagnetic valve 5 and an isolation valve 6 placed therein. The third electromagnetic valve 5 and the isolation valve 6 will be described later.

Even when the power source of the third electromagnetic valve 5 is turned on and the isolation valve 6 is opened, the second electromagnetic valve 2C, as shown in FIG. 2, is common to the first electromagnetic valve 2A in a power source system and hence a gas passage of the second electromagnetic valve 2C is on a gas discharge line 16 side, whereby the air or nitrogen from the bomb 4 placed outside the building 21 is discharged from the gas discharge line 16 of the second electromagnetic valve 2C, which hence does not have an effect on the operation of the air-operated valve actuator 1. In other words, it is possible to prevent the air or nitrogen for control from being supplied to the air-operated valve actuator 1 from the bomb 4 by an unintended operation at the time of the normal operation, for example, an incorrect operation such that the isolation valve 6 is operated by some cause.

On the other hand, in a state in which it is difficult to pass current through the first electromagnetic valve 2A or at the time of an emergency in which it is difficult to supply a supply port of the first electromagnetic valve 2A with the air or nitrogen for control from the IA system (instrument air supply system), the gas passage of the second electromagnetic valve 2C, which is common to the first electromagnetic valve 2A in the power source system, has a switching valve 3 side opened, thereby being connected to the switching valve 3, so that when the power source of the third electromagnetic valve 5 is turned on, the air or nitrogen for control can be supplied to the switching valve 3 through the second electromagnetic valve 2C via the third electromagnetic valve 5 from the bomb 4 of a gas supply source which is placed outside the housing 21 and in which air or nitrogen is stored.

In this way, the switching valve 3 has a gas passage of P ⇔ A formed therein (see FIG. 3) and hence a gas passage of the air or nitrogen for control from the bomb 4 to the air-operated valve actuator 1 through the third electromagnetic valve 5, the second electromagnetic valve 2C, the switching valve 3, and the first electromagnetic valve 2A is secured, whereby the air-operated valve actuator 1 is operated. After the operation of the air-operated valve actuator 1 is completed, when the power source of the third electromagnetic valve 5 is turned off, pressure between the third electromagnetic valve 5, the switching valve 3, the second electromagnetic valve 2C, the first electromagnetic valve 2A, and the air-operated valve actuator 1 is lowered, whereby the gas passage of the switching valve 3 is switched to A→E (see FIG. 1). Further, the air or nitrogen for control of the air-operated valve actuator 1 is discharged from the gas discharge port of the first electromagnetic valve 2A via the passage of A→E of the switching valve 3, whereby the air-operated valve actuator 1 is returned to a state before the operation.

In short, in the present embodiment, the first electromagnetic valve 2A has two systems of the IA system (instrument air supply system) and the bomb 4 as a gas supply source for supplying gas (air or nitrogen).

In the present embodiment, the air-operated valve actuator 1 is operated to thereby open/close the valve main body in this manner. In this regard, in FIG. 1 to FIG. 3, the switching valve 3 is expressed by imitating the expression of the JIS symbol of a pneumatic hydraulic circuit diagram.

As described above, in the present embodiment, the piping 20A placed between the first electromagnetic valve 2A and the bomb 4 and in the building 21 has the first switching valve 3 placed in the middle thereof, the first switching valve 3 switches between an air discharge from the first electromagnetic valve 2A and an air supply to the first electromagnetic valve 2A. When the power source is lost, the switching valve 3 is switched in such a way as to be connected to the bomb 4 in order to supply the first electromagnetic valve 2A with the air or nitrogen.

In other words, the switching valve 3 is placed in the middle of the piping 20A, which is placed on the gas discharge line 11 side of the first electromagnetic valve 2A and in the building 21, and when the switching valve 3 is supplied with air or nitrogen for operation from the bomb 4 placed outside the building 21 via the piping 20B, the switching valve 3 which is connected to the gas discharge line 11 side of the first electromagnetic valve 2A, as shown in FIG. 1, at the time of the normal operation, is switched to a gas supply side, as shown in FIG. 2, whereby the air or nitrogen for operation can be supplied to the first electromagnetic valve 2A. Hence, even when the power source is lost, the air-operated valve actuator 1 can be supplied with the air.

Further, in the present embodiment, the piping 20B between the switching valve 3 placed in the building 21 and the bomb 4 of an air or nitrogen supply source, which is placed outside the building 21 and supplies the air or nitrogen, has the second electromagnetic valve 2C placed in the building 21. The second electromagnetic valve 2C opens the gas discharge line 16 side and closes the switching valve 3 side at the time of the normal operation, whereas when the power source is lost, the second electromagnetic valve 2C opens the switching valve 3 side and closes the gas discharge line 16 side (see FIG. 3). Even when the isolation valve 6 is opened, the gas passage of the second electromagnetic valve 2C is opened on the gas discharge line 16 side and hence the air or nitrogen from the bomb 4 placed outside the building 21 is discharged from the gas discharge line 16 of the second electromagnetic valve 2C, which hence does not have an effect on the operation of the air-operated valve actuator 1. In other words, it is possible to prevent the air or nitrogen for control from being supplied to the air-operated valve actuator 1 from the bomb 4 by an unintended operation at the time of the normal operation, for example, an incorrect operation such that the isolation valve 6 is operated by some cause.

The isolation valve 6 described above is placed in the middle of the piping 20B, which is placed on the bomb 4 side of the switching valve 3 and outside the building 21, and prevents atmosphere in the building 21 at the time of the normal operation from leaking out to the outside of the building 21 by a leak on a gas supply side of the switching valve 3.

In this regard, when a unit for supplying the switching valve 3 with the air or nitrogen is provided with a power source different in kind from the power source in the building 21, for example, a battery, the unit can be improved in safety. However, as an additional backup, the gas (air or nitrogen) may be supplied by a manual valve.

That is, in the present embodiment, the third electromagnetic valve 5 placed in the piping 20B, which supplies the switching valve 3 with the air or nitrogen for control from the bomb 4 and is placed outside the building 21, is constructed of three electromagnetic valves which are operated by power sources of an alternating current power source or a direct current power source, a direct current power source, and a manual force, respectively. In other words, as shown in FIG. 1 to FIG. 3, a third electromagnetic valve 5A is operated by a power source of the alternating current power source or the direct current power source at the time of an emergency (No. 1), and a third electromagnetic valve 5B is operated by a power source of a direct current power source (for example, a battery) at the time of an emergency (No. 2), and a third electromagnetic valve 5C is operated manually as a backup.

When the power source is lost, the third electromagnetic valve 5B operated by the direct current power source (the battery) is driven to thereby supply the first electromagnetic valve 2A with the air or nitrogen from the bomb 4. A leak to the gas supply side of the switching valve 3 is prevented by the isolation valve 6.

Next, specific examples of the respective states in the gas supply apparatus of the embodiment 1 described above will be described by the use of FIG. 4 to FIG. 14.

In FIG. 4 to FIG. 14 is shown an angle valve having a cylinder 8, which is a driving device having air or nitrogen as a power source and having a link, is shown as a valve main body 7 (the angle valve is closed by a spring force when not supplied with the air or nitrogen). A state in which the switching valve 3 is opened or closed is expressed not by the JIS symbol but by white or black as is the case with the expressions of the other valves.

Figure 4:
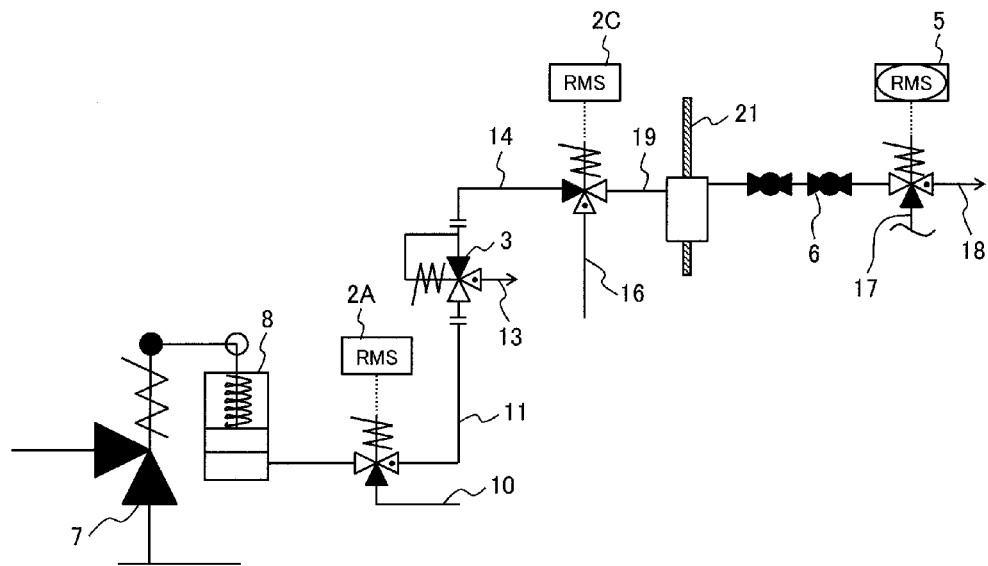
FIG. 4 is a diagram to show a standby state at the time of a normal operation in the embodiment 1 of the gas supply apparatus of the present invention.
Figure 8:
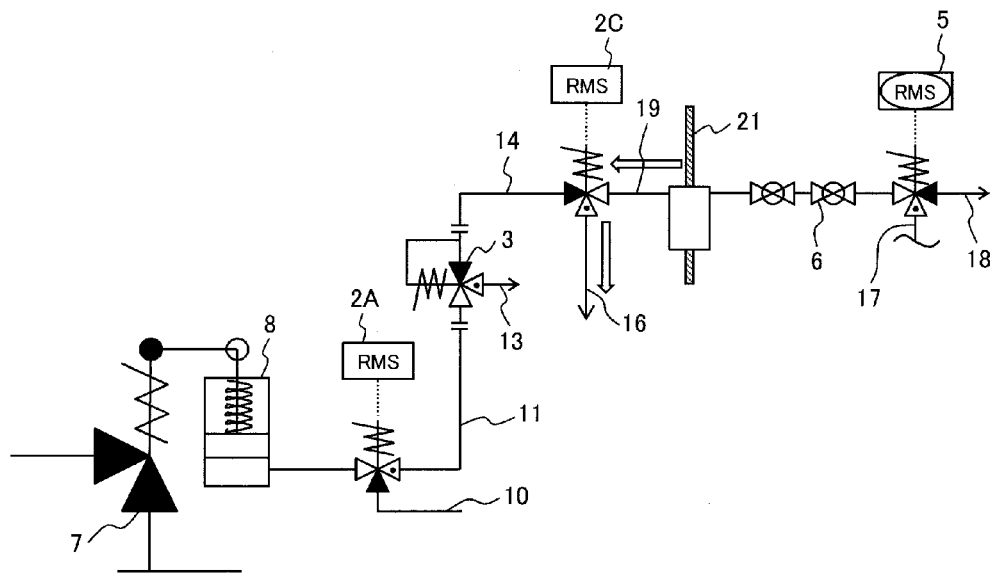
FIG. 8 is a diagram to show a standby state at the time of the normal operation in the embodiment 1 of the gas supply apparatus of the present invention.

FIG. 4 and FIG. 8 show a standby state of the gas supply apparatus of the present embodiment at the time of the normal operation.

As shown in the drawings, at the time of the normal operation, in the standby state, the first electromagnetic valve 2A connected to the cylinder (air-operated valve actuator) 8 has the gas discharge line 11 side opened and the switching valve 3 has a gas discharge line 13 side opened. On the other hand, the second electromagnetic valve 2C has the gas discharge line 16 side opened.

For this reason, as shown in FIG. 8, the isolation valve 6 is opened and a signal is sent to the third electromagnetic valve 5 to thereby operate the third electromagnetic valve 5, thereby opening a gas supply line 17 side of the third electromagnetic valve 5, whereby gas is supplied from the bomb 4. However, the second electromagnetic valve 2C has the gas discharge line 16 side opened and hence the gas is discharged from the gas discharge line 16 of the second electromagnetic valve 2C, so that the gas is not supplied to a gas supply line 14 of the switching valve 3. Hence, the switching valve 3 and the cylinder 8 of the valve main body 7 are not operated.

Figure 5:
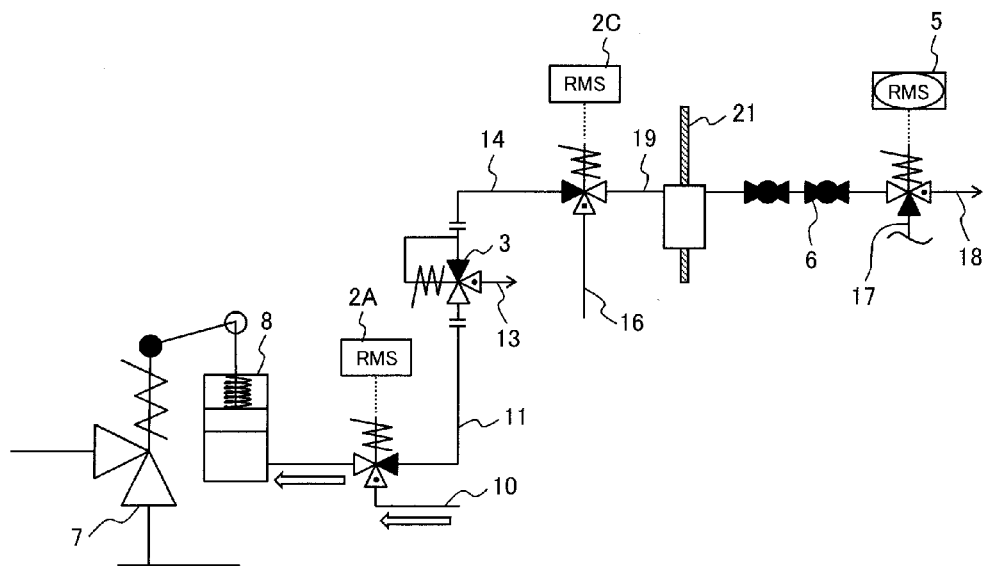
FIG. 5 is a diagram to show a gas supply state at the time of the normal operation in the embodiment 1 of the gas supply apparatus of the present invention.
Figure 11:
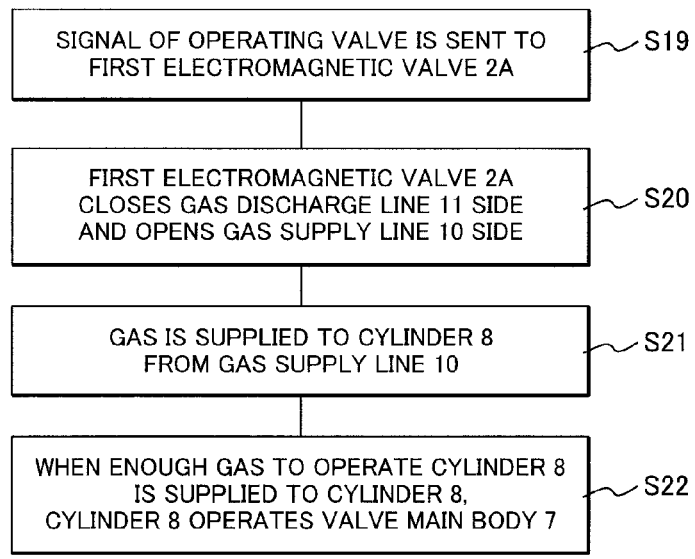
FIG. 11 is a flow chart to show a flow of the gas supply state at the time of the normal operation of the gas supply apparatus shown in FIG. 5.

FIG. 5 and FIG. 11 show a state and a flow when the gas supply apparatus of the present embodiment supplies gas at the time of the normal operation. Here, in the following description, "step" expresses "S" in the drawing. For example, "a step 19" corresponds to "S 19" in the drawing.

As shown in drawings, when a signal of operating a valve is inputted to the first electromagnetic valve 2A (step 19), the first electromagnetic valve 2A closes the gas discharge line 11 side and opens a gas supply line 10 side (step 20). Then, the gas of compressed air or compressed nitrogen is supplied to the cylinder 8 from the gas supply line 10 of the first electromagnetic valve 2A (step 21), whereby the valve main body 7 is operated (step 22).

Figure 6:
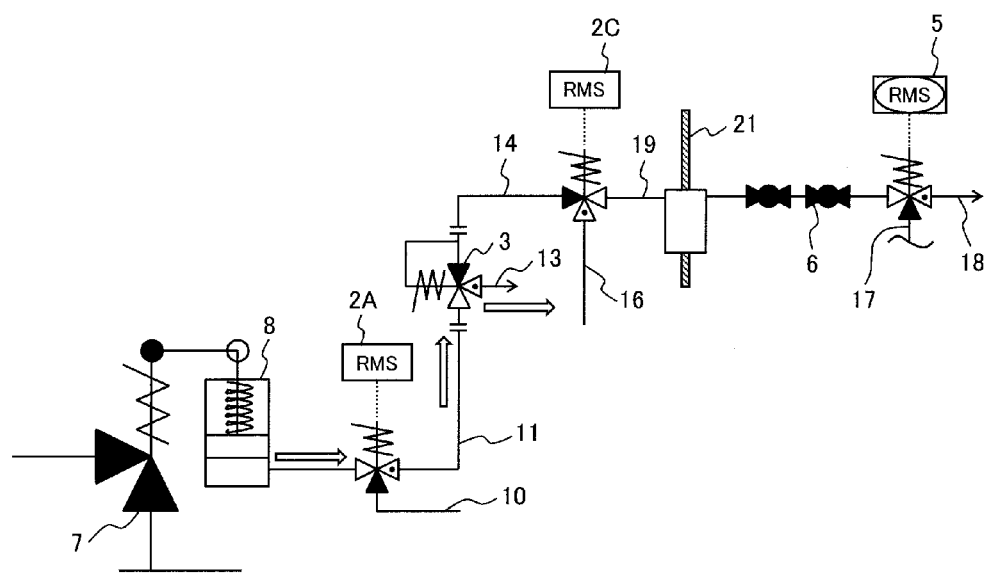
FIG. 6 is a diagram to show a gas discharge state at the time of the normal operation in the embodiment 1 of the gas supply apparatus of the present invention.
Figure 12:
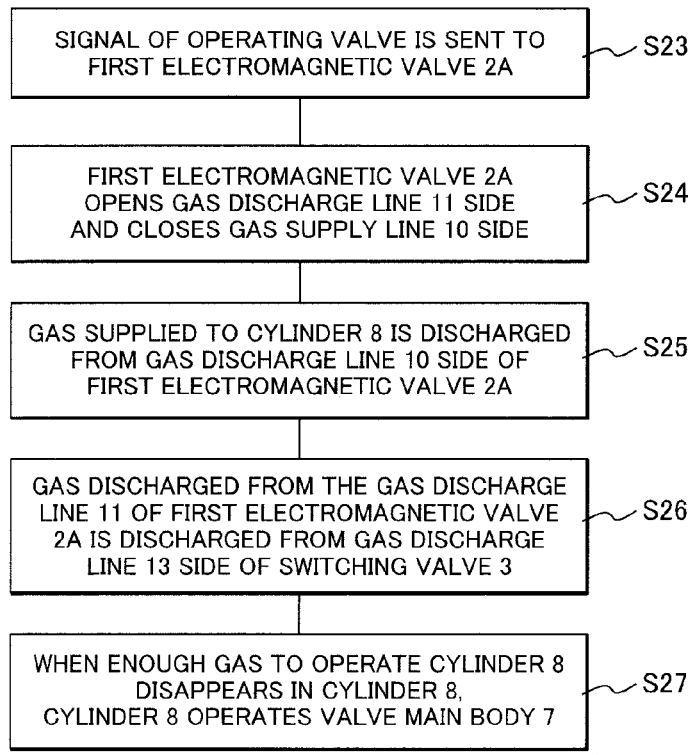
FIG. 12 is a flow chart to show a flow of the gas discharge state at the time of the normal operation of the gas supply apparatus shown in FIG. 6.

FIG. 6 and FIG. 12 show a state and a flow when the gas supply apparatus of the present embodiment discharges the gas at the time of the normal operation.

As shown in the drawings, when the valve main body 7 is returned to the standby state, a signal is sent to the first electromagnetic valve 2A (step 23), whereby the first electromagnetic valve 2A closes the gas supply line 10 side and opens the gas discharge line 11 side (step 24). Then, the gas supplied to the cylinder 8 is discharged from the gas discharge line 11 side of the first electromagnetic valve 2A (step 25) and is discharged from the gas discharge line 13 (connected to a connection port E of the switching valve 3 shown in FIG. 1 to FIG. 3) side of the switching valve 3 (step 26). When the enough gas to operate the cylinder 8 disappears in the cylinder 8, the cylinder 8 operates the valve main body 7 (step 27), whereby the valve main body 7 is returned to a standby state. As an example, when the valve main body 7 is on standby, the valve main body 7 is closed, whereas when the valve main body 7 is operated, the valve main body 7 is opened. However, the valve main body 7 can be operated in a manner opposite to this.

Figure 7:
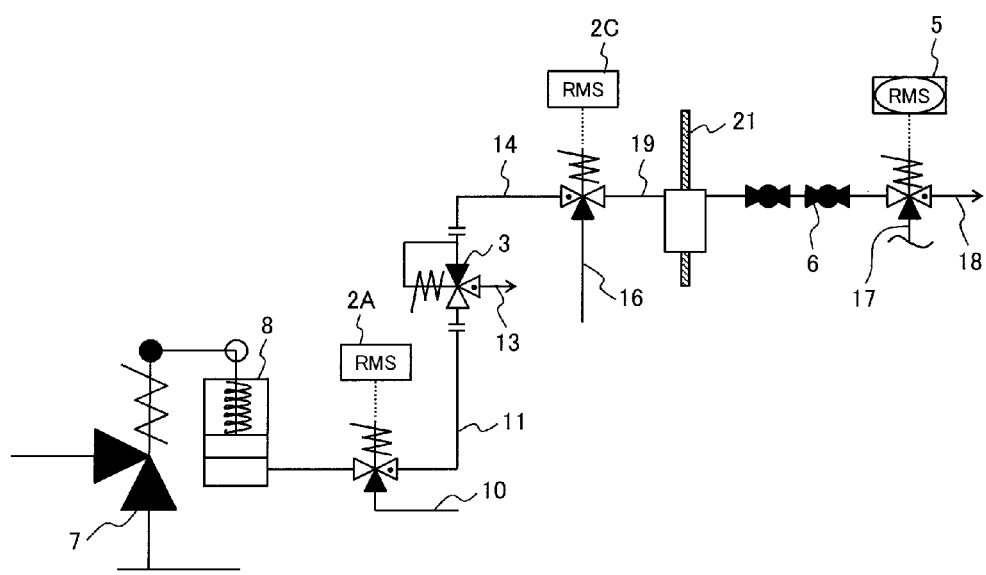
FIG. 7 is a diagram to show a standby state when a power source is lost in the embodiment 1 of the gas supply apparatus of the present invention.

FIG. 7 shows a standby state of the gas supply apparatus of the present embodiment at the time of a severe accident such as a station blackout.

As shown in the drawing, at the time of the severe accident such as the station blackout, the first electromagnetic valve 2A is brought by the loss of power source into a state in which the gas discharge line 11 side is opened, and the first electromagnetic valve 2A is on standby in a state in which the first electromagnetic valve 2A cannot be operated from the outside. Similarly, the second electromagnetic valve 2C is brought into a state in which the gas discharge line 16 side is opened, and the second electromagnetic valve 2C is on standby in a state in which the second electromagnetic valve 2C cannot be operated from the outside.

Figure 9:
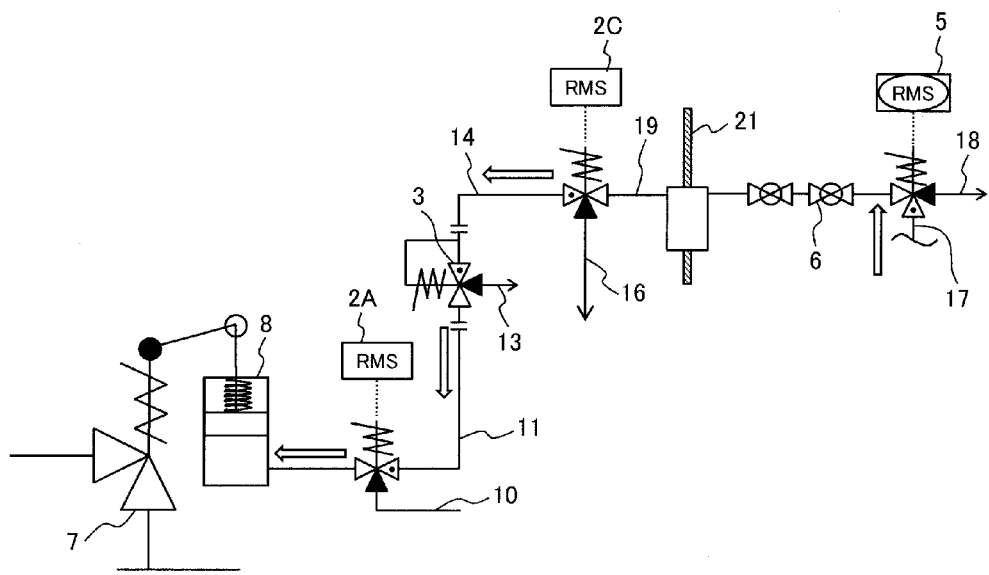
FIG. 9 is a diagram to show a gas supply state when a power source is lost in the embodiment 1 of the gas supply apparatus of the present invention.
Figure 13:
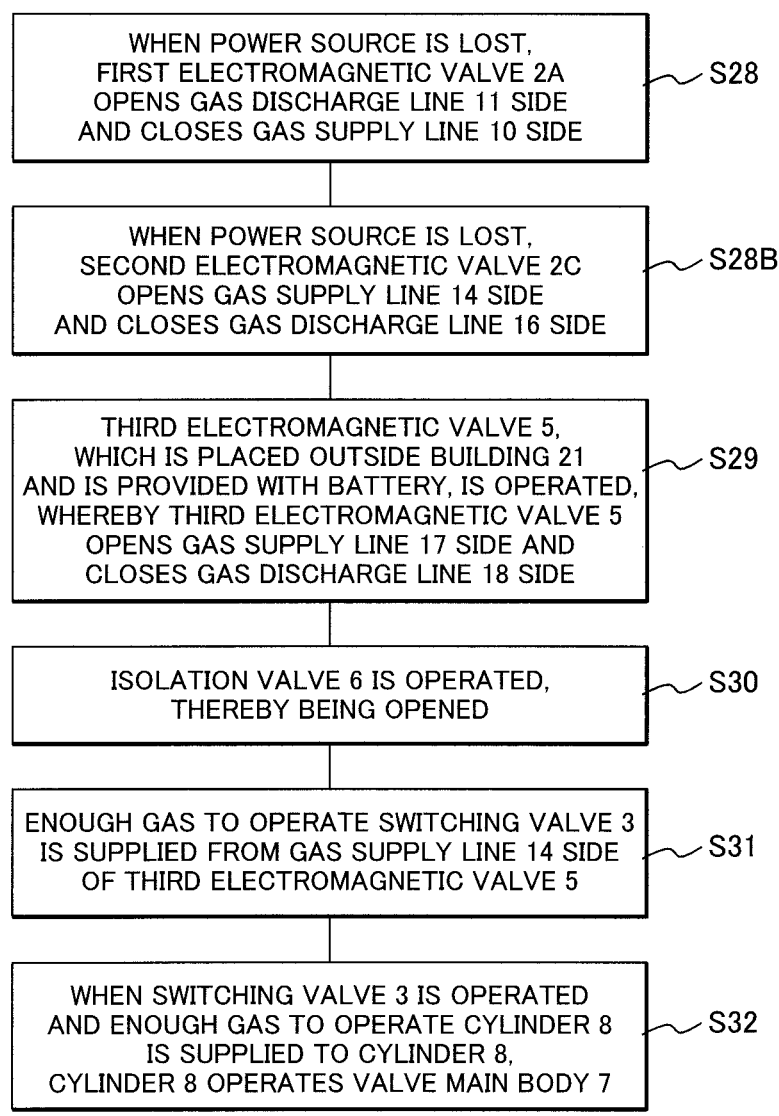
FIG. 13 is a flow chart to show a flow of the gas supply state when the power source is lost in the gas supply apparatus shown in FIG. 9.

FIG. 9 and FIG. 13 show a state and a flow when the gas supply apparatus of the present embodiment supplies the gas at the time of a severe accident.

As shown in the drawings, when the power source is lost, the first electromagnetic valve 2A is brought into a state in which the gas discharge line 11 (connected to a connection port A of the switching valve 3 shown in FIG. 1 to FIG. 3) side is opened and in which the gas supply line 10 side is closed (step 28). Similarly, when the power source is lost, the second electromagnetic valve 2C is brought into a state in which a gas supply line 19 (connected to a connection port P of the switching valve 3 shown in FIG. 1 to FIG. 3) side is opened and in which the gas discharge line 16 side is closed (step 28B). In order to operate the valve main body 7 from the outside, a gas supply line 17 side of the third electromagnetic valve 5, which is placed outside the building 21 and has a battery as a driving source, is opened and a gas discharge line 18 side of the third electromagnetic valve 5 is closed (step 29).

Next, the isolation valve 6 is operated and hence opened (step 30), thereby supplying the enough gas to operate the switching valve 3 from the gas supply line 17 (connected to the connection port P of the switching valve 3 shown in FIG. 1 to FIG. 3) side of the third electromagnetic valve 5 (step S31). By the supplied gas, the switching valve 3 closes the gas discharge line 13 (the connection port E of the switching valve 3 shown in FIG. 1 to FIG. 3) side and opens a gas supply line 14 (the connection port P of the switching valve 3 shown in FIG. 1 to FIG. 3) side. Then, the gas supplied from the outside of the building 21 passes through the gas supply line 14 (connected to the connection port P of the switching valve 3 shown in FIG. 1 to FIG. 3) of the switching valve 3 and the gas discharge line 11 (connected to the connection port A of the switching valve 3 shown in FIG. 1 to FIG. 3) of the first electromagnetic valve 2A and reaches the cylinder 8, whereby a gas pressure large enough to operate the valve main body 7 is charged into the cylinder 8 and hence the valve main body 7 is operated (step 32).

Figure 10:
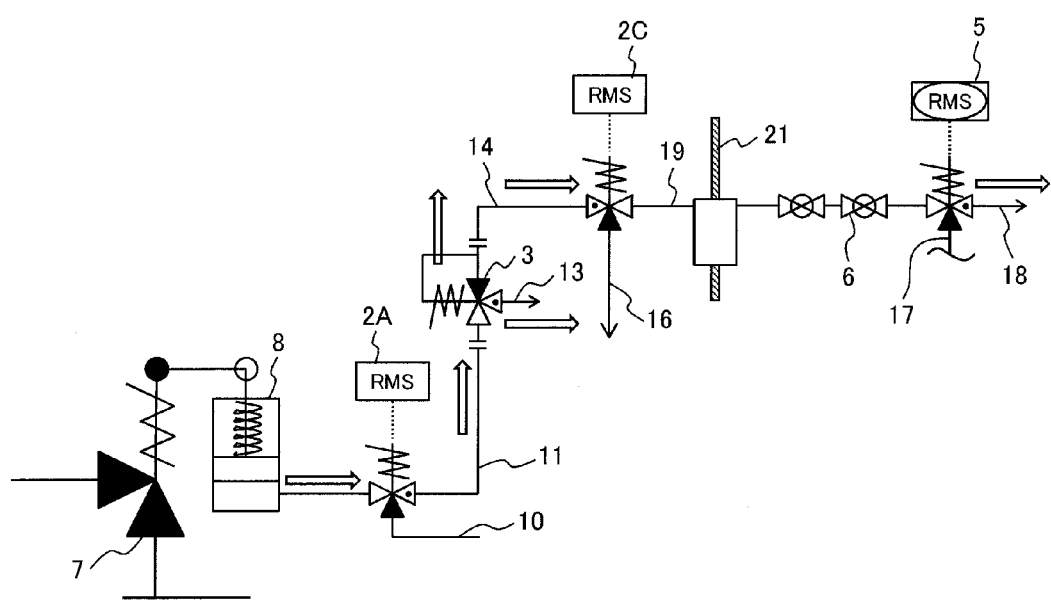
FIG. 10 is a diagram to show a gas discharge state when a power source is lost in the embodiment 1 of the gas supply apparatus of the present invention.
Figure 14:
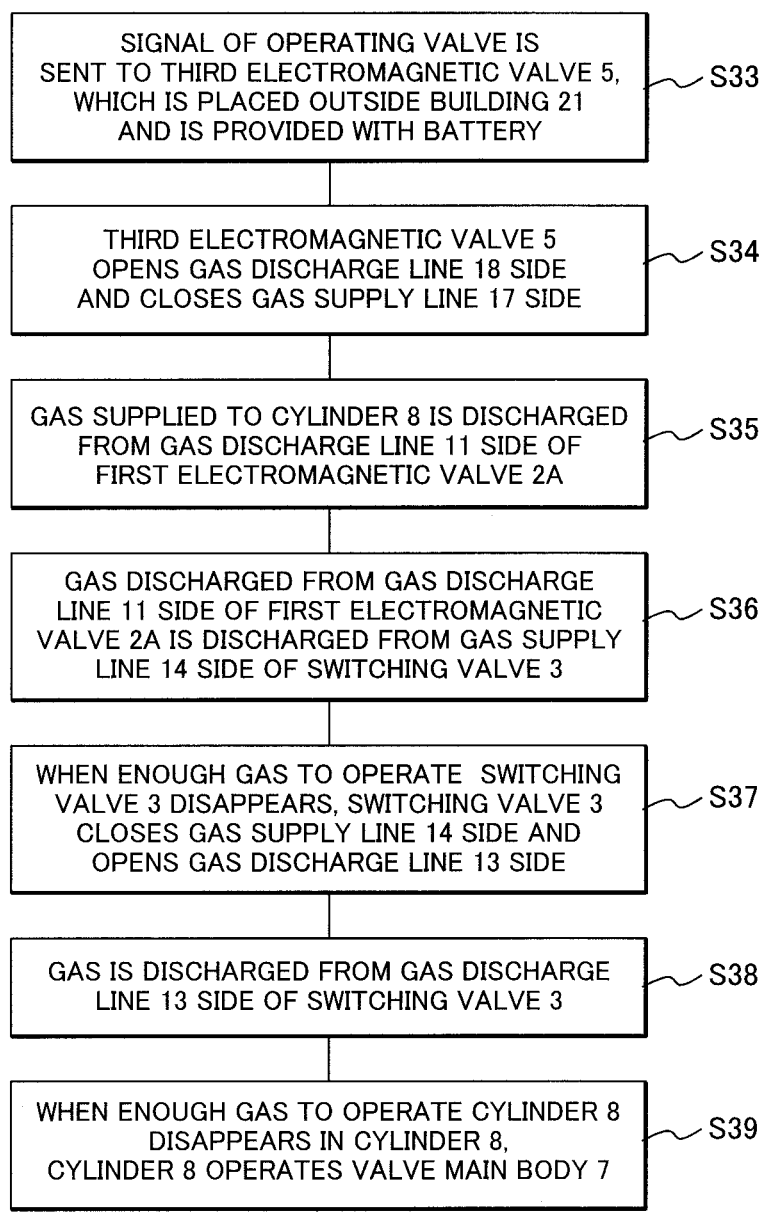
FIG. 14 is a flow chart to show a flow of the gas discharge state when the power source is lost in the gas supply apparatus shown in FIG. 10.

FIG. 10 and FIG. 14 show a state and a flow when the gas supply apparatus of the present embodiment discharges the gas at the time of a severe accident.

As shown in the drawings, a signal of operating a valve is sent to the third electromagnetic valve 5, which is placed outside the building 21 and has a battery as a driving source (step S33). In a case in which the valve main body 7 is returned to the standby state, a gas discharge line 18 side of the third electromagnetic valve 5 placed outside the building 21 is opened and the gas supply line 17 side of the third electromagnetic valve 5 is closed (step 34). Then, the gas supplied to the cylinder 8 is discharged from the gas discharge line 11 side of the first electromagnetic valve 2A (step S35), and the gas discharged from the gas discharge line 11 side (connected to the connection port A of the switching valve 3 shown in FIG. 1 to FIG. 3) of the first electromagnetic valve 2A is passed through the gas supply line 14 of the switching valve 3 (connected to the connection port P of the switching valve 3 shown in FIG. 1 to FIG. 3), a gas supply line 19 of the second electromagnetic valve 2C, and the gas discharge line 18 of the third electromagnetic valve 5 placed outside the building 21, and is discharged (step S36). When the enough gas to operate the switching valve 3 disappears, the switching valve 3 closes the gas supply line 14 (connected to the connection port P of the switching valve 3 shown in FIG. 1 to FIG. 3) side and opens the gas discharge line 13 side (connected to the connection port E of the switching valve 3 shown in FIG. 1 to FIG. 3) (step 37). Then, the gas remaining in the cylinder 8 is discharged from the gas discharge line 11 side of the first electromagnetic valve 2A (step S38) and is discharged into the building 21 from the gas discharge line 13 (connected to the connection port E of the switching valve 3 shown in FIG. 1 to FIG. 3) of the switching valve 3. When the enough gas to operate the cylinder 8 disappears in the cylinder 8, the cylinder 8 operates the valve main body 7 (step S39), whereby the valve main body 7 is returned to the standby state. As an example, when the valve main body 7 is on standby, the valve main body 7 is closed, whereas when the valve main body 7 is in operated, the valve main body 7 is opened. However, the valve main body 7 can be operated in a manner opposite to this.

In this way, in the present embodiment, the switching valve 3 and the second electromagnetic valve 2C are connected in the middle of the piping 20A on the gas discharge line 11 side of the first electromagnetic valve 2A, and when the power source is lost, the gas of air or nitrogen is supplied from the bomb 4 from the outside of the building 21. For this reason, when the switching valve 3 is supplied with the air or nitrogen for operation, the switching valve 3 connected to the gas discharge side at the time of the normal operation is switched to the gas supply side, so that when the power source is lost, the air or nitrogen can be supplied to the first electromagnetic valve 2A. At the time of the normal operation, the second electromagnetic valve 2C has the gas discharge line 16 side opened, so that even if the air or nitrogen is supplied from the bomb 4 placed outside the building 21, the air or nitrogen is discharged from the gas discharge line 16 of the second electromagnetic valve 2C and hence does not have an effect on the operation of the air-operated valve actuator 1.

Further, the pressure at which the switching valve 3 is switched is made sufficiently higher than the pressure in the building 21, so that during a period in which the switching valve 3 is operated, the atmosphere in the building 21 does not flow out to the outside of the building 21 via the third electromagnetic valve 5.

Hence, it is possible to produce an effect such that an operating valve such as the air-operated valve can be controlled remotely even when the power source is lost and that an unintended operation (incorrect operation) can be prevented at the time of the normal operation. Further, by making the power source of the third electromagnetic valve 5 different in kind (alternating current power source or direct current power source) from the first electromagnetic valve 2A used regularly, it is possible to produce also an effect of diversifying the driving source.

In this regard, a unit for supplying the switching valve 3 with the air or nitrogen can be improved in safety when it is provided with a power source different from the power source in the building 21 (for example, battery). However, as an additional backup, the unit may supply the switching valve 3 with the air or nitrogen by a manual valve.

[Embodiment 2]

Figure 15:
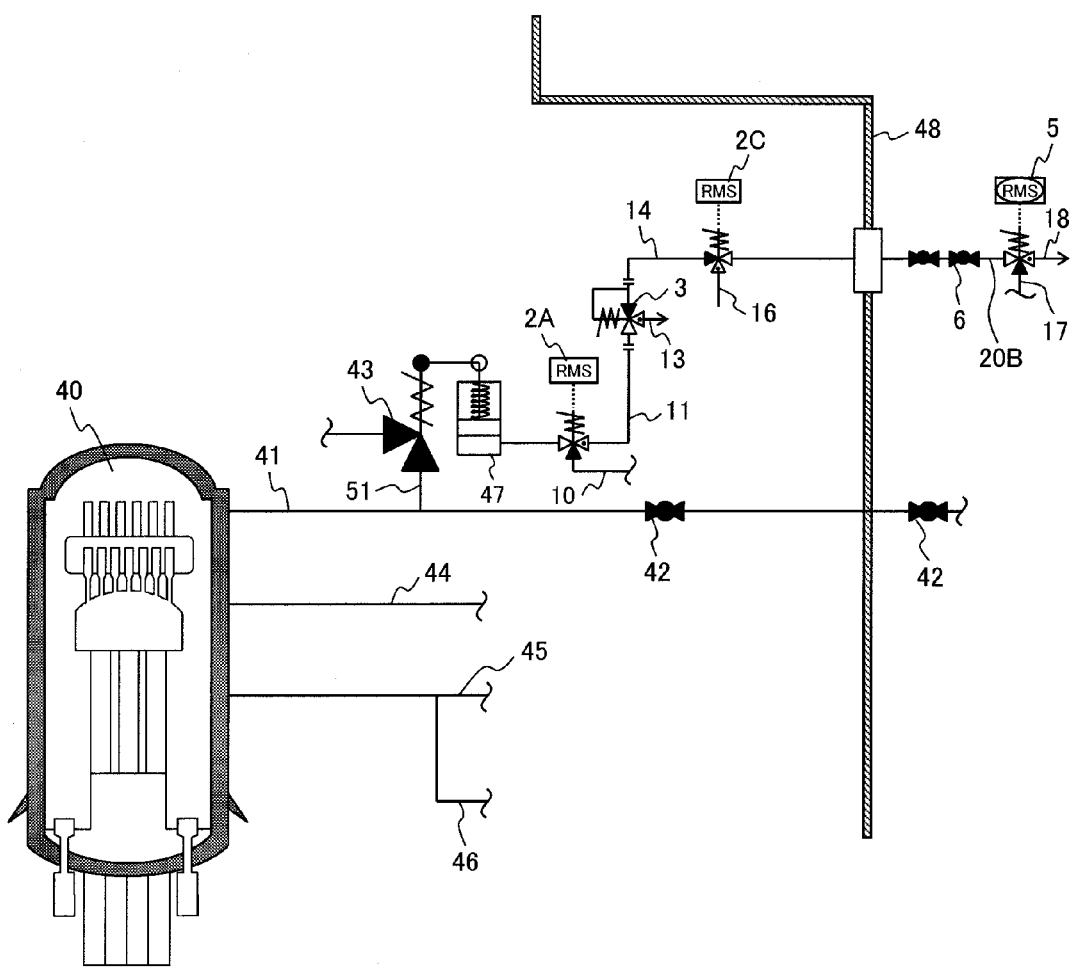
FIG. 15 is a diagram to show an air or nitrogen supply apparatus of a nuclear plant that is an embodiment 2 of the present invention.

FIG. 15 shows an air or nitrogen supply apparatus of a nuclear plant that is an embodiment 2 of the present invention.

As shown in the drawing, the air or nitrogen supply apparatus of the nuclear plant of the present embodiment is provided with and roughly constructed of: a main steam relief safety valve 43; a forcible operating cylinder 47; a first electromagnetic valve 2A; and an air or nitrogen supply source (although not shown particularly in the drawing, a high-pressure gas accumulator, the same bomb 4 as in the embodiment 1, or a unit for vaporizing liquefied nitrogen to supply a nitrogen gas). The main steam relief safety valve 43 is placed in a piping 51 branched from a main steam piping 41 for supplying steam from a reactor pressure vessel 40 contained in a reactor container 48 to a turbine building (not shown in the drawing). When pressure in a nuclear reactor is made higher than a specified value, the main steam relief safety valve 43 is opened to thereby relieve main steam in the main steam piping 41. The forcible operating cylinder 47 supplies the main steam relief safety valve 43 with air or nitrogen as a driving force so as to forcibly open the main steam relief safety valve 43. The first electromagnetic valve 2A opens or closes a flow of the air or nitrogen to the forcible operating cylinder 47. The air or nitrogen supply source supplies the air or nitrogen independently to a gas supply port and a gas discharge port of the first electromagnetic valve 2A via a piping and is placed outside the reactor container 48.

In the present embodiment, a gas discharge line 11 of the first electromagnetic valve 2A in the reactor container 48 has a switching valve 3 placed therein. The switching valve 3 switches between a gas discharge from the first electromagnetic valve 2A and a gas supply to the first electromagnetic valve 2A. When a power source is lost, the switching valve 3 can be switched to the air or nitrogen supply source (bomb 4) placed outside the reactor container 48 via the gas supply line 17 of the third electromagnetic valve 5, the second electromagnetic valve 2C, and the gas discharge line 11 of the first electromagnetic valve 2A, in order to supply the first electromagnetic valve 2A with the air or nitrogen.

Further, the second electromagnetic valve 2C is placed between the switching valve 3 and the air or nitrogen supply source (bomb 4) for supplying air or nitrogen. The second electromagnetic valve 2C can be switched in the such a way that at the time of the normal operation, the second electromagnetic valve 2C opens a gas discharge line 16 side and closes a switching valve 3 side and that when the power source is lost, the second electromagnetic valve 2C opens the switching valve 3 side and closes the gas discharge line 16 side.

The bomb 4 of the air or nitrogen supply source, similarly to the embodiment 1, is connected to the second electromagnetic valve 2C via a third electromagnetic valve 5 placed in the piping 20B, which supplies the switching valve 3 with the air or nitrogen from the bomb 4 and is placed outside the reactor container 48. The third electromagnetic valve 5 is constructed of a single valve or a plurality of valves among three valves which are operated by power sources of an alternating current power source or a direct current power source, a direct current power source (for example, a battery), and a manual force, respectively, and the operation of the third electromagnetic valve 5 is the same as in the embodiment 1.

Further, an isolation valve 6 for preventing a leak to the gas supply side of the switching valve 3 is placed in the middle of the piping 20B on the bomb 4 side of the switching valve 3 and outside the reactor container 48. In this way, the embodiment 2 employs a construction in which a leak to the gas supply side of the switching valve 3 is prevented by the isolation valve 6.

Usually, the steam is supplied from the reactor pressure vessel 40 to the turbine building through the main steam piping 41. However, when a nuclear power plant detects an accident of an earthquake or the like, in order to prevent a LOCA (Loss Of Coolant Accident) caused by a break in piping, a main steam isolation valve 42 placed in the main steam piping 41 is closed. At this time, temperature in the nuclear reactor is continuously increased by a decay heat of a nuclear fuel and pressure in the nuclear reactor is also increased along with the steam being generated. In a case in which the pressure in the nuclear reactor is made not less than a specified value, the main steam relief safety valve 43 placed in a piping 51 branched from the main steam piping 41 is operated to thereby reduce the pressure in the nuclear reactor. At that time, the switching valve 3 does not have an effect on the operation of the main steam relief safety valve 43.

The nuclear reactor is cooled by a high-pressure reactor core spray system 44 or a low-pressure reactor core spray system 45, but it is desired that at the time of the station blackout (SBO), water can be sprayed by the use of an emergency pump vehicle from an outside spray line 46.

At this time, in a case in which the pressure in the nuclear reactor is higher than the pressure of water to be sprayed, the pressure in the nuclear reactor needs to be reduced. However, a safety valve function of the main steam relief safety valve 43 described above is not operated until the pressure in the nuclear reactor reaches a specified value, so that the main steam relief safety valve 43 needs to be forcibly opened by the use of a relief valve function of the main steam relief safety valve 43.

Here, the relief valve function of the main steam relief safety valve 43 is a function of supplying gas such as nitrogen or compressed air accumulated in an accumulator to a forcible operating cylinder 47 of the main steam relief safety valve 43 to thereby open the main steam relief safety valve 43.

In the present embodiment, at the time of a severe accident such as the station blackout, the first electromagnetic valve 2A for supplying the main steam relief safety valve 43 with compressed air or compressed nitrogen cannot be operated either and is on standby with a gas discharge side opened. Then, the switching valve 3 is connected to the gas discharge line 11 side of the first electromagnetic valve 2A and air or nitrogen for operation is supplied to the switching valve 3 via the second electromagnetic valve 2C from the air or nitrogen supply source such as the bomb 4 placed outside the reactor container 48. The switching valve 3 connected to the gas discharge side at the time of the normal operation is switched to the gas supply side to thereby supply the air or nitrogen for operation to the first electromagnetic valve 2A. In this way, even when the power source is lost, the forcible operating cylinder 47 for operating the main steam relief safety valve 43 can be supplied with the air or nitrogen and hence can be operated.

When the main steam relief safety valve 43 is operated, the pressure of the reactor pressure vessel 40 is relieved to a connection line of a suppression chamber, thereby being reduced. When the pressure of the reactor pressure vessel 40 is reduced, water can be sprayed from the outside spray line 46 and hence the nuclear reactor can be stopped at lower temperatures.

Further, at the time of the normal operation, the second electromagnetic valve 2C has the gas discharge line 16 side opened, so that even if the air or nitrogen is supplied from the air or nitrogen supply source (bomb 4) placed outside the reactor container 48, the air or nitrogen is discharged from the gas discharge line 16 of the second electromagnetic valve 2C and hence does not have an effect on the operation of the main steam relief safety valve 43. Hence, this can produce an effect of preventing an unintended operation (incorrect operation) in the normal operation.

[Embodiment 3]

Figure 16:
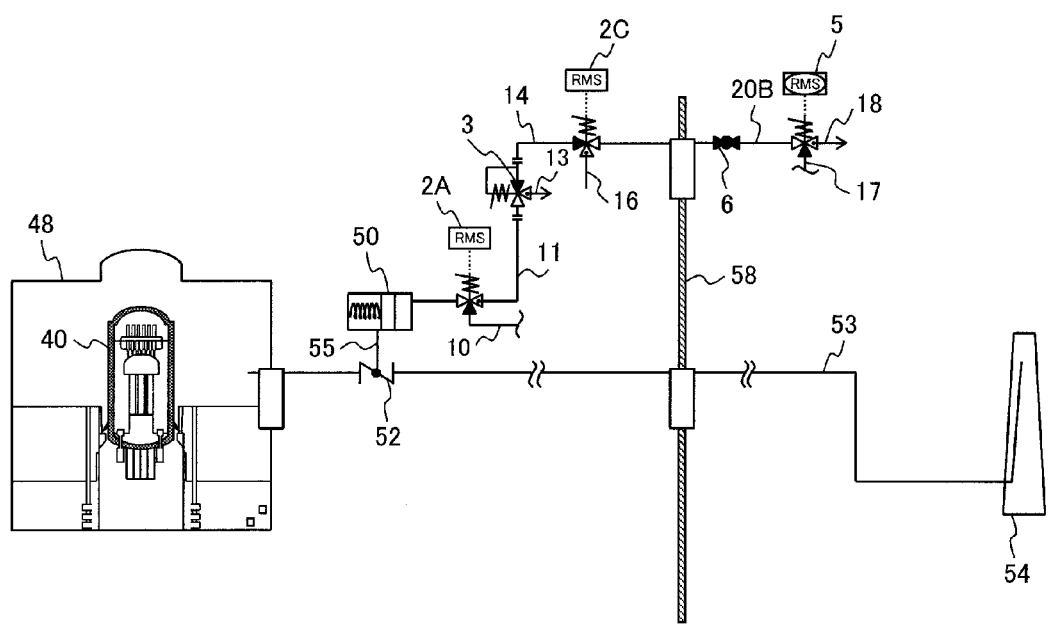
FIG. 16 is a diagram to show an air or nitrogen supply apparatus of a nuclear plant that is an embodiment 3 of the present invention.

FIG. 16 shows an air or nitrogen supply apparatus of a nuclear plant that is an embodiment 3 of the present invention.

As shown in the drawing, the air or nitrogen supply apparatus of the nuclear plant of the present embodiment is provided with and roughly constructed of: a first electromagnetic valve 2A; and an air or nitrogen supply source (although not shown particularly in the drawing, the same bomb 4 as in the embodiment 1 or a unit for vaporizing liquefied nitrogen to supply a nitrogen gas). The first electromagnetic valve 2A is connected to an air or nitrogen operated valve 50, which supplies a driving force to a drive part (cylinder or the like) for driving an opening/closing valve 52 placed in an emergency gas control system (emergency gas control unit or filter vent unit) 53 for discharging gas from a reactor container 48 having a reactor pressure vessel 40 contained therein, and is opened/closed so as to supply or stop a flow of air or nitrogen to the drive part (cylinder or the like) of the air or nitrogen operated valve 50. The air or nitrogen supply source supplies the air or nitrogen independently to a gas supply port and a gas discharge port of the first electromagnetic valve 2A and is placed outside the reactor container 48.

In the present embodiment, a gas discharge line 11 of the first electromagnetic valve 2A has a switching valve 3 placed therein. The switching valve 3 switches a gas supply to the first electromagnetic valve 2A. When a power source is lost, the switching valve 3 can be switched to the air or nitrogen supply source (bomb 4) placed outside the nuclear reactor building 58 via the gas supply line 17 of the third electromagnetic valve 5, the second electromagnetic valve 2C, and the gas discharge line 11 of the first electromagnetic valve 2A, in order to supply the first electromagnetic valve 2A with the air or nitrogen.

Further, the second electromagnetic valve 2C described above is placed between the switching valve 3 and the air or nitrogen supply source (bomb 4) for supplying air or nitrogen. The second electromagnetic valve 2C can be switched in the following manner: at the time of the normal operation, the second electromagnetic valve 2C opens a gas discharge line 16 side and closes a switching valve 3 side, whereas when the power source is lost, the second electromagnetic valve 2C opens the switching valve 3 side and closes the gas discharge line 16 side.

The bomb 4 of the air or nitrogen supply source to which a line for supplying the air or nitrogen to the air or nitrogen operated valve 50 via the first electromagnetic valve 2A via the switching valve 3 described above is connected to the first electromagnetic valve 2A, similarly to the embodiment 1, via a third electromagnetic valve 5, which is placed in the piping 20B placed outside the reactor container 48 and for supplying the air or nitrogen to the switching valve 3 from the bomb 4. The third electromagnetic valve 5 is constructed of a single valve or a plurality of valves among three valves which are operated by power sources of an alternating current power source or a direct current power source, a direct current power source (for example, a battery), and a manual force, respectively, and the operation of the third electromagnetic valve 5 is the same as in the embodiment 1. Further, an isolation valve 6 for preventing a leak to the gas supply side of the switching valve 3 is placed in the middle of a piping on the bomb 4 side of the switching valve 3 and outside the reactor container 48. The embodiment 3 employs a construction such that the isolation valve 6 prevents a leak to the gas supply side of the switching valve 3.

Usually, at the time of a severe accident such as the station blackout, the first electromagnetic valve 2A for supplying the air or nitrogen operated valve 50 with compressed air or compressed nitrogen cannot be operated either and is on standby with a gas discharge side opened.

In the present embodiment, the switching valve 3 is connected to the gas discharge line 11 side of the first electromagnetic valve 2A and air or nitrogen for operation is supplied to the switching valve 3 via the second electromagnetic valve 2C from the air or nitrogen supply source such as the bomb 4 placed outside a nuclear reactor building 58. The switching valve 3 connected to the gas discharge side at the time of the normal operation is switched to the gas supply side to thereby supply the air or nitrogen for operation to the first electromagnetic valve 2A. In this way, even when the power source is lost, the air or nitrogen is supplied to the air or nitrogen operated valve 50 to thereby control the flow of the air or nitrogen to the air or nitrogen operated valve 50, whereby an opening/closing valve 52 can be opened/closed. Hence, gas in the reactor container 48 can be passed through an emergency gas control system (emergency gas control device or filter vent device) 53 and can be discharged from a gas discharge tower 54, whereby the pressure in the reactor container 48 can be reduced.

Further, at the time of the normal operation, the second electromagnetic valve 2C has the gas discharge line 16 side opened, so that even if the air or nitrogen is supplied from the air or nitrogen supply source (bomb 4) placed outside the nuclear reactor building 58, the air or nitrogen is discharged from the gas discharge line 16 of the second electromagnetic valve 2C and hence does not have an effect on the operation of the opening/closing valve 52 by the air or nitrogen operated valve 50. Hence, this can produce an effect of preventing an unintended operation (incorrect operation) in the normal operation.

[Embodiment 4]

Figure 17:
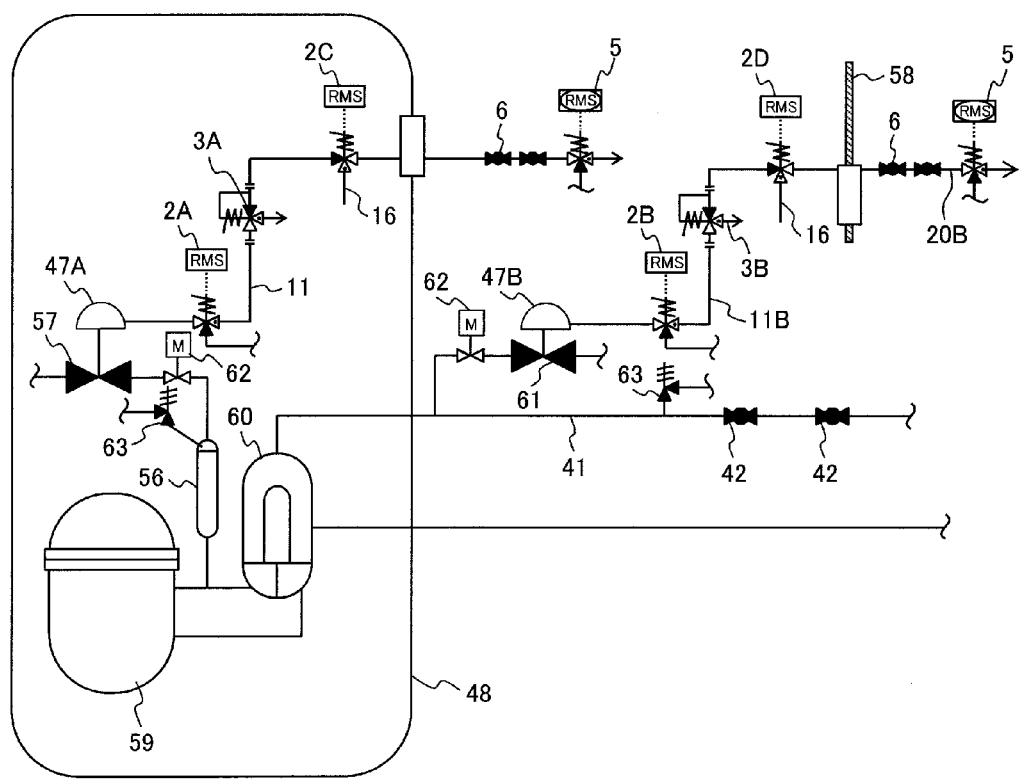
FIG. 17 is a diagram to show a case in which a gas supply apparatus of an embodiment 4 of the present invention is applied to a pressurizer relief valve and a main steam relief valve in a pressurized water reactor.

In FIG. 17 is shown a case in which a gas supply apparatus of an embodiment 4 of the present invention is applied to a pressurizer relief valve and a main steam relief valve in a pressurized water reactor.

As shown in the drawing, the pressurized water reactor sends hot water generated by a reactor pressure vessel 59 to a steam generator 60 and rotates a turbine (not shown in the drawing) placed outside a nuclear reactor building 58 by steam generated by the steam generator 60 to thereby produce electricity. At that time, in order to pressurize the hot water generated by the reactor pressure vessel 59 and to hold the hot water in a liquid state, a pressurizer 56 for keeping the pressure and water level of the reactor pressure vessel 59 is placed between the reactor pressure vessel 59 and the steam generator 60. Further, a main steam relief valve 61 is placed via a master valve 62 in the middle of a main steam piping 41 for sending the steam to the turbine. The main steam relief valve 61 is provided with a forcible operating cylinder 47B. Here, the main steam piping 41 has a safety valve 63 placed before a main steam isolation valve 42.

On the other hand, the reactor pressure vessel 59 is provided with the pressurizer 56 and a pressurizer relief valve 57 for forcibly reducing pressure of the pressurizer 56 as required, the pressurizer 56 and the pressurizer relief valve 57 having a master valve 62 provided between them. The pressurizer relief valve 57 is provided with a forcible operating cylinder 47A. The pressurizer 56 is provided with a safety valve 53.

When a SBO (station blackout) is caused, the pressurizer relief valve 57 and the main steam relief valve 61 cannot be operated, so that the pressure of the reactor pressure vessel 59 or the pressure of the steam generator 60 can be safely reduced by the switching valve described above.

That is, the gas supply apparatus applied to the pressurized water reactor shown in FIG. 17 is constructed of: the main steam relief valve 61 which is connected to the reactor pressure vessel 59 by the main steam piping 41 and which relieves the steam in the steam generator 60 for supplying cooling water to the reactor pressure vessel 59; the forcible operating cylinder 47B for supplying air or nitrogen stored therein to the main steam relief valve 61 so as to open the main steam relief valve 61; a first electromagnetic valve 2B placed in the middle of the piping and opening/closing a flow of the air or nitrogen to the forcible operating cylinder 47B; and an air or nitrogen supply source of a bomb 4 or the like for supplying air or nitrogen to the first electromagnetic valve 2B.

In the present embodiment, a gas discharge line 11B of the first electromagnetic valve 2B has a switching valve 3B placed therein. The switching valve 3B switches between a gas discharge from the first electromagnetic valve 2B and a gas supply to the first electromagnetic valve 2B. When the power source is lost, the switching valve 3B is switched to the bomb 4 of the air or nitrogen supply source placed outside the reactor container 48 via a gas supply line of the third electromagnetic valve 5, the second electromagnetic valve 2D and a gas discharge line 11B of the first electromagnetic valve 2B, in order to supply the first electromagnetic valve 2B with the air or nitrogen.

Further, the second electromagnetic valve 2D is placed between the switching valve 3B and the air or nitrogen supply source (bomb 4) for supplying air or nitrogen. The second electromagnetic valve 2D can be switched in the following manner: at the time of the normal operation, the second electromagnetic valve 2D opens a gas discharge line 16 side and closes a switching valve 3B side, whereas when the power source is lost, the second electromagnetic valve 2D opens the switching valve 3B side and closes the gas discharge line 16 side.

Further, the pressurizer relief valve 57 placed in the middle of the piping between the reactor pressure vessel 59 and the pressurizer 56 for holding the pressure and water level of the reactor pressure vessel 59 and forcibly reducing the pressure of the pressurizer 56 as required is provided with: a forcible operating cylinder 47A for supplying air or nitrogen stored therein to the pressurizer relief valve 57 so as to open the pressurizer relief valve 57; and a first electromagnetic valve 2A placed in the middle of piping and for opening/closing the flow of the air or nitrogen to the forcible operating cylinder 47A. The first electromagnetic valve 2A is supplied with air or nitrogen from the air or nitrogen supply source of the bomb 4 or the like.

In the present embodiment, a gas discharge line 11 of the first electromagnetic valve 2A has a switching valve 3A placed therein. The switching valve 3A switches between a gas discharge from the first electromagnetic valve 2A and a gas supply to the first electromagnetic valve 2A. When the power source is lost, in order to supply the first electromagnetic valve 2A with the air or nitrogen, the switching valve 3A is switched to the bomb 4 of the air or nitrogen supply source placed outside the reactor container 48 via a gas supply line of the third electromagnetic valve 5, the second electromagnetic valve 2C and a gas discharge line 11 of the first electromagnetic valve 2A.

Further, the second electromagnetic valve 2C is placed between the switching valve 3A and the air or nitrogen supply source (bomb 4) for supplying air or nitrogen. The second electromagnetic valve 2C can be switched in the following manner: at the time of the normal operation, the second electromagnetic valve 2C opens the gas discharge line 16 side and closes the switching valve 3A side, whereas when the power source is lost, the second electromagnetic valve 2C opens the switching valve 3A side and closes the gas discharge line 16 side.

When this construction of the present embodiment is employed, even if the pressurizer relief valve 57 and the main steam relief valve 61 cannot be operated when the SBO is caused, by switching the switching valves 3A, 3B, gas such as air or nitrogen can be supplied from the gas supply source of the bomb 4 or the like. Hence, the same effect as in the embodiments described above can be produced.

Further, at the time of the normal operation, each of the second electromagnetic valves 2C, 2D opens the gas discharge line 16 side, so that even if air or nitrogen is supplied from the air or nitrogen supply source (bomb 4) placed outside the reactor container 48 or the nuclear reactor building 58, the air or nitrogen is discharged from the gas discharge lines 16 of the second electromagnetic valves 2C, 2D, which hence does not have an effect on the operations of the pressurizer relief valve 57 and the main steam relief valve 61. Hence, it is possible to produce an effect of preventing an unintended operation (incorrect operation) in the normal operation.

In this regard, in the embodiment described above, the air or nitrogen operated valve has been described, but the present invention can be applied also to a safety valve, a relief valve, or a safety relief valve. Further, the present invention can be applied also to a chemical plant, a petroleum plant, or a power plant in addition to the nuclear plant. Still further, as to the gas to be supplied, carbon dioxide can be thought in addition to the air or nitrogen.

[Embodiment 5]

FIGS. 18 to 22 show an embodiment 5 of a gas supply apparatus of the present invention. The embodiment 5 has, for example, an air-operated valve actuator 1 for opening/closing a valve main body (not shown in the drawing) and the air-operated valve actuator 1 is operated by a first electromagnetic valve 2A placed in the middle of a piping 20A1 in a building 21. In other words, when a first power source is turned on, the first electromagnetic valve 2A is supplied with air or nitrogen for control from an IA system (instrument air supply system of a first gas supply source) of a supply port, whereby the air-operated valve actuator 1 is operated. After the operation of the air-operated valve actuator 1 is completed, when the first power source of the first electromagnetic valve 2A is turned off, the air or nitrogen for control of the air-operated valve actuator 1 is discharged from a gas discharge port of the first electromagnetic valve 2A through a route A→E of a first switching valve 3A which will be described later, whereby the air-operated valve actuator 1 is returned to a state before the operation.

Further, in the present embodiment, a piping 20B1 between the first switching valve 3A in the building 21 and a bomb 4A of an air or nitrogen supply source (a second gas supply source), which is placed outside the building 21 and which supplies air or nitrogen, has a third electromagnetic valve 5A and an isolation valve 6 arranged therein. The third electromagnetic valve 5A and the isolation valve 6 will be described later.

Further, the present embodiment is provided with a second electromagnetic valve 2B. When the first electromagnetic valve 2A cannot be operated, the second electromagnetic valve 2B is operated by a second power source different from the first power source used at the time of the normal operation to thereby open an isolation valve 6, whereby the first switching valve 3A is supplied with gas from the bomb 4A of the second gas supply source. An extension of a piping 20A2 having the second electromagnetic valve 2B placed therein has a second switching valve 3B and a fourth electromagnetic valve 5B placed therein. The fourth electromagnetic valve 5B opens/closes the flow of gas from a bomb 4B of a third gas supply source. When a second power source is lost, the fourth electromagnetic valve 5B is opened to supply gas from the bomb 4B of the third gas supply source. Then, the second valve 3B is switched from a gas discharge to a gas supply to operate the second electromagnetic valve 2B, thereby opening the isolation valve 6.

Figure 19:
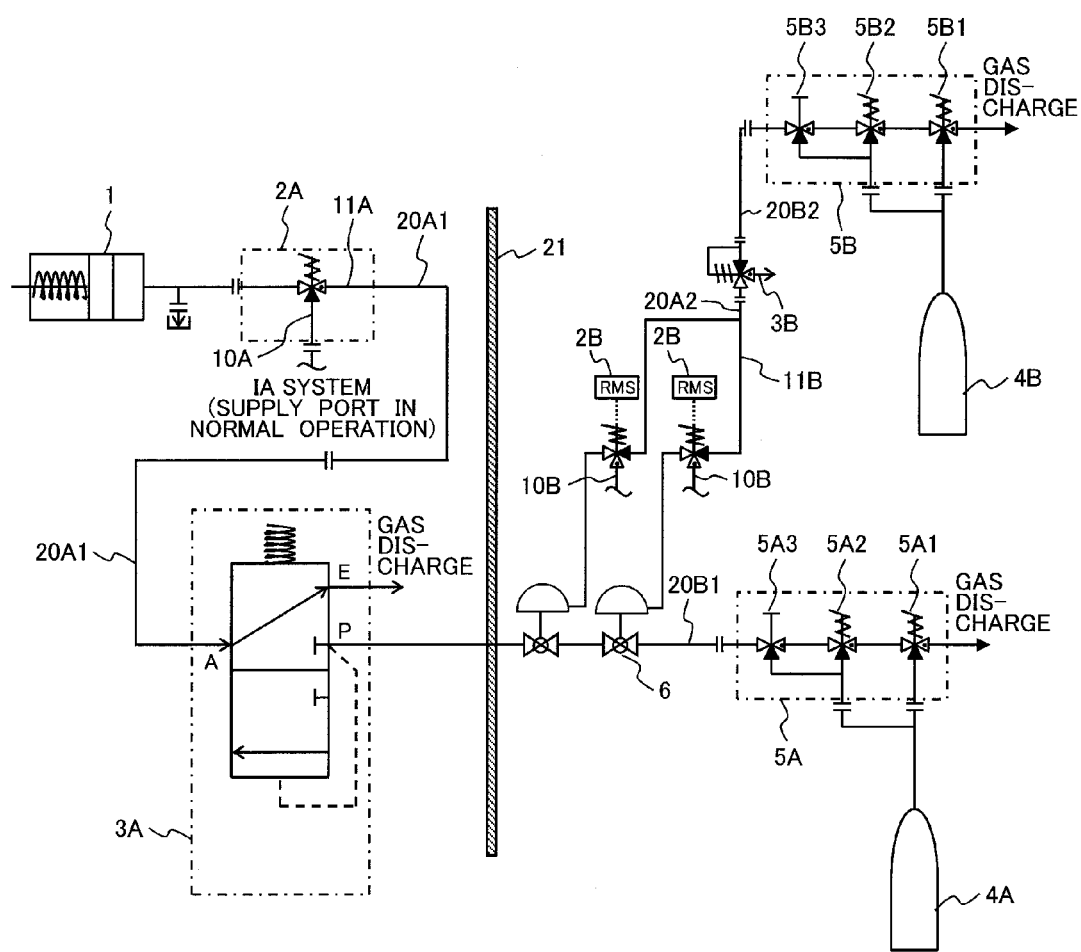
FIG. 19 is a diagram to show the embodiment 5 of the gas supply apparatus of the present invention and a state in which: a gas passage of a third electromagnetic valve is switched to a gas supply side; and the isolation valve is opened.
Figure 20:
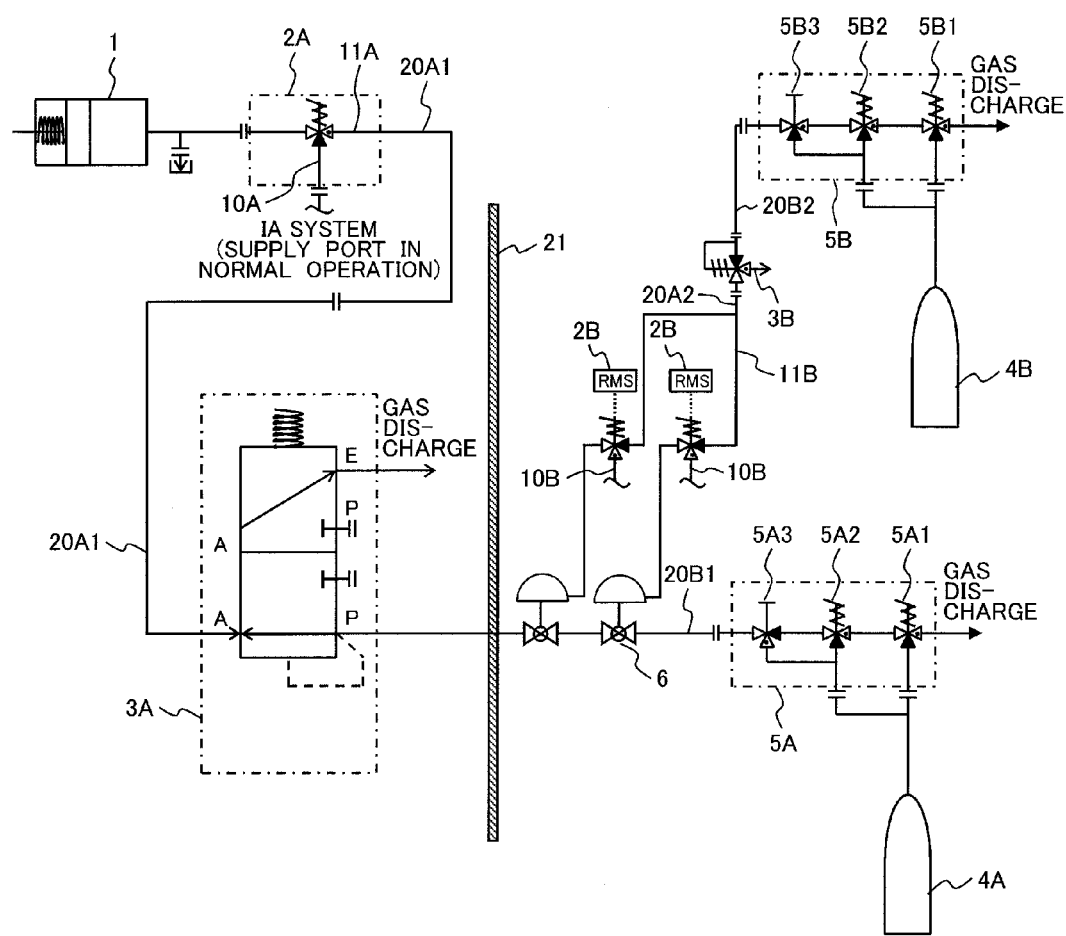
FIG. 20 is a diagram to show the embodiment 5 of the gas supply apparatus of the present invention and a state in which: the gas passage of the third electromagnetic valve is switched to a gas supply side; the isolation valve is opened; a gas passage of a second electromagnetic valve is switched to a gas supply side; and a gas passage of the first switching valve is switched to the gas supply side; and an operating valve is opened.
Figure 21:
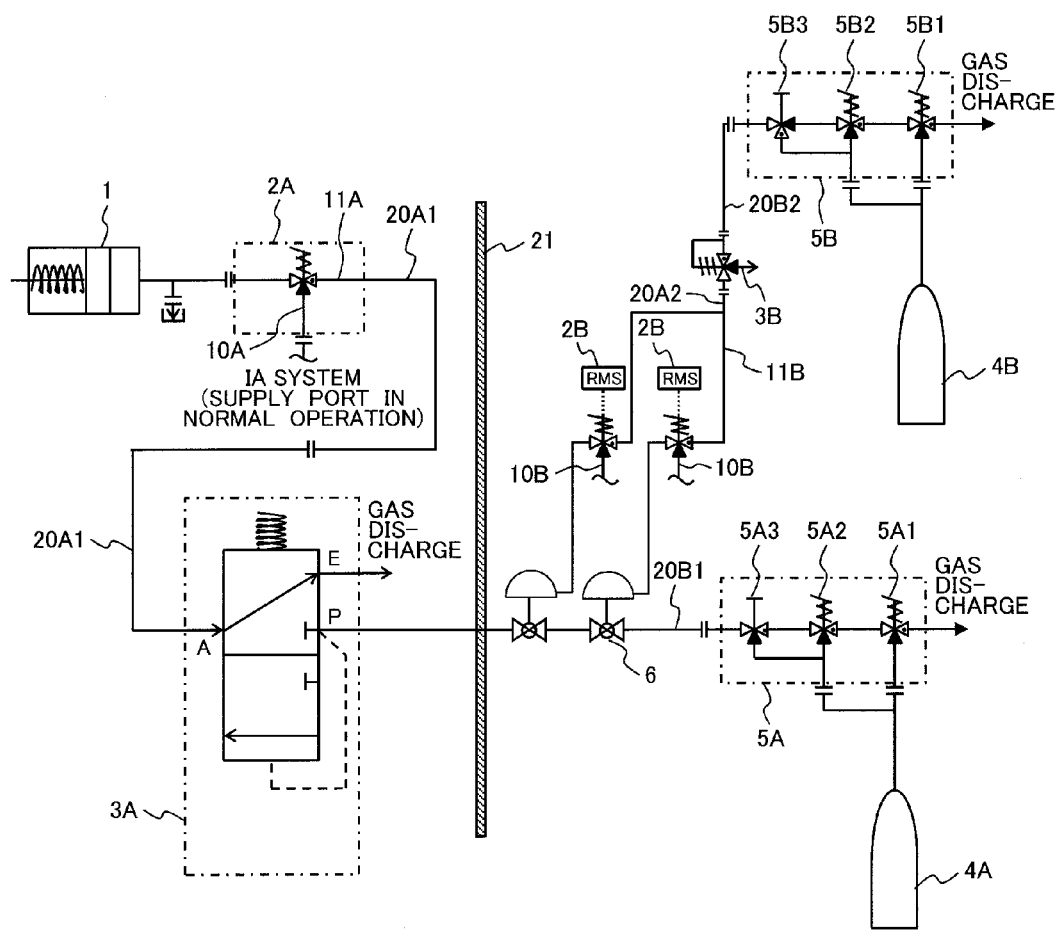
FIG. 21 is a diagram to show the embodiment 5 of the gas supply apparatus of the present invention and a state in which: the gas passage of the third electromagnetic valve is switched to a gas discharge side; a gas passage of a fourth electromagnetic valve is switched to a gas supply side; a gas passage of the second switching valve is switched to a gas supply side; the isolation valve is opened; the gas passage of the second electromagnetic valve is switched to a gas supply side; and the gas passage of the first switching valve is switched to a gas supply side; and the operating valve is opened.

In other words, in a case in which the first electromagnetic valve 2A cannot be operated because the power source is lost, the power source of the second electromagnetic valve 2B is turned on by the second power source to thereby open the isolation valve 6, whereby the first switching valve 3A can be supplied with gas from the bomb 4A of the second gas supply source (see FIG. 19 and FIG. 20). However, in a case in which also the second power source for operating the second electromagnetic valve 2B is lost, the fourth electromagnetic valve 5B is operated to thereby supply the second switching valve 3B with gas, whereby the second switching valve 3B is switched from the gas discharge to the gas supply. Hence, air can be supplied to an air cylinder of the isolation valve 6 via the second electromagnetic valve 2B from the bomb 4B of the third gas supply source. In this way, the isolation valve 6 is opened, so that the air or nitrogen for control can be supplied to the first switching valve 3A through the isolation valve 6 via the third electromagnetic valve 5A from the bomb 4A of the second gas supply source which is placed outside the building 21 and in which air or nitrogen is stored (see FIG. 21 and FIG. 22).

In this way, the first switching valve 3A has a gas passage of P⇔A formed therein (see FIG. 20 and FIG. 22) and hence a passage of the air or nitrogen for control from the bomb 4A to the air-operated valve actuator 1 through the third electromagnetic valve 5A, the isolation valve 6, the first switching valve 3A, and the first electromagnetic valve 2A is secured, whereby the air-operated valve actuator 1 is operated. After the operation of the air-operated valve actuator 1 is completed, when the power source of the third electromagnetic valve 5A is turned off, a pressure between the third electromagnetic valve 5A, the isolation valve 6, the first switching valve 3A, the first electromagnetic valve 2A, and the air-operated valve actuator 1 is lowered, whereby the gas passage of the first switching valve 3A is switched to A→E (see FIG. 18). Further, the air or nitrogen for control of the air-operated valve actuator 1 is discharged from the gas discharge port of the first electromagnetic valve 2A via the gas passage of A→E of the first switching valve 3A, whereby the air-operated valve actuator 1 is returned to a state before the operation.

In short, in the present embodiment, the first electromagnetic valve 2A has two systems of the IA system (instrument air supply system) of the first gas supply source and the bomb 4A of the second gas supply source as a gas supply source for supplying gas (air or nitrogen).

In the present embodiment, the air-operated valve actuator 1 is operated to thereby open/close the valve main body in this manner.

In this regard, in FIG. 18 to FIG. 22, the first switching valve 3A is expressed by imitating the expression of the JIS symbol of a pneumatic hydraulic circuit diagram.

As described above, in the present embodiment, the piping 20A1 placed between the first electromagnetic valve 2A and the bomb 4 and in the building 21 has the first switching valve 3A placed in the middle thereof, the first switching valve 3A switches between an air discharge from the first electromagnetic valve 2A and an air supply to the first electromagnetic valve 2A. When the power source is lost, the switching valve 3A is switched in such a way as to be connected to the bomb 4 in order to supply the first electromagnetic valve 2A with the air or nitrogen.

Figure 18:
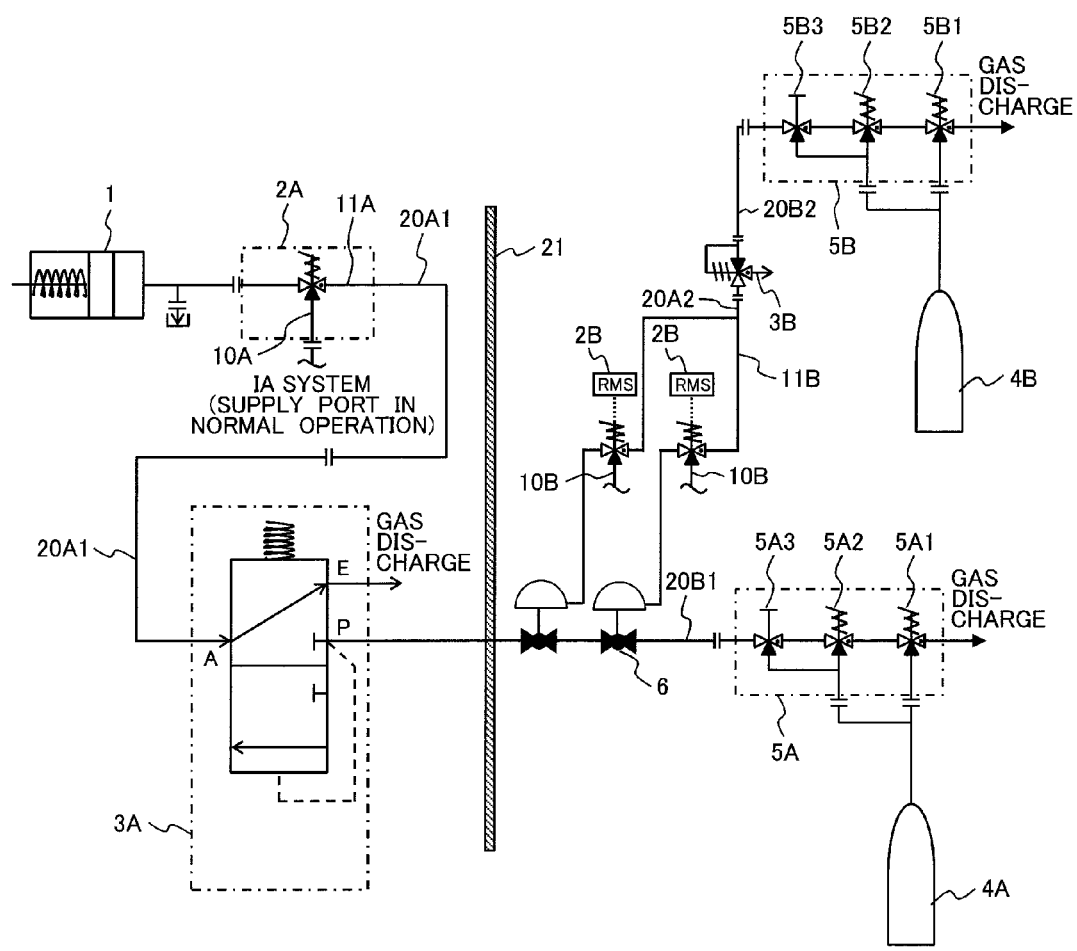
FIG. 18 is a diagram to show an embodiment 5 of a gas supply apparatus of the present invention and a state in which a first switching valve is connected to a gas discharge side of a first electromagnetic valve; a second electromagnetic valve is provided; and an isolation valve is closed.

In other words, the piping 20A1, which is placed on the gas discharge line 11 side of the first electromagnetic valve 2A and in the building 21, has the first switching valve 3A placed in the middle thereof. When the first switching valve 3A is supplied with air or nitrogen for operation from the bomb 4A placed outside the building 21 via a piping 20B1, the first switching valve 3A connected to the gas discharge line 11A side of the first electromagnetic valve 2A at the time of the normal operation, as shown in FIG. 18, is switched to a gas supply side, as shown in FIG. 20, whereby the air or nitrogen for operation can be supplied to the first electromagnetic valve 2A. Hence, even when the power source is lost, the air can be supplied to the air-operated valve actuator 1.

Further, the isolation vale 6 described above is placed in the middle of the piping 20B1, which is placed on the bomb 4A side of the switching valve 3 and outside the building 21, and prevents the atmosphere in the building 21 in the normal operation from leaking out to the outside of the building 21 by a leak on a gas supply side of the first switching valve 3A.

Figure 22:
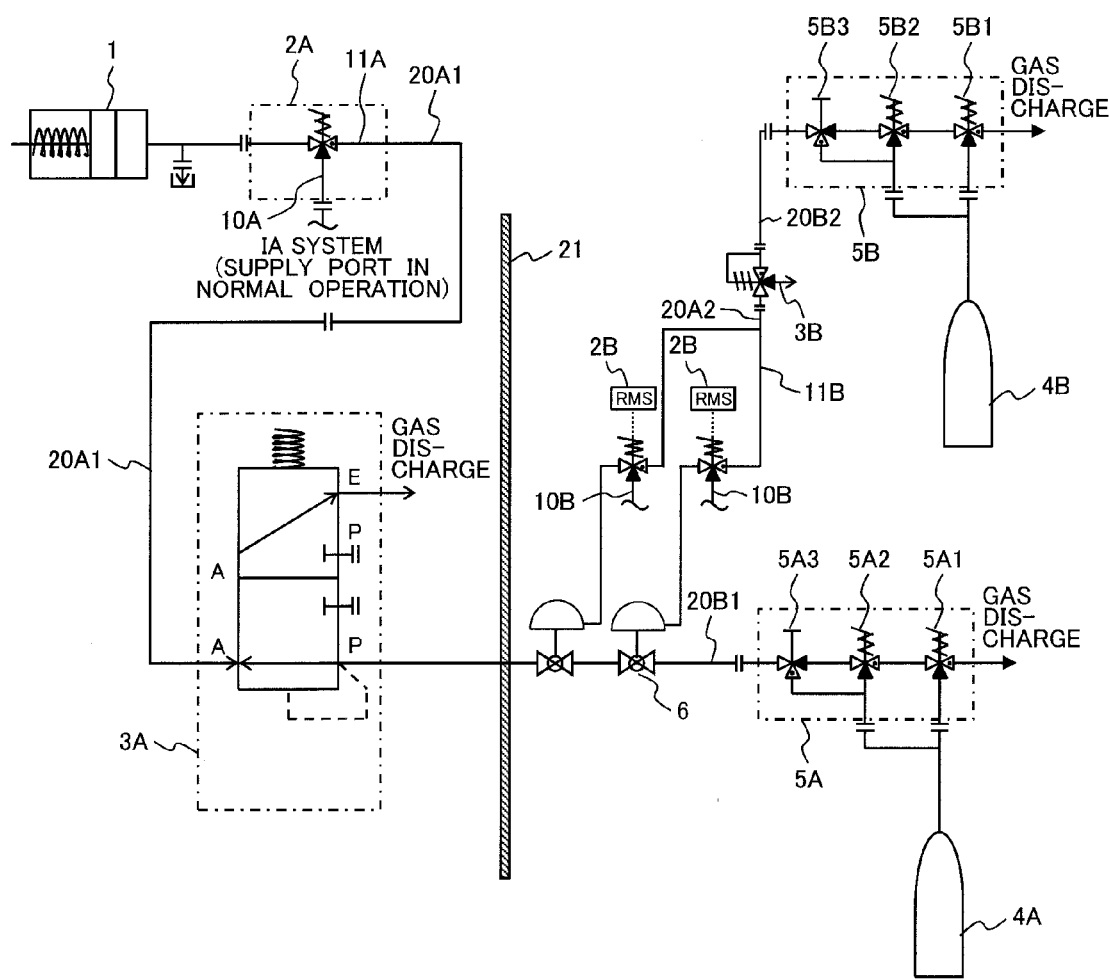
FIG. 22 is a diagram to show the embodiment 5 of the gas supply apparatus of the present invention and a state in which: the gas passage of the second electromagnetic valve is switched to a gas discharge side; the gas passage of the first switching valve is switched to the gas discharge side; and the isolation valve is closed.

Still further, as described above, the piping 20A2 on the gas discharge line 11 B side of the second electromagnetic valve 2B has the second switching valve 3B placed in the middle thereof. When the second switching valve 3B is supplied with the air or nitrogen for operation from the bomb 4B placed outside the building 21 via the piping 20B2, the isolation valve 6 is opened. Then, the first switching valve 3A, which is connected to a gas discharge line 11A side of the first electromagnetic valve 2A at the time of the normal operation, as shown in FIG. 18, is switched to a gas supply side, as shown in FIG. 22, whereby the air or nitrogen for operation can be supplied to the first electromagnetic valve 2A from the bomb 4A. Hence, even when the power source is lost, the air-operated valve actuator 1 can be supplied with the air.

In this regard, when a unit for supplying the first switching valve 3A with the air or nitrogen is provided with a power source different in kind from the power source in the building 21, for example, a battery, the unit can be improved in safety. However, the gas (air or nitrogen) may be supplied by a manual valve as an additional backup.

That is, in the present embodiment, each of the third electromagnetic valve 5A, which supplies the first switching valve 3A with the air or nitrogen from the bomb 4A and is placed in the piping 20B1 outside the building 21, and a fourth electromagnetic valve 5B, which supplies the second switching valve 3B with the air or nitrogen from a bomb 4B and is placed in a piping 20B2 outside the building 21, is constructed of three electromagnetic valves which are operated by power sources of an alternating current power source or a direct current power source, a direct current power source, and a manual force, respectively. In other words, as shown in FIG. 18 to FIG. 22, a third electromagnetic valve 5A1 and a fourth electromagnetic valve 5B1 are operated by the power source of the alternating current power source or the direct current power source at the time of an emergency (No. 1), and a third electromagnetic valve 5A2 and a fourth electromagnetic valve 5B2 are operated by the power source of the direct current power source (for example, a battery) at the time of an emergency (No. 2), and a third electromagnetic valve 5A3 and a fourth electromagnetic valve 5B3 are operated manually as a backup.

When the power source is lost, the third electromagnetic valve 5A2 or the fourth electromagnetic valve 5B2 which is driven by the direct current power source (the battery) is driven to thereby supply the first electromagnetic valve 2A or the second electromagnetic valve 2B with the air or nitrogen from the bomb 4A or the bomb 4B. A leak to the gas supply side of the first switching valve 3A is prevented by the isolation valve 6.

Next, specific examples of the respective states in the gas supply apparatus of the embodiment 5 described above will be described by the use of FIG. 23 to FIG. 32.

In FIG. 23 to FIG. 32, an angle valve having a cylinder 8, which is a drive device having air or nitrogen as a power source and having a link, is shown as a valve main body 7 (the angle valve is closed by a spring force when it is not supplied with the air or nitrogen). A state in which the first switching valve 3A is opened or closed is expressed not by the JIS symbol but by white or black as is the case with the expressions of the other valves.

Figure 23:
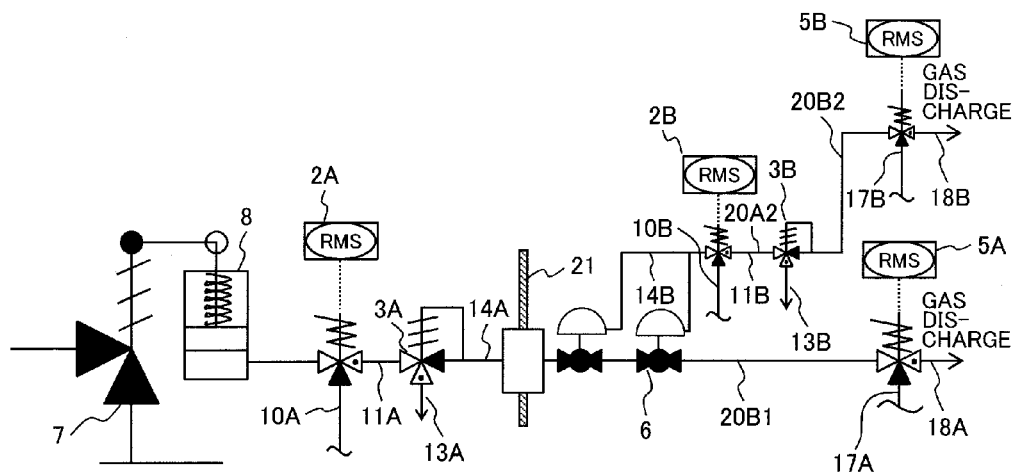
FIG. 23 is a diagram to show a standby state at the time of the normal operation in the embodiment 5 of the gas supply apparatus of the present invention.
Figure 26:
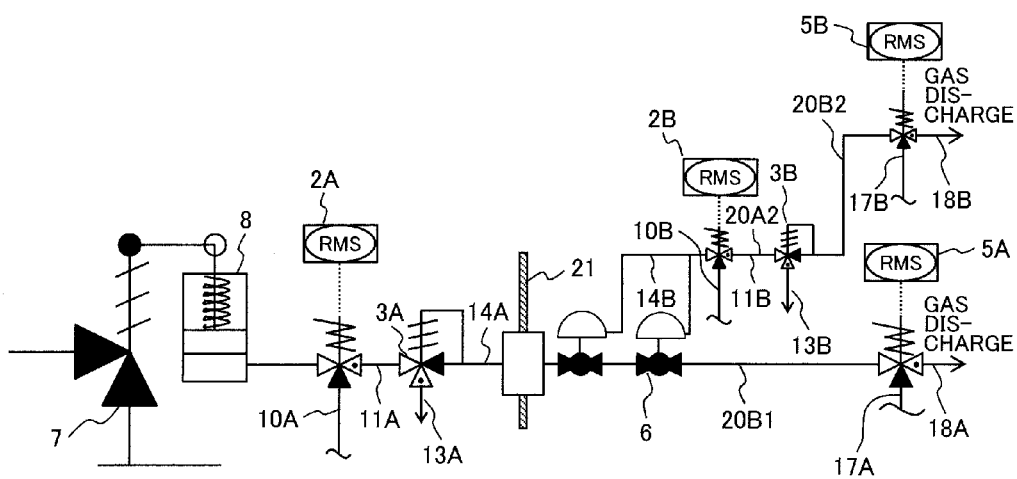
FIG. 26 is a diagram to show a standby state when the power source is lost in the embodiment 5 of the gas supply apparatus of the present invention.

FIG. 23 and FIG. 26 show a standby state of the gas supply apparatus of the present embodiment at the time of the normal operation.

As shown in the drawings, at the time of the normal operation, in the standby state, the first electromagnetic valve 2A connected to the cylinder (air-operated valve actuator) 8 has a gas discharge line 11A side opened and the first switching valve 3A has a gas discharge line 13A side opened.

Figure 24:
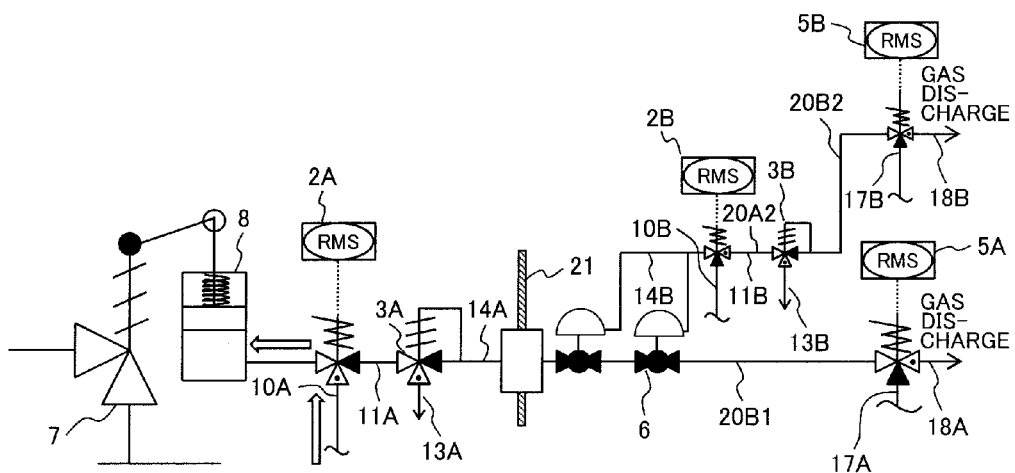
FIG. 24 is a diagram to show a gas supply state at the time of the normal operation in the embodiment 5 of the gas supply apparatus of the present invention.
Figure 33:
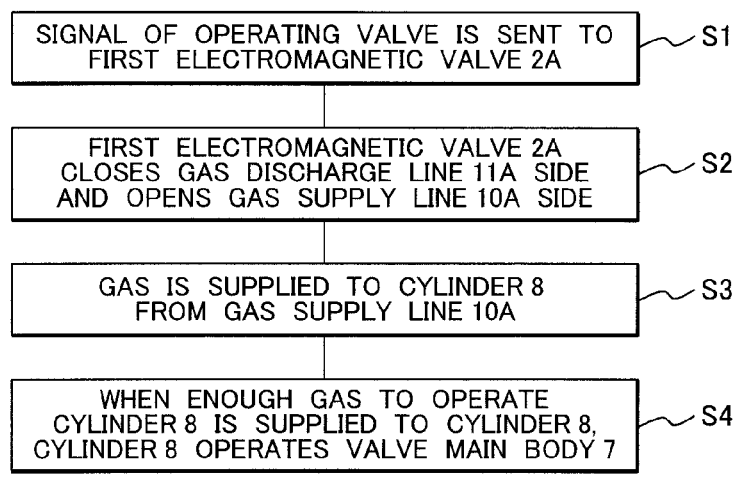
FIG. 33 is a flow chart to show a flow of a gas supply state at the time of the normal operation of the gas supply apparatus shown in FIG. 24.

FIG. 24 and FIG. 33 show a state and a flow when the gas supply apparatus of the present embodiment supplies gas at the time of the normal operation.

As shown in drawings, when a signal of operating a valve is inputted to the first electromagnetic valve 2A (step 1), the first electromagnetic valve 2A closes the gas discharge line 11A side and opens a gas supply line 10A side (step 2). Then, the gas such as compressed air or compressed nitrogen is supplied to the cylinder 8 from the gas supply line 10A of the first electromagnetic valve 2A (step 3), whereby a valve main body 7 is operated (step 4).

Figure 25:
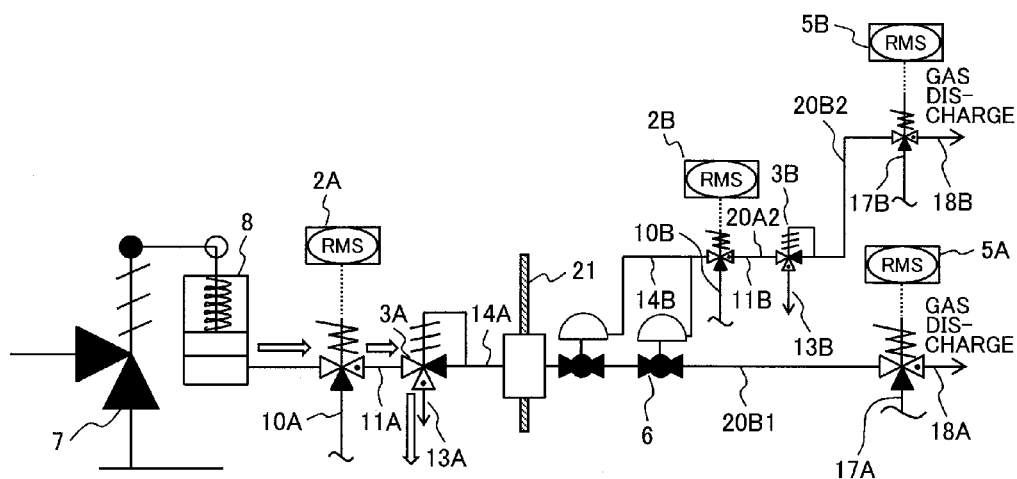
FIG. 25 is a diagram to show a gas discharge state at the time of the normal operation in the embodiment 5 of the gas supply apparatus of the present invention.
Figure 34:
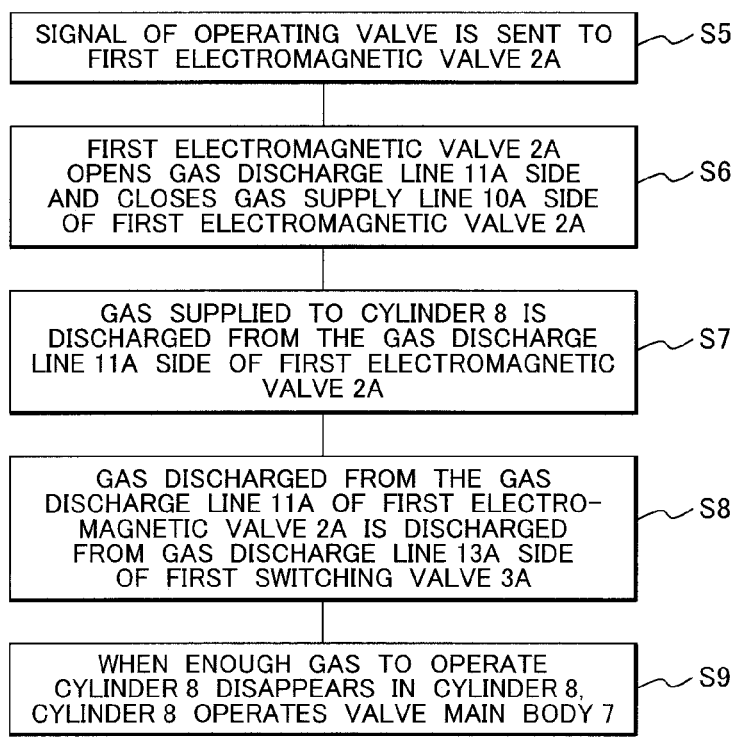
FIG. 34 is a flow chart to show a flow of a gas discharge state at the time of the normal operation of the gas supply apparatus shown in FIG. 25.

FIG. 25 and FIG. 34 show a state and a flow when the gas supply apparatus of the present embodiment discharges the gas at the time of the normal operation.

As shown in the drawings, when the valve main body 7 is returned to the standby state, a signal is sent to the first electromagnetic valve 2A (step 5), whereby the first electromagnetic valve 2A opens the gas discharge line 11A side and closes the gas supply line 10A side (step 6). Then, the gas supplied to the cylinder 8 discharged from the gas discharge line 11A side of the first electromagnetic valve 2A (step 7), and the gas discharged from the discharge line 11 side of the first electromagnetic valve 2A is discharged from a gas discharge line 13A (connected to a connection port E of the first switching valve 3A shown in FIG. 18 to FIG. 22) side of the first switching valve 3A1 (step 8). When the enough gas to operate the cylinder 8 disappears in the cylinder 8, the cylinder operates the valve main body 7 (step 9), whereby the valve main body 7 is returned to the standby state. As an example, when the valve main body 7 is on standby, the valve main body 7 is closed, whereas when the valve main body 7 is operated, the valve main body 7 is opened. However, the valve main body 7 can be operated in a manner opposite to this.

FIG. 26 shows a standby state of the first electromagnetic valve 2A of the present embodiment at the time of a severe accident such as a loss of power source.

As shown in the drawing, at the time of a severe accident such as a station blackout, the first electromagnetic valve 2A is brought by the loss of power source into a state in which the gas discharge line 11A side is opened, and the first electromagnetic valve 2A is on standby in a state in which the first electromagnetic valve 2A cannot be operated from the outside.

Figure 27:
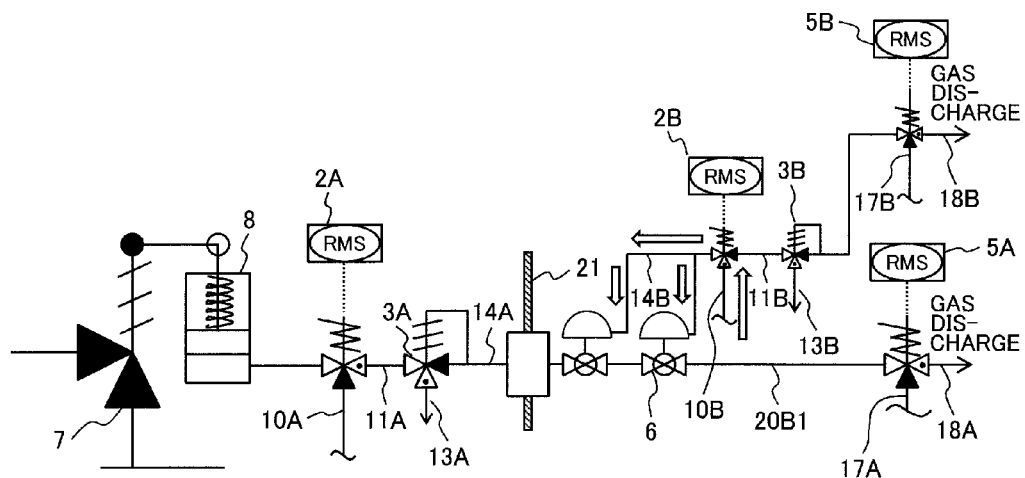
FIG. 27 is a diagram to show a state in which an isolation valve is opened by the use of a third gas supply source in the embodiment 5 of the gas supply apparatus of the present invention.
Figure 28:
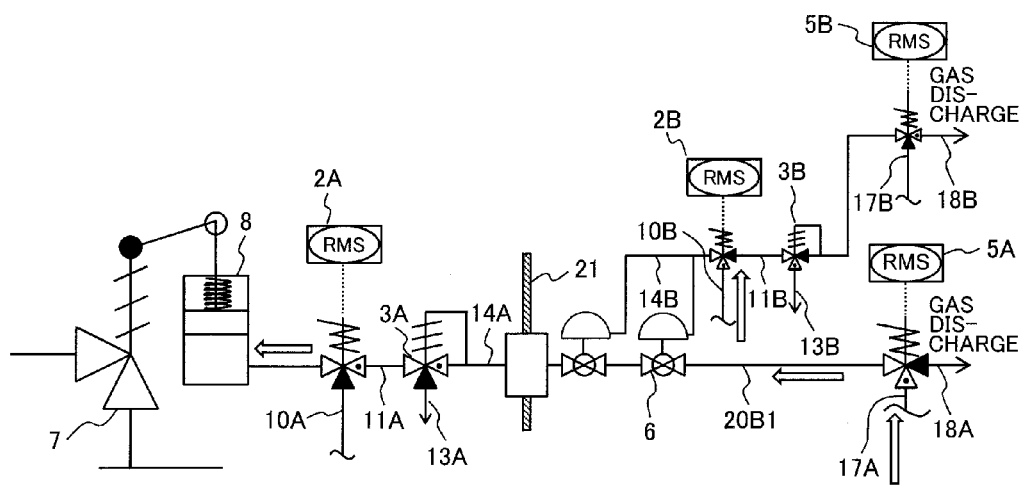
FIG. 28 is a diagram to show a gas supply state when the isolation valve is opened by the use of the third gas supply source in the embodiment 5 of the gas supply apparatus of the present invention.
Figure 35:
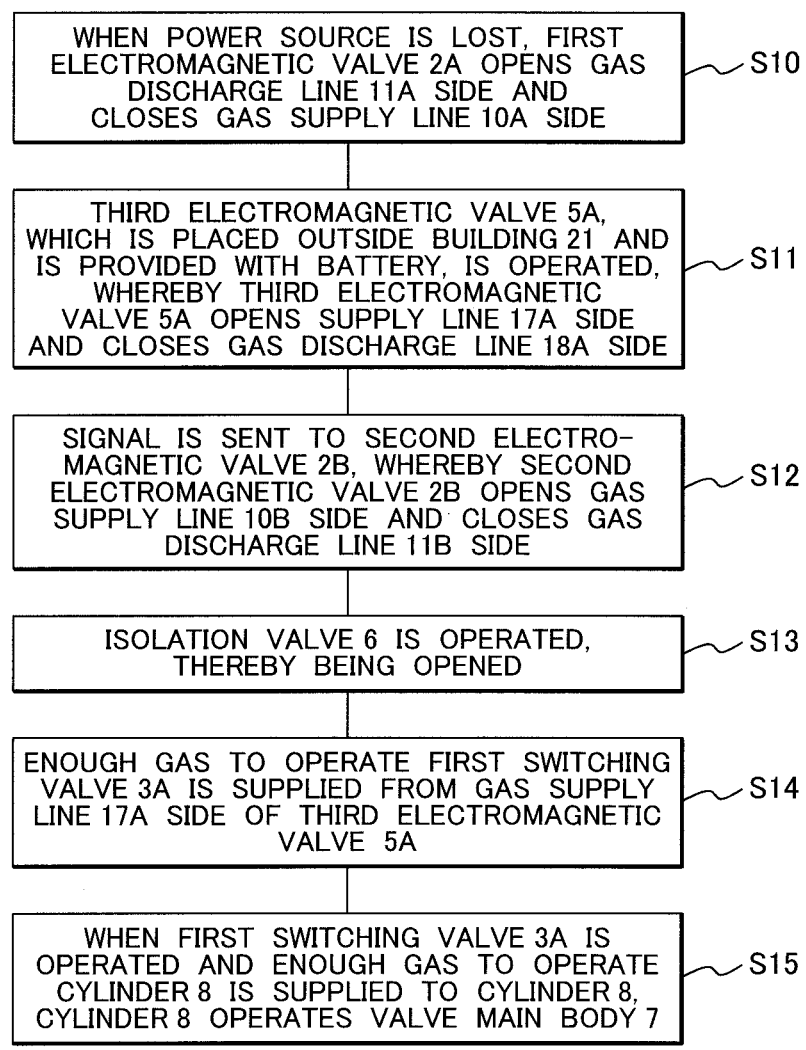
FIG. 35 is a flow chart to show a flow of a gas supply state when the power source is lost in the gas supply apparatus shown in FIG. 27 and FIG. 28.

FIG. 27, FIG. 28, and FIG. 35 show a state and a flow when the first electromagnetic valve 2A of the present embodiment supplies the gas at the time of a severe accident such as the loss of power source.

As shown in the drawings, when the power source is lost, the first electromagnetic valve 2A is brought into a state in which the gas discharge line 11A (connected to a connection port A of the first switching valve 3A shown in FIG. 18 to FIG. 22) side is opened and in which the gas supply line 10A side is closed (step 10). In order to operate the cylinder 8 from the outside, a gas supply line 17A side of the third electromagnetic valve 5A, which is placed outside the building 21 and has a battery as a driving source, is opened and a gas discharge line 18A side of the third electromagnetic valve 5A is closed (step 11).

Next, similarly, a signal is sent to the second electromagnetic valve 2B to thereby bring the second electromagnetic valve 2B into a state in which a gas supply line 10B side is opened and in which a gas discharge line 11B (connected to a connection port A of the second switching valve 3B shown in FIG. 18 to FIG. 22) side is closed (step 12), whereby the supplied gas operates the cylinder of the isolation valve 6 to thereby open the isolation valve 6 (step 13).

Enough gas to operate the first switching valve 3A is supplied from a gas supply line 17A (connected to a connection port P of the first switching valve 3A shown in FIG. 18 to FIG. 22) side of the third electromagnetic valve 5A (step 14). By the supplied gas, the first switching valve 3A closes a gas discharge line 13A (a connection port E of the first switching valve 3A shown in FIG. 18 to FIG. 22) side and opens a gas supply line 14A (the connection port P of the first switching valve 3A shown in FIG. 18 to FIG. 22). Then, the gas supplied from the outside of the building 21 passes through the gas supply line 14A (connected to the connection port P of the first switching valve 3A shown in FIG. 18 to FIG. 22) of the first switching valve 3A and the gas discharge line 11A (connected to the connection port A of the first switching valve 3A shown in FIG. 18 to FIG. 22) of the first electromagnetic valve 2A and reaches the cylinder 8, whereby a gas pressure high enough to operate the valve main body 7 is charged into the cylinder 8 and hence the valve main body 7 is operated (step 15).

Figure 29:
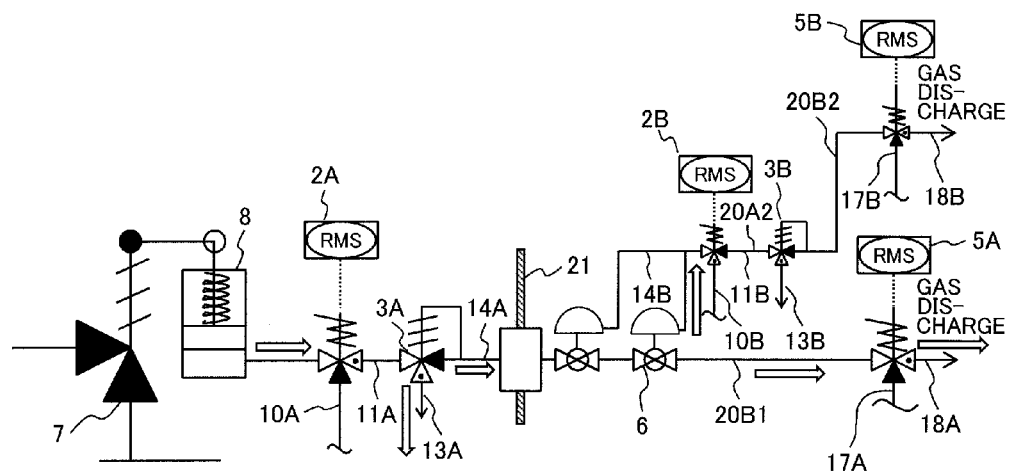
FIG. 29 is a diagram to show a gas discharge state when the isolation valve is opened by the use of the third gas supply source in the embodiment 5 of the gas supply apparatus of the present invention.
Figure 36:
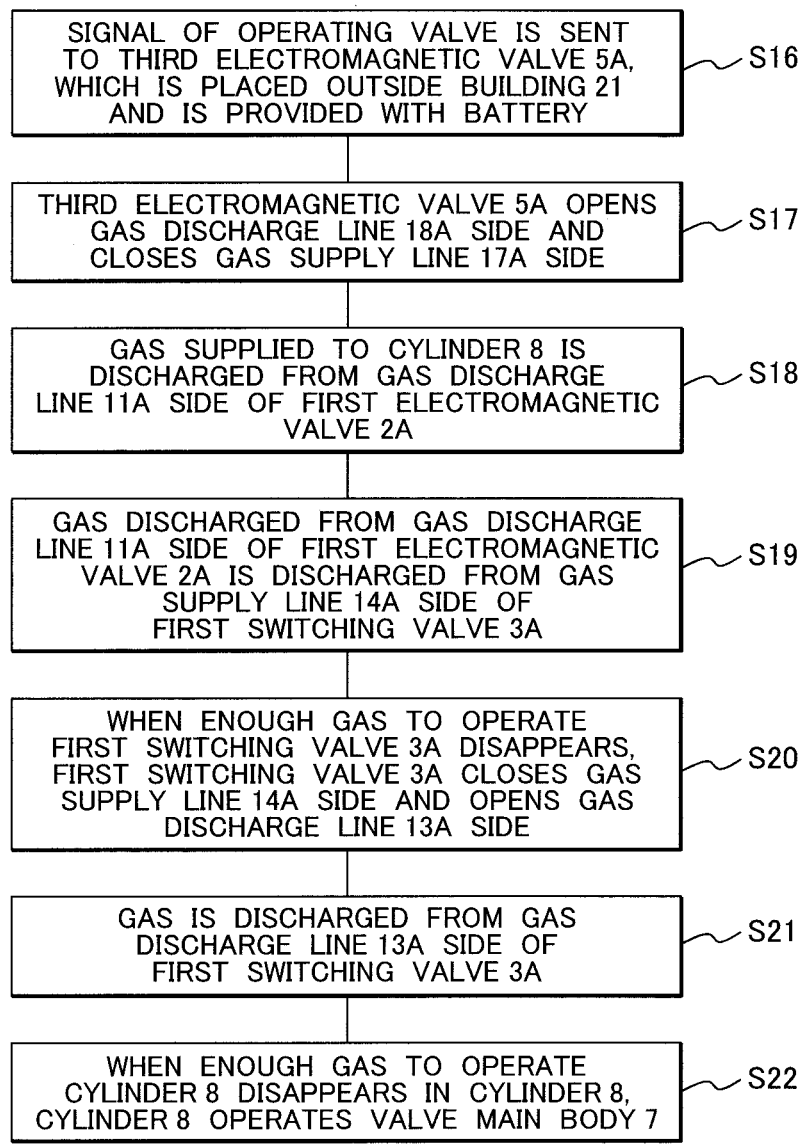
FIG. 36 is a flow chart to show a flow of a gas discharge state when the power source is lost in the gas supply apparatus shown in FIG. 29.

FIG. 29 and FIG. 36 show a state and a flow when the first electromagnetic valve 2A of the present embodiment discharges the gas at the time of a severe accident such as the loss of power source.

As shown in the drawings, a signal of operating a valve is sent to the third electromagnetic valve 5A, which is placed outside the building 21 and has a battery as a driving source (step 16). In a case in which the valve main body 7 is returned to the standby state, the third electromagnetic valve 5A outside the building 21 opens a gas discharge line 18A side and closes a gas supply line 17A side (step 17). Then, the gas supplied to the cylinder 8 is discharged from the gas discharge line 11A side of the first electromagnetic valve 2A (step 18), and the gas discharged from the gas discharge line 11A (connected to a connection port A of the first switching valve 3A shown in FIG. 18 to FIG. 22) of the first electromagnetic valve 2A is passed through the gas supply line 14A (connected to the connection port P of the first switching valve 3A shown in FIG. 18 to FIG. 22) of the first switching valve 3A and the gas discharge line 18A of the third electromagnetic valve 5A placed outside the building 21 and is discharged (step 19). When the enough gas to operate the first switching valve 3A disappears, the first switching valve 3A closes the gas supply line 14A (connected to the connection port P of the first switching valve 3 shown in FIG. 18 to FIG. 22) side and opens the gas discharge line 13A (connected to the connection port E of the first switching valve 3A shown in FIG. 18 to FIG. 22) side (step 20). Then, the gas remaining in the cylinder 8 is discharged from the gas discharge line 11A side of the first electromagnetic valve 2A and is discharged into the building 21 from the gas discharge line 13A (connected to the connection port E of the first switching valve 3A shown in FIG. 18 to FIG. 22) of the first switching valve 3A (step 21). When the enough gas to operate the cylinder 8 disappears in the cylinder 8, the cylinder 8 operates the valve main body 7 (step 22), whereby the valve main body 7 is returned to the standby state. As an example, when the valve main body 7 is on standby, the valve main body 7 is closed, whereas when the valve main body 7 is operated, the valve main body 7 is opened. However, the valve main body 7 can be operated in a manner opposite to this.

FIG. 26 shows a standby state of the gas supply apparatus of the present embodiment at the time of a severe accident such as a station blackout.

Figure 30:
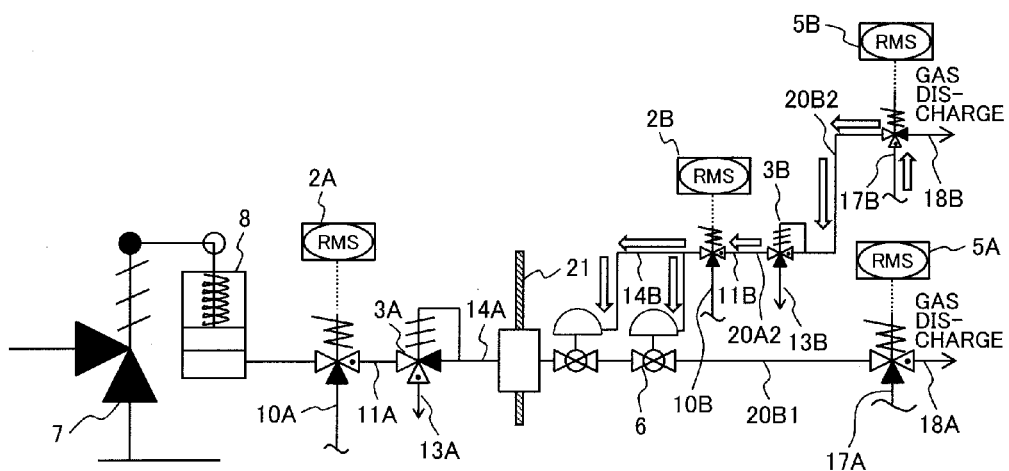
FIG. 30 is a diagram to show a state in which: the second switching valve is switched to a gas supply side by the use of a fourth gas supply source; and the isolation valve is opened in the embodiment 5 of the gas supply apparatus of the present invention.
Figure 31:
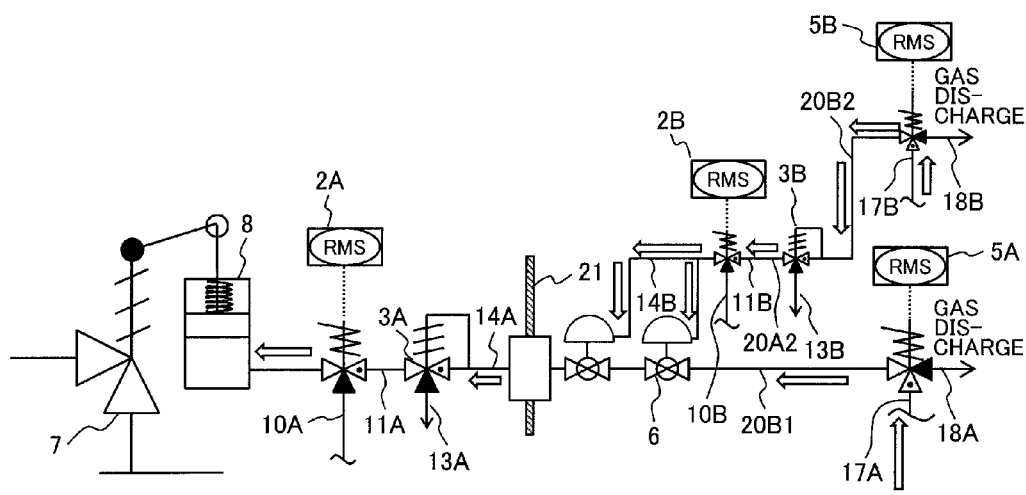
FIG. 31 is a diagram to show a gas supply state when: the second switching valve is switched to a gas supply side by the use of the fourth gas supply source; and the isolation valve is opened in the embodiment 5 of the gas supply apparatus of the present invention.
Figure 37:
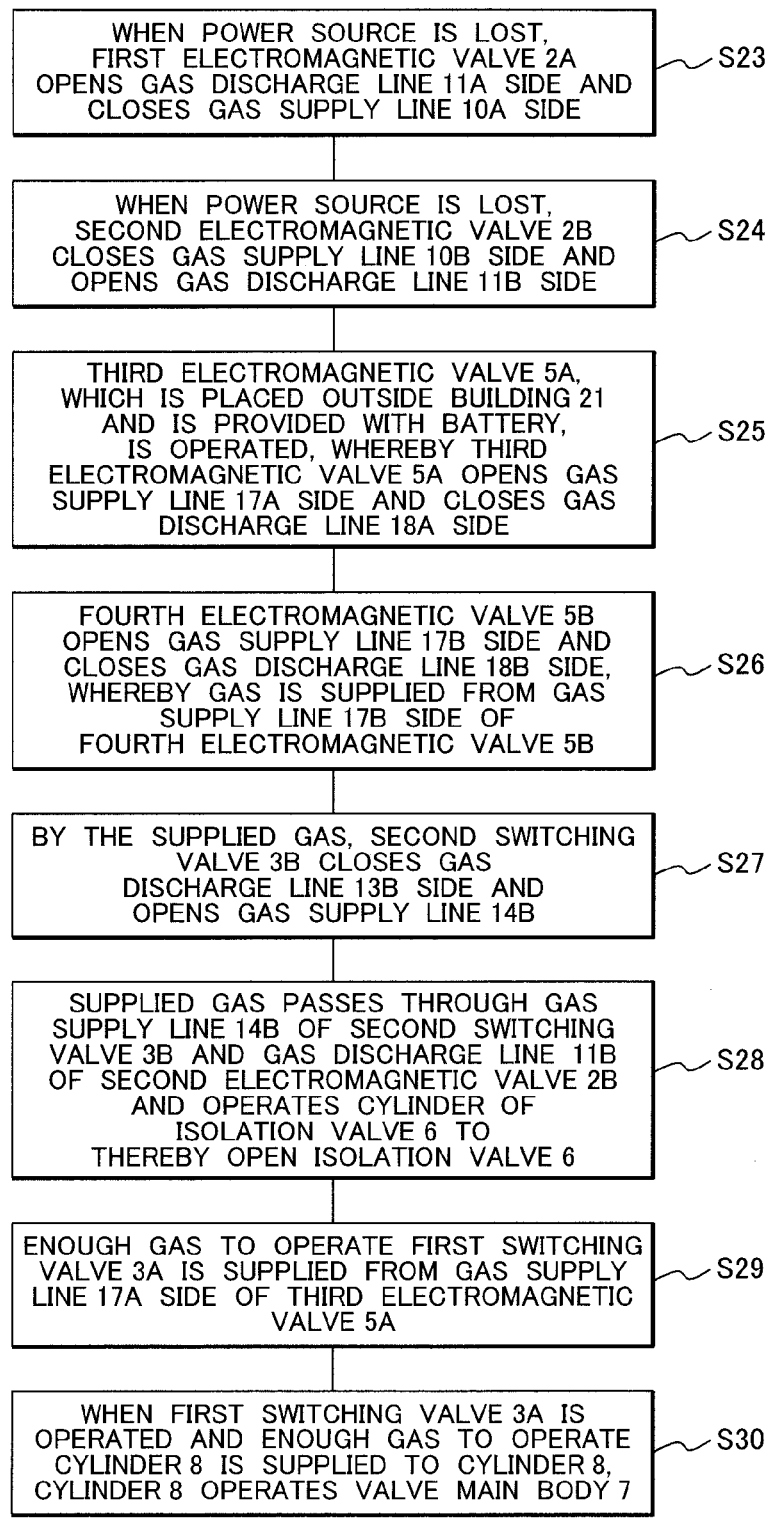
FIG. 37 is a flow chart to show a flow of a gas supply state when the power source is lost in the isolation valve shown in FIG. 30 and FIG. 31.

As shown in the drawing, at the time of the severe accident such as the station blackout, the first electromagnetic valve 2A is brought by the loss of power source into a state in which the gas discharge line 11A side is opened, whereby the first electromagnetic valve 2A is on standby in a state in which the first electromagnetic valve 2A cannot be operated from the outside. Similarly, the second electromagnetic valve 2B is brought into a state in which the gas discharge line 11B side is opened, whereby the second electromagnetic valve 2B waits in a state in which the second electromagnetic valve 2B cannot be operated from the outside. FIG. 30, FIG. 31, and FIG. 37 show a state and a flow when the gas supply apparatus of the present embodiment supplies the gas at the time of a severe accident.

As shown in the drawings, when the power source is lost, the first electromagnetic valve 2A is brought into a state in which the gas discharge line 11A (connected to the connection port A of the first switching valve 3A shown in FIG. 18 to FIG. 22) side is opened and in which the gas supply line 10A side is closed (step 23). Similarly, when the power source is lost, the second electromagnetic valve 2B is brought into a state in which a gas supply line 10B (connected to the connection port P of the first switching valve 3A shown in FIG. 18 to FIG. 22) side is closed and in which the gas discharge line 11B side is opened (step 24). In order to operate the valve main body 7 from the outside, the gas supply line 17A side of the third electromagnetic valve 5A, which is placed outside the building 21 and has the battery as the driving source, is opened and the gas discharge line 18A side of the third electromagnetic valve 5A is closed (step 25).

Next, the fourth electromagnetic valve 5B having a power source such as a battery, which is different from the power source of the first electromagnetic valve 1A, as a driving source opens a gas supply line 17B side and closes a gas discharge line 18B side, whereby the enough gas to operate the second switching valve 3B is supplied from the gas supply line 17B (connected to the connection port P of the first switching valve 3A shown in FIG. 18 to FIG. 22) side of the fourth electromagnetic valve 5B (step 26). By the supplied gas, the second switching valve 3B closes a gas discharge line 13B (the connection port E of the first switching valve 3A shown in FIG. 18 to FIG. 22) side and opens a gas supply line 14B (the connection port P of the first switching valve 3A shown in FIG. 18 to FIG. 22) (step 27). Then, the supplied gas passes through the gas supply line 14B (connected to the connection port P of the first switching valve 3A shown in FIG. 18 to FIG. 22) of the second switching valve 3B and the gas discharge line 11B (connected to the connection port A of the first switching valve 3A shown in FIG. 18 to FIG. 22) of the second electromagnetic valve 2B and operates the cylinder of the isolation valve 6 to thereby open the isolation valve 6 (step 28), whereby the enough gas to operate the first switching valve 3A is supplied from the gas supply line 17A (connected to the connection port P of the first switching valve 3A shown in FIG. 18 to FIG. 22) of the third electromagnetic valve 5A (step 29). By the supplied gas, the first switching valve 3A closes the gas discharge line 13A (the connection port E of the first switching valve 3A shown in FIG. 18 to FIG. 22) side and opens the gas supply line 14A (the connection port P of the first switching valve 3A shown in FIG. 18 to FIG. 22) side. Then, the gas supplied from the outside of the building 21 passes through the gas supply line 14A (connected to the connection port P of the first switching valve 3A shown in FIG. 18 to FIG. 22) side of the first switching valve 3A and the gas discharge line 11A (connected to the connection port A of the first switching valve 3A shown in FIG. 18 to FIG. 22) of the first electromagnetic valve 2A and reaches the cylinder 8. Then, an air pressure high enough to operate the valve main body 7 is charged into the cylinder 8 and hence the cylinder 8 operates the valve main body 7 (step 30).

Figure 32:
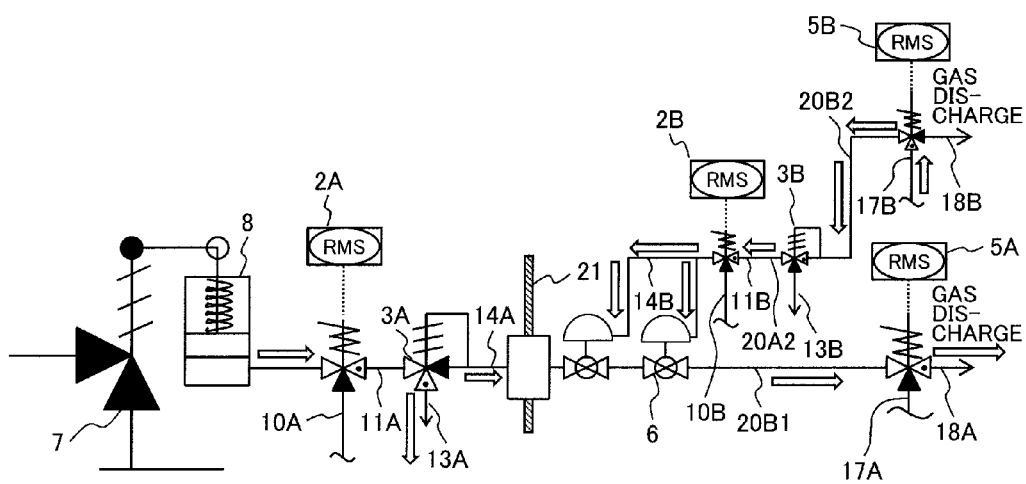
FIG. 32 is a diagram to show a gas discharge state when: the second switching valve is switched to the gas supply side by the use of the fourth gas supply source; and the isolation valve is opened in the embodiment 5 of the gas supply apparatus of the present invention.
Figure 38:
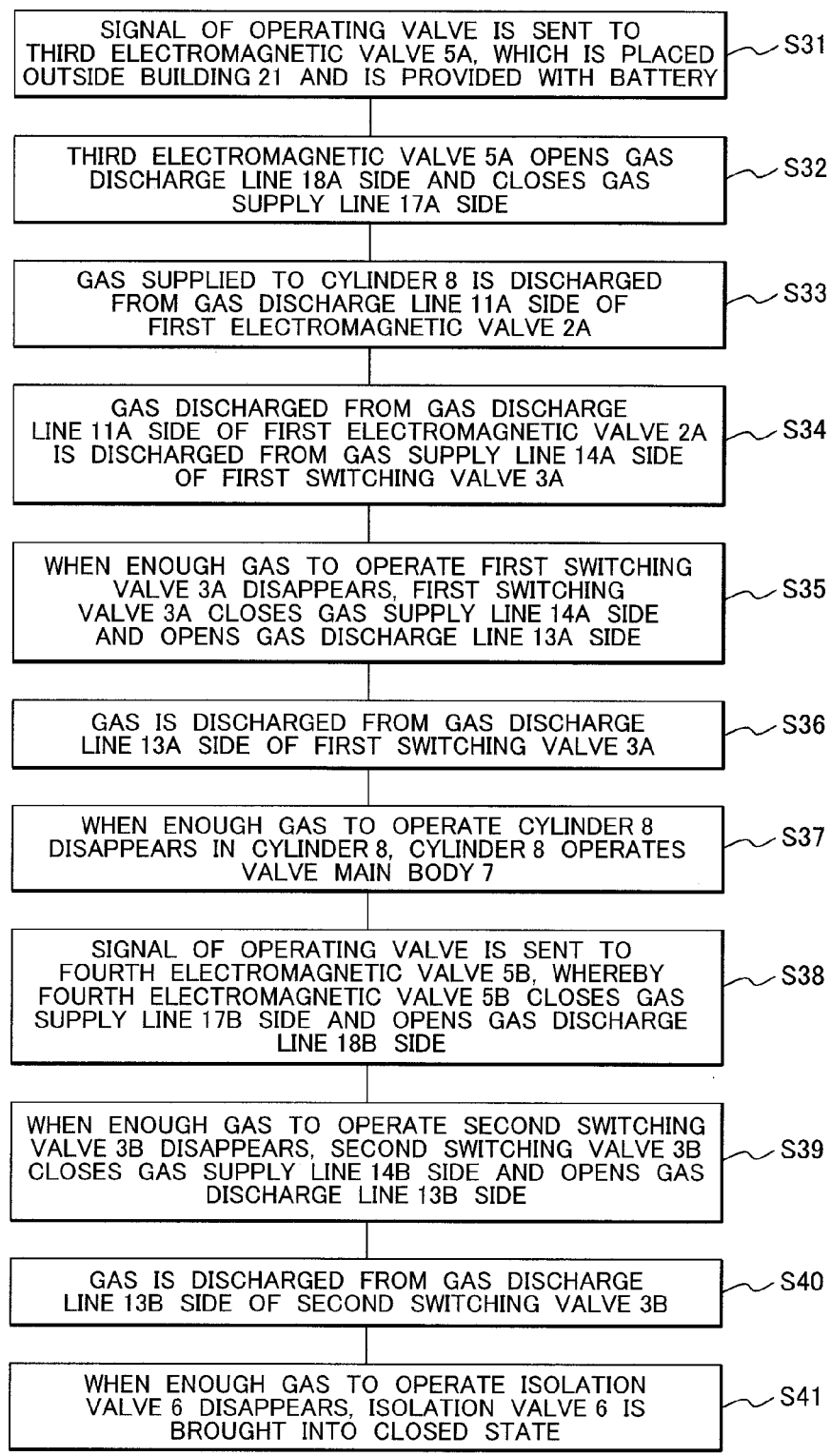
FIG. 38 is a flow chart to show a flow of a gas discharge state when the power source is lost in the isolation valve shown in FIG. 32.

FIG. 32 and FIG. 38 show a state and a flow when the gas supply apparatus of the present embodiment discharges the gas at the time of a severe accident.

As shown in the drawings, a signal of operating a valve is sent to the third electromagnetic valve 5A, which is placed outside the building 21 and has a battery as a driving source (step 31). In a case in which the valve main body 7 is returned to the standby state, the third electromagnetic valve 5A placed outside the building 21 opens a gas discharge line 18A side and closes a gas supply line 17A side (step 32). Then, the gas supplied to the cylinder 8 is discharged from the gas discharge line 11A side of the first electromagnetic valve 2A (step 33), and the gas discharged from the gas discharge line 11A (connected to the connection port A of the first switching valve 3A shown in FIG. 18 to FIG. 22) of the first electromagnetic valve 2A is passed through the gas supply line 14A (connected to the connection port P of the first switching valve 3A shown in FIG. 18 to FIG. 22) side of the first switching valve 3A and the gas discharge line 18A of the third electromagnetic valve 5A placed outside the building 21 and is discharged (step 34). When the enough gas to operate the first switching valve 3A disappears, the first switching valve 3A closes the gas supply line 14A (connected to the connection port P of the first switching valve 3A shown in FIG. 18 to FIG. 22) side and opens the gas discharge line 13A side (connected to the connection port E of the first switching valve 3A shown in FIG. 18 to FIG. 22) (step 35). Then, the gas remaining in the cylinder 8 is discharged from the gas discharge line 11A side of the first electromagnetic valve 2A and is discharged into the building 21 from the gas discharge line 13A (connected to the connection port E of the first switching valve 3A shown in FIG. 18 to FIG. 22) of the first switching valve 3A (step 36). When the enough gas to operate the cylinder 8 disappears in the cylinder 8, the cylinder 8 operates the valve main body 7 (step 37).

Next, a gas supply line 17B side of the fourth electromagnetic valve 5B having a power source such as a battery, which is different from the power source of the first electromagnetic valve 2A, as a driving source is closed and a gas discharge line 18 side of the fourth electromagnetic valve 5B is closed (step 38). When the enough gas to operate the second switching valve 3B disappears, the second switching valve 3B closes the gas supply line 14B (the connection port E of the first switching valve 3A shown in FIG. 18 to FIG. 22) side and opens the gas discharge line 13B (the connection port P of the first switching valve 3A shown in FIG. 18 to FIG. 22) (step 39). Then, the gas supplied to the cylinder 8 is passed through the gas discharge line 11B (connected to the connection port A of the first switching valve 3A shown in FIG. 18 to FIG. 22) of the second electromagnetic valve 2B and the gas discharge line 11B (connected to the connection port P of the first switching valve 3 shown in FIG. 18 to FIG. 22) of the second switching valve 3B and is discharged (step 40), whereby the isolation valve 6 is operated and closed (step 41). In this way, the isolation valve 6 is returned to a standby state. As an example, when the valve isolation valve 6 is on standby, the isolation valve 6 is closed, whereas when the isolation valve 6 is operated, the isolation valve 6 is opened. However, the isolation valve 6 can be operated in a manner opposite to this.

In this way, in the present embodiment, the piping 20A1 on the gas discharge line 11A side of the first electromagnetic valve 2A has the first switching valve 3A connected in the middle thereof, and when the power source is lost, the gas of air or nitrogen is supplied from the bomb 4A from the outside of the building 21, and in a case in which the first electromagnetic valve 2A cannot be operated because of the loss of the power source, the power source of the second electromagnetic valve 2B is turned on by a second power source to thereby open the isolation valve 6. Hence, the first switching valve 3A can be supplied with the gas from the bomb 4A.

Further, in a case in which also the second power source of the second electromagnetic valve 2B is lost, the fourth electromagnetic valve 5B is opened to thereby supply the second switching valve 3B with gas from the bomb 4B, whereby the second switching valve 3B is switched from the gas discharge side to the gas supply side. Hence, air is supplied to the air cylinder of the isolation valve 6 through the second electromagnetic valve 2B to thereby open the isolation valve 6. When the isolation valve 6 is opened, the first switching valve 3A can be supplied with the air or nitrogen for control through the isolation valve 6 via the third electromagnetic valve 5A from the bomb 4A of the second gas supply source which is placed outside the building 21 and in which air or nitrogen is stored. When the first switching valve 3A is supplied with the air or nitrogen for control, the first switching valve 3A connected to the gas discharge side at the time of the normal operation is switched to the gas supply side. Hence, when the power source is lost, the first electromagnetic valve 2A can be supplied with the air or nitrogen for control.

Further, the pressure at which the first switching valve 3A is switched is made sufficiently higher than the pressure in the building 21, so that during a period in which the first switching valve 3A is operated, the atmosphere in the building 21 is not made to flow to the outside of the building 21 via the third electromagnetic valve 5A.

Hence, it is possible to produce an effect such that even when the power source is lost, an operating valve such as the air-operated valve can be controlled remotely and that even when the second power source for controlling the isolation valve 6 is lost, the isolation valve can operated and hence the gas can be sent to the air-operated valve actuator 1. Further, by making the second electromagnetic valve 2B, the third electromagnetic valve 5A or the fourth electromagnetic valve 5B different in the kind of power source (alternating current power source or direct current power source) from the first electromagnetic valve 2A used in the normal operation, it is possible to produce also an effect of diversifying the driving source.

In this regard, when a unit for supplying the first switching valve 3A or the second switching valve 3B with the air or nitrogen is provided with a power source (for example, battery) different from the power source in the building 21, the unit can be improved in safety. However, as an additional backup, the unit may supply the first switching valve 3A or the second switching valve 3B with the air or nitrogen also by a manual valve.

The construction of the present embodiment can produce an effect such that even when a power source is lost, an operating valve such as the air-operated valve can be not only remotely operated but also safely operated by a remote operator.

[Embodiment 6]

Figure 39:
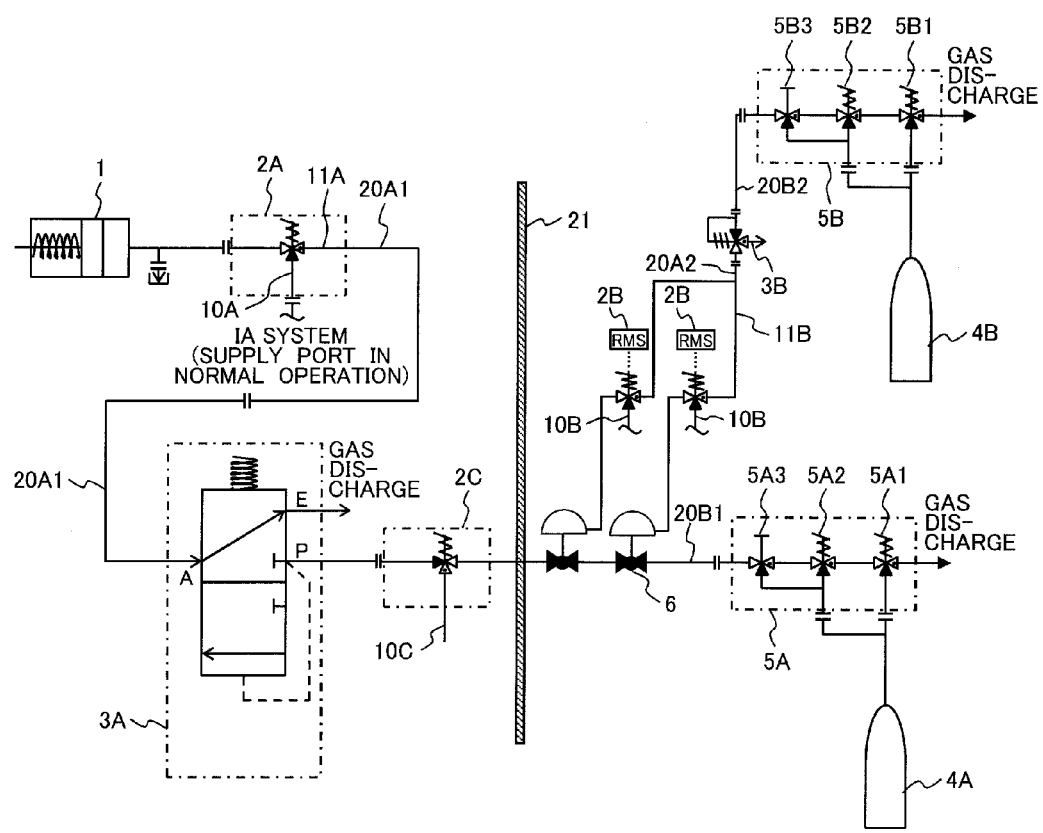
FIG. 39 is a diagram to show an embodiment 6 of a gas supply apparatus of the present invention and a state in which: a first switching valve is connected to a gas discharge side of a first electromagnetic valve; a fifth electromagnetic valve is provided between the first switching valve and an isolation valve; and the isolation valve is closed.

In FIG. 39 is shown an embodiment 6 of a gas supply apparatus of the present invention. In the embodiment shown in the drawing, a piping in a building 21 between a first switching valve 3A in the building 21 and an isolation valve 6 placed outside the building 21 has a fifth electromagnetic valve 2C placed therein. The fifth electromagnetic valve 2C opens a gas supply line 10C side and closes a first switching valve 3A side at the time of a normal operation, whereas when a power source is lost, the fifth electromagnetic valve 2C opens the first switching valve 3A side and closes the gas supply line 10C side. The other construction is the same as the embodiment 5.

The construction of the present embodiment can produce not only the same effect as the embodiment 5 but also an effect capable of preventing an unintended operation (incorrect operation) at the time of the normal operation.

[Embodiment 7]

Figure 40:
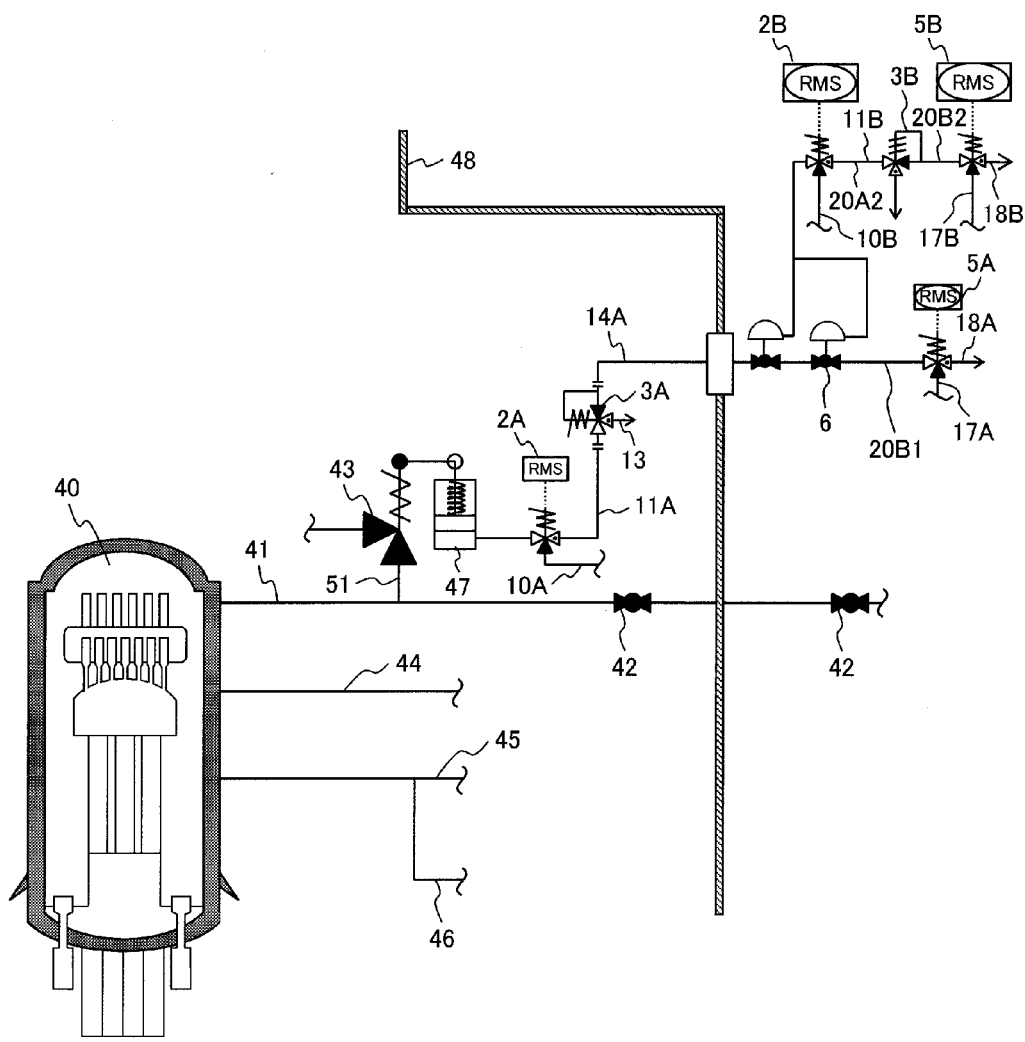
FIG. 40 is a diagram to show an air or nitrogen supply apparatus of a nuclear plant that is an embodiment 7 of the present invention.

In FIG. 40 is shown an air or nitrogen supply apparatus of a nuclear plant of an embodiment 7 of the present invention.

As shown in the drawing, the air or nitrogen supply apparatus of a nuclear plant of the present embodiment is provided with and roughly constructed of: a main steam relief safety valve 43; a forcible operating cylinder 47; a first electromagnetic valve 2A; and a first air or nitrogen supply source and a second air or nitrogen supply source (although not shown particularly in the drawing, a high-pressure gas accumulator, the same bomb 4 as in the embodiment 1, or a unit for vaporizing liquefied nitrogen to supply a nitrogen gas). The main steam relief safety valve 43 is placed in a piping 51 branched from a main steam piping 41 for supplying a turbine building (not shown in the drawing) with steam from a reactor pressure vessel 40 contained in a reactor container 48. When pressure in a nuclear reactor is made not less than a specified value, the main steam relief safety valve 43 is opened to thereby relieve main steam in the main steam piping 41. The forcible operating cylinder 47 supplies the main steam relief safety valve 43 with air or nitrogen as a driving force so as to forcibly open the main steam relief safety valve 43. The first electromagnetic valve 2A opens or closes a flow of the air or nitrogen to the forcible operating cylinder 47. The first air or nitrogen supply source and the second air or nitrogen supply source independently supply the air or nitrogen to a gas supply port and a gas discharge port of the first electromagnetic valve 2A via a piping and are placed outside the reactor container 48.

In the present embodiment, a gas discharge line 11A of the first electromagnetic valve 2A in the reactor container 48 has a first switching valve 3A placed therein. The first switching valve 3A switches between a gas discharge from the first electromagnetic valve 2A and a gas supply to the first electromagnetic valve 2A. When a power source is lost, in order to supply the first electromagnetic valve 2A with air or nitrogen, the first switching valve 3A is switched to the second air or nitrogen supply source (in particular, not shown in the drawing, bomb 4A) placed outside the reactor container 48 via a gas supply line 17A of the third electromagnetic valve 5A, the isolation valve 6, and a gas discharge line 11A of the first electromagnetic valve 2A.

Further, the isolation valve 6 described above is provided with a second electromagnetic valve 2B. When the first electromagnetic valve 2A cannot be operated, the second electromagnetic valve 2B is operated by a second power source different from the power source at the time of a normal operation to thereby open the isolation valve 6, whereby the first switching valve 3A is supplied with air or nitrogen from the second air or nitrogen supply source (bomb 4A). Still further, the flow of the air or nitrogen from the second air or nitrogen supply source (bomb 4A) is opened or closed by a third electromagnetic valve 5A placed in an extension of a piping 20B1 having the isolation valve 6 placed therein. Still further, an extension of a piping 20A2, 20B2 having the second electromagnetic valve 2B placed therein is provided with a second switching valve 3B and a fourth electromagnetic valve 5B which opens and closes the flow of gas from a third air or nitrogen supply source (bomb 4B). When a second power source is lost, the fourth electromagnetic valve 5B is opened to thereby supply air or nitrogen from the third air or nitrogen supply source (bomb 4B). Then, the second switching valve 3B is switched from a gas discharge to a gas supply to thereby operate the second electromagnetic valve 2B, whereby the isolation valve 6 is opened.

In other words, at the time of the normal operation, the isolation valve 6 can be operated by the gas supplied from the second air or nitrogen supply source (bomb 4A) by the use of the second power source. However, when the second power source is lost, the gas is supplied to the second switching valve 3B from the fourth electromagnetic valve 5B connected to a gas supply line 17B of the third gas supply source (bomb 4B) to thereby switch the second switching valve 3B to a gas discharge line 11B side of the second electromagnetic valve 2B, whereby the gas can be supplied to the isolation valve 6 to thereby open/close the isolation valve 6. When the isolation valve 6 is opened, the air or nitrogen for control can be supplied to the first switching valve 3A through the isolation valve 6 via the third electromagnetic valve 5A from the second air or nitrogen gas supply source (bomb 4A) which is placed outside the building 21 and in which air or nitrogen is stored (see FIG. 21 and FIG. 22).

In this way, a gas passage of P⇔A is formed in the first switching valve 3A (see FIG. 20 and FIG. 22) and a passage of the air or nitrogen for control from the bomb 4A to the forcible operating cylinder 47 via the third electromagnetic valve 5A, the isolation valve 6, the first switching valve 3A, the first electromagnetic valve 2A can be secured, whereby the main steam relief safety valve 43 is operated.

The second air or nitrogen supply source and the third air or nitrogen supply source (bomb 4A and bomb 4B), similarly to the embodiment 5, are connected via the third electromagnetic valve 5A and the fourth electromagnetic valve 5B, which are placed in the piping 20B1 and the piping 20A2 placed outside the reactor container 48. Each of the third electromagnetic valve 5A and the fourth electromagnetic valve 5B is constructed of a single valve or a plurality of valves among three valves which are operated respectively by an alternating current power source or a direct current power source, a direct current power source (for example, a battery), and a manual force, and the operations of the third electromagnetic valve 5 and the fourth electromagnetic valve 5B are the same as the embodiment 5.

Further, as described above, the isolation valve 6 for preventing a leak to the gas supply side of the first switching valve 3A is placed in the middle of the piping 20B1 on the bomb 4A side of the first switching valve 3A and outside the reactor container 48 and hence is constructed in such a way as to prevent a leak to the gas supply side of the first switching valve 3A.

In the present embodiment, usually, steam is supplied from the reactor pressure vessel 40 to the turbine building through the main steam piping 41. However, when a nuclear power plant detects an accident such as an earthquake, in order to prevent a LOCA (Loss Of Coolant Accident) from being caused by a break in piping, a main steam isolation valve 42 placed in the main steam piping 41 is closed. At that time, temperature in the nuclear reactor is continuously increased by a decay heat of a nuclear fuel and also pressure in the nuclear reactor is increased with the steam being generated. In a case in which the pressure in the nuclear reactor is made not less than a specified value, a main steam relief safety valve 43 placed in a piping 51 branched from the main steam piping 41 is operated to reduce the pressure in the nuclear reactor. At that time, the first switching valve 3A does not have an effect on the operation of the main steam relief safety valve 43.

The cooling of the nuclear reactor is performed by a high pressure reactor core spray system 44 or a low pressure reactor core spray system 45. However, it is desired that when a station blackout (SBO) is caused, the nuclear reactor can be cooled by water sprayed from an outside spray line 46 by an emergency pump vehicle.

At that time, in a case in which the pressure in the nuclear reactor is higher than the pressure of the water spray, the pressure in the nuclear reactor needs to be reduced. However, a safety valve function of the main steam relief safety valve 43 described above is not operated before the pressure in the nuclear reactor becomes a specified value, so that the main steam relief safety valve 43 needs to be forcibly opened by the use of a relief valve function of the main steam relief safety valve 43.

Here, the relief valve function of the main steam relief safety valve 43 is a function of supplying gas such as nitrogen or compressed air accumulated in an accumulator to the forcible operating cylinder 47 of the main steam relief safety valve 43 to thereby open the main steam relief safety valve 43.

In the present embodiment, when a severe accident such as a station blackout is caused, the first electromagnetic valve 2A for supplying the main steam relief safety valve 43 with compressed air or compressed nitrogen cannot be operated either and is on standby with a gas discharge side opened. Then, the first switching valve 3A is connected to the gas discharge line 11A side of the first electromagnetic valve 2A and is supplied with the control air of nitrogen via the isolation valve 6 from the air or nitrogen supply source such as the bomb 4A placed outside the reactor container 48. Then, the first switching valve 3A connected to a gas discharge side at the time of the normal operation is switched to a gas supply side to thereby supply the air or nitrogen for operation to the first electromagnetic valve 2A. In this way, even when the power source is lost, the forcible operating cylinder 47 for operating the main steam relief safety valve 43 can be supplied with the air or nitrogen and hence can be operated.

Further, in a case in which the first electromagnetic valve 2A cannot be operated because of the loss of power source or the like, the power source of the second electromagnetic valve 2B is turned on by the second power source to thereby open the isolation valve 6 described above, whereby the first switching valve 3A can be supplied with gas from the bomb 4A of the second air or nitrogen supply source. However, in the case in which also the second power source is lost, the fourth electromagnetic valve 5B is opened to supply the gas to the second switching valve 3B. Then, the second switching valve 3B is switched from a gas discharge side to a gas supply side, whereby the air or nitrogen can be supplied to the air cylinder of the isolation valve 6 via the second electromagnetic valve 2B.

In this way, the isolation valve 6 can be opened and hence the air or nitrogen for control can be supplied to the first switching valve 3A through the isolation valve 6 via the third electromagnetic valve 5A from the bomb 4A of the second air or nitrogen supply source which is placed outside the building 21 and in which the air or nitrogen is stored. Then, the first switching valve 3A connected to the gas discharge side at the time of the normal operation is switched to the gas supply side to thereby supply the air or nitrogen for control to the first electromagnetic valve 2A, whereby even when the first power source and the second power source are lost, the forcible operating cylinder 47 for operating the main steam relief safety valve 43 can be supplied with the air or nitrogen and hence can be operated.

In this way, even when the power source is lost, the main steam relief safety valve 43 can be operated, so that the pressure of the reactor pressure vessel 40 is relieved to a connection line of a suppression chamber, thereby being reduced. Since the pressure of the reactor pressure vessel 40 is reduced, water can be sprayed from the outside spray line 46 and hence the nuclear reactor can be stopped in low temperatures.

[Embodiment 8]

Figure 41:
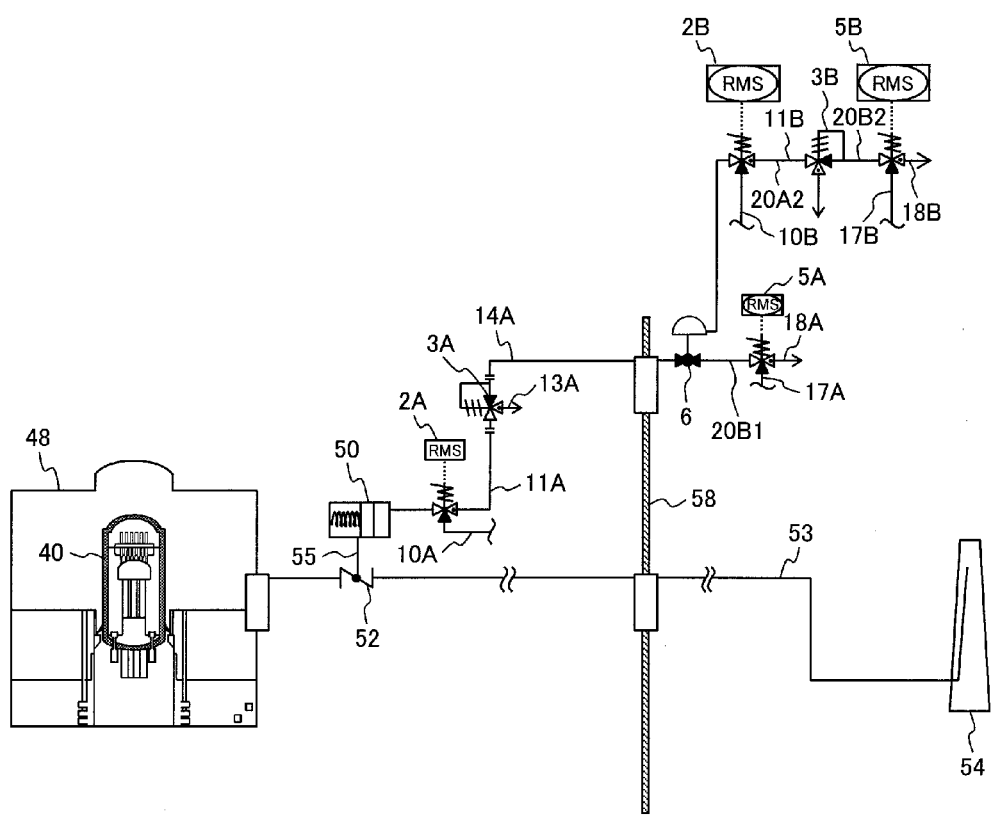
FIG. 41 is a diagram to show an air or nitrogen supply apparatus of a nuclear plant that is an embodiment 8 of the present invention.

In FIG. 41 is shown an air or nitrogen supply apparatus of a nuclear plant of an embodiment 8 of the present invention.

As shown in the drawing, the air or nitrogen supply apparatus of the nuclear plant of the present embodiment is provided with and roughly constructed of: a first electromagnetic valve 2A; and a first air or gas supply source and a second air or gas supply source (although not shown particularly in the drawing, the same bomb 4A as in the embodiment 5 or a unit for evaporating liquefied nitrogen to supply a nitrogen gas) placed outside the reactor container 48. The first electromagnetic valve 2A is connected to an air or nitrogen operated valve 50, which is placed in an emergency gas control system (an emergency gas control unit or a filter vent unit) 53 for discharging gas sent from a reactor container 48 having a reactor pressure vessel 40 contained therein from a gas discharge tower 54 and which supplies a driving force to a driving part (cylinder or the like) for driving an opening/closing valve 52, and is opened or closed so as to supply or stop a flow of air or nitrogen to the driving part (cylinder or the like) of the air or nitrogen operated valve 50. The first air or gas supply source and the second air or gas supply source independently supply air or nitrogen via a piping to a gas supply port and a gas discharge port of the first electromagnetic valve 2A.

In the present embodiment, a gas discharge line 11A of the first electromagnetic valve 2A has a first switching valve 3A placed therein. The first switching valve 3A switches a gas supply to the first electromagnetic valve 2A. When a power source is lost, in order to supply the first electromagnetic valve 2A with air or nitrogen, the first switching valve 3A is switched to the air or nitrogen supply source (bomb 4A) placed outside the nuclear reactor building 58 via a gas supply line 17A of the third electromagnetic valve 5A, the isolation valve 6, and a gas discharge line 11A of the first electromagnetic valve 2A.

Further, the isolation valve 6 described above is provided with a second electromagnetic valve 2B. When the first electromagnetic valve 2A cannot be operated, the second electromagnetic valve 2B is operated by a second power source different from a power source in the normal operation to thereby open the isolation valve 6, whereby the first switching valve 3A is supplied with air or nitrogen from a second air or nitrogen supply source (bomb 4A). Still further, the second air or nitrogen supply source (bomb 4A) has the flow of air or nitrogen opened or closed by a third electromagnetic valve 5A placed in an extension of a piping 20B1 having the isolation valve 6 placed therein, and an extension of a piping 20A2, 20B2 having the second electromagnetic valve 2B placed therein has a second switching valve 3B and a fourth electromagnetic valve 5B placed therein, the fourth electromagnetic valve 5B opening or closing the flow of air or nitrogen from a third air or nitrogen supply source (bomb 4B). When a second power source is lost, the fourth electromagnetic valve 5B is opened to thereby supply the air or nitrogen from the third air or nitrogen supply source (bomb 4B) and hence the second switching valve 3B is switched from a gas discharge to a gas supply to thereby operate the second electromagnetic valve 2B, whereby the isolation valve 6 is opened.

In other words, the isolation valve 6 is operated by the gas from the second air or nitrogen supply source (bomb 4A) by the use of the second power source, but when the second power source is lost, the second switching valve 3B is supplied with the air or nitrogen by the fourth electromagnetic valve 5B connected to a gas supply line 17B of the third air or nitrogen supply source (bomb 4B) and hence is switched to a gas discharge line 11B side of the third electromagnetic valve 2B, whereby the isolation valve 6 can be supplied with the air or nitrogen and hence can be opened or closed. When the isolation valve 6 is opened, the air or nitrogen for control can be supplied to the first switching valve 3A through the isolation valve 6 from the second air or nitrogen supply source (bomb 4A), which is placed outside the building 21 and in which the air or nitrogen is stored, via the third electromagnetic valve 5A (see FIG. 21 and FIG. 22).

In this way, the first switching valve 3A has a gas passage of P⇔A formed therein (see FIG. 20 and FIG. 22), and a passage of the air or nitrogen for control from the bomb 4A to the air or nitrogen operated valve 50 through the third electromagnetic valve 5A, the isolation valve 6, the first switching valve 3A, the first electromagnetic valve 2A can be secured and hence the opening/closing valve 52 is operated.

The air or nitrogen supply sources (bombs 4A, 4B) described above, similarly to the embodiment 5, are connected to the isolation valve 6, respectively, via the third electromagnetic valve 5A and the fourth electromagnetic valve 5B which are placed respectively in the piping 20B1 and the piping 20A2 outside the nuclear reactor building 58, and the third electromagnetic valve 5A and the fourth electromagnetic valve 5B are constructed of a single valve or a plurality of valves among three valves which are operated respectively by an alternating current power source or a direct current power source, a direct current power source (for example, a battery), or a manual force, and their operations are same as in the embodiment 5.

Further, as described above, the isolation valve 6 for preventing a leak to the gas supply side of the first switching valve 3A is placed in the middle of the piping 20B1 on the bomb 4A side of the first switching valve 3A and outside the reactor container 48. The isolation valve is constructed in such a way as to prevent the leak to the gas supply side of the first switching valve 3A.

In the present embodiment, usually, at the time of a severe accident such as a station blackout, the first electromagnetic valve 2A for supplying the air or nitrogen operated valve 50 with compressed air or compressed nitrogen cannot be operated either and hence is on standby with the gas discharge side opened.

In the present embodiment, the gas discharge line 11A side of the first electromagnetic valve 2A has the first switching valve 3A connected thereto, and the first switching valve 3A is supplied with the air or nitrogen for operation via the isolation valve 6 from the second air or nitrogen supply source such as the bomb 4A placed outside the nuclear building 58. Then, the first switching valve 3A connected to a gas discharge side at the time of the normal operation is switched to a gas supply side to thereby supply the first electromagnetic valve 2A with the air or nitrogen for operation from the bomb 4A. In this way, even when the power source is lost, the air or nitrogen operated valve 50 is supplied with the air or nitrogen for operation to control the flow of the air or nitrogen for operation to the air or nitrogen operated valve 50, whereby the opening/closing valve 52 can be opened or closed.

However, in a case in which also the second power source is lost, the fourth electromagnetic valve 5B is opened to supply gas, whereby the second switching valve 3B is switched from the gas discharge side to the gas supply side and hence air can be supplied to the air cylinder of the isolation valve 6 via the second electromagnetic valve 2B.

In this way, the isolation valve 6 can be opened, so that the air or nitrogen for control can be supplied to the first switching valve 3A through the isolation valve 6 via the third electromagnetic valve 5A from the bomb 4A of the second air or nitrogen supply source which is placed outside the building 21 and in which the air or nitrogen is stored. Then, the first switching valve 3A connected to the gas discharge side at the time of the normal operation is switched to the gas supply side to supply the air or nitrogen for operation to the first electromagnetic valve 2A. Hence, even when the first power source and the second power source are lost, the air or nitrogen operated valve 50 for operating the opening/closing valve 52 is supplied with the air or nitrogen and can be operated. Hence, gas in the reactor container 48 is passed through the emergency gas control system (emergency gas control unit or filter vent unit) 53 and is discharged from the gas discharge tower 54, whereby the pressure in the reactor container 48 can be reduced.

[Embodiment 9]

Figure 42:
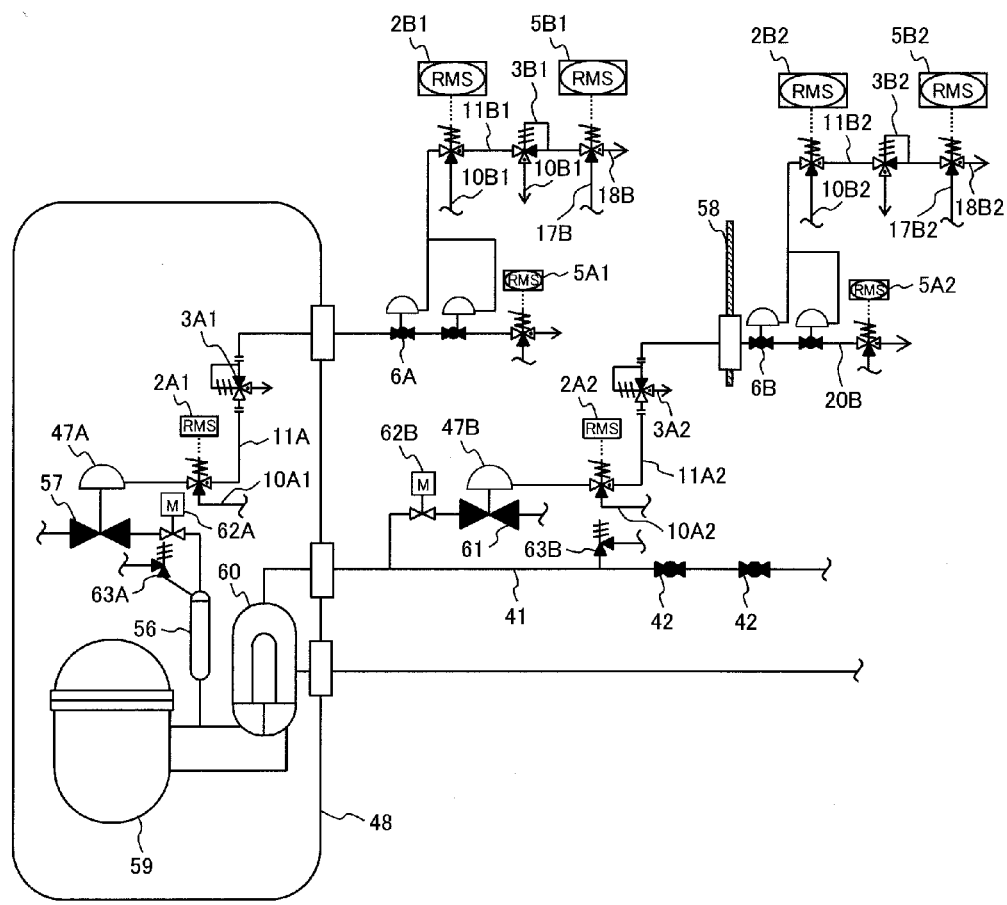
FIG. 42 is a diagram to show a case in which a gas supply apparatus that is an embodiment 9 of the present invention is applied to a pressurizer relief valve and a main steam relief valve in the pressured water reactor.

In FIG. 42 is shown a case in which a gas supply apparatus of an embodiment 9 of the present invention is applied to a pressurizer relief valve 57 and a main steam relief valve 61 in a pressurized water reactor.

As shown in the drawing, a pressurized water reactor feeds hot water generated in a reactor pressure vessel 59 placed in a reactor container 48 to a steam generator 60 and rotates a turbine (not shown in the drawing) placed outside a nuclear reactor building 58 by the use of steam generated by the steam generator 60 to thereby generate electricity. At that time, in order to pressurize the hot water generated by the reactor pressure vessel 59 to hold the hot water in a liquid state, a pressurizer 56 for holding the pressure and water level of the reactor pressure vessel 59 is placed between the reactor pressure vessel 59 and the steam generator 60. Further, a main steam piping 41 for feeding the steam to the turbine has a main steam relief valve 61 placed in the middle thereof via a master valve 62B, and the main steam relief valve 61 is provided with a forcible operating cylinder 47B. Here, the main steam piping 41 has a safety valve 63B placed before a main steam isolation valve 42 thereof.

On the other hand, the pressurized water reactor 59 is provided with the pressurizer 56 and a pressurizer relief valve 57 for forcibly reducing the pressure of the pressurizer 56 as required via a master valve 62A, whereas the pressurizer relief valve 57 is provided with a forcible operating cylinder 47A. Further, the pressurizer 56 is provided with a safety valve 63A.

At the time of an SBO (station blackout), the pressurizer relief valve 57 and the main steam relief valve 61 cannot be operated either. Hence, the pressurized water reactor 59 and the steam generator 60 are provided with first and second switching valves 3A and 3B, a second electromagnetic valves 2B, third and fourth electromagnetic valves 5A and 5B, respectively. In this way, the pressurized water reactor 59 and the steam generator 60 can have their pressures safely reduced.

In other words, the gas supply apparatus applied to the pressurized water reactor shown in FIG. 42 is provided with and constructed of: the pressurizer relief valve 57 and the main steam relief valve 61; the forcible operating cylinder 47A and the forcible operating cylinder 47B; first electromagnetic valves 2A1 and 2A2; first and second air or nitrogen supply sources (although not shown particularly in the drawing, the same bomb 4A as in the embodiment 1 or a unit for vaporizing liquefied nitrogen to produce a nitrogen gas); the first and second switching valves 3A1 and 3A2; and isolation valves 6A and 6B. The pressurizer relief valve 57 is placed in the pressurizer 56, which is connected to the reactor pressure vessel 59 by a piping and which holds the pressure and water level of the reactor pressure vessel 59, and forcibly reduces the pressure of the pressurizer 56 as required. The main steam relief valve 61 relieves steam in the steam generator 60 which is connected to the reactor pressure vessel 59 by a piping and which supplies cooling water to the reactor pressure vessel 59. The forcible operating cylinder 47A supplies air or nitrogen stored therein to the pressurizer relief valve 57 so as to open the pressurizer relief valve 57. The forcible operating cylinder 47B supplies air or nitrogen stored therein to the main steam relief valve 61 so as to open the main steam relief valve 61. The first electromagnetic valve 2A1 is placed in the middle of a piping and opens or closes a flow of air or nitrogen which is supplied to the forcible operating cylinder 47A and which is to be supplied to the pressurizer relief valve 57, whereas the first electromagnetic valve 2A2 is placed in the middle of a piping and opens or closes a flow of air or nitrogen which is supplied to the forcible operating cylinder 47B and which is to be supplied to the main steam relief valve 61. The first and second air or nitrogen supply sources supply air or nitrogen to the first electromagnetic valves 2A1 and 2A2, respectively. The first switching valve 3A1 is placed in a gas discharge line 11A1 of the first electromagnetic valve 2A1 and switches between a gas discharge from the first electromagnetic valve 2A1 and a gas supply to the first electromagnetic valve 2A1, and when the power source is lost, the first switching valve 3A1 is switched to connection to the second air or nitrogen supply source so as to supply the first electromagnetic valve 2A1 with the air or nitrogen, whereas the first switching valve 3A2 is placed in a gas discharge line 11A2 of the first electromagnetic valve 2A2 and switches between a gas discharge from the first electromagnetic valve 2A2 and a gas supply to the first electromagnetic valve 2A2, and when the power source is lost, the first switching valve 3A2 is switched to connection to the second air or nitrogen supply source so as to supply the first electromagnetic valve 2A2 with the air or nitrogen. The isolation valve 6A is placed in the middle of a piping on a second air or nitrogen supply source side of the first switching valve 3A1 and prevents a leak to a gas supply side of the first switching valve 3A1, whereas the isolation valve 6B is placed in the middle of a piping on a second air or nitrogen supply source side of the first switching valve 3A2 and prevents a leak to a gas supply side of the first switching valve 3A2.

Further, the isolation valve 6A is provided with the second electromagnetic valve 2B1. When the first electromagnetic valve 2A1 cannot be operated because of the loss of the power source, the second electromagnetic valve 2B1 is operated by the second power source different from the power source at the time of the normal operation to thereby open the isolation valve 6A, whereby the first switching valve 3A1 is supplied with the air or nitrogen from the second air or nitrogen supply source (bomb 4A). On the other hand, the isolation valve 6B is provided with the second electromagnetic valve 2B2. When the first electromagnetic valve 2A2 cannot be operated because of the loss of the power source, the second electromagnetic valve 2B2 is operated by the second power source different from the power source at the time of the normal operation to thereby open the isolation valve 6B, whereby the first switching valve 3A2 is supplied with the air or nitrogen from the second air or nitrogen supply source (bomb 4A)

Further, the second air or nitrogen supply sources (bomb 4A) have the flow of the air or nitrogen thereof opened or closed respectively by the third electromagnetic valves 5A1 and 5A2 respectively placed in the extensions of the pipings having the isolation valves 6A and 6B respectively placed therein. An extension of the piping having the second electromagnetic valve 2B1 placed therein is provided with the second switching valve 3B1 and the fourth electromagnetic valve 5B1 which opens and closes the flow of gas from a third air or nitrogen supply source (bomb 4B), whereas an extension of the piping having the second electromagnetic valve 2B2 placed therein is provided with the second switching valve 3B2 and the fourth electromagnetic valve 5B2 which opens and closes the flow of gas from the third air or nitrogen supply source (bomb 4B). When the second power source is lost, the fourth electromagnetic valve 5B1 is opened to thereby supply air or nitrogen from the third air or nitrogen supply source (bomb 4B), whereby the second switching valve 3B1 is switched from the gas charge to the gas supply, which operates the second electromagnetic valve 2B1 to thereby open the isolation valve 6A, whereas when the second power source is lost, the fourth electromagnetic valve 5B2 is opened to thereby supply air or nitrogen from the third air or nitrogen supply source (bomb 4B), whereby the second switching valve 3B2 is switched from the gas charge to the gas supply, which operates the second electromagnetic valve 2B2 to thereby open the isolation valve 6B.

In short, in the present embodiment, the gas discharge line 11A2 of the first electromagnetic valve 2A2 has the first switching valve 3A2 placed therein, the first switching valve 3A2 switching between the gas discharge from the first electromagnetic valve 2A2 and the gas supply to the first electromagnetic valve 2A2. When the power source is lost, the first switching valve 3A2 is switched to connection to the bomb 4A of the second air or nitrogen supply source via the third electromagnetic valve 5A2 so as to supply the first electromagnetic valve 2A2 with the air or nitrogen.

Further, the isolation valve 6B described above is operated by the air or nitrogen from the second air or nitrogen supply source (bomb 4A) by the use of the second power source at the time of the normal operation. However, when the second power source is lost, the second switching valve 3B2 is supplied with the air or nitrogen from the fourth electromagnetic valve 5B2 connected to a gas supply line 17B2 of the third air or nitrogen supply source (bomb 4B) and is hence switched to the gas discharge line 11B2 side of the second electromagnetic valve 2B2 to thereby supply the isolation valve 6B with the gas, whereby the isolation valve 6B can be opened or closed.

In this way, the isolation valve 6B can be opened and hence the air of nitrogen for control can be supplied to the first switching valve 3A2 through the isolation valve 6B via the third electromagnetic valve 5A2 from the bomb 4A of the second air or nitrogen gas supply source which is placed outside the nuclear reactor building 58 and in which air or nitrogen is stored. The first switching valve 3A2 connected to the gas discharge side at the time of the normal operation is switched to the gas supply side to thereby supply the air or nitrogen for operation to the first electromagnetic valve 2A2. In this way, even when the first power source and the second power source are lost, the forcible operating cylinder 47B for operating the main steam relief valve 61 can be supplied with the air or nitrogen and hence can be operated.

Further, the pressurizer relief valve 57, which is placed in the middle of a piping between the reactor pressure vessel 59 and the pressurizer 56 for holding the pressure and water level of the reactor pressure vessel 59 and which forcibly reduces the pressure of the pressurizer 56 as required, is provided with the forcible operating cylinder 47A, which supplies the air or nitrogen stored therein to the pressurizer relief valve 57 so as to open the pressurizer relief valve 57, and the first electromagnetic valve 2A1, which is placed in the middle of a piping and which opens or closes the flow of the air or nitrogen to the forcible operating cylinder 47A. The first electromagnetic valve 2A1 is supplied with the air or nitrogen from the second air or nitrogen supply source such as the bomb 4.

In the present embodiment, the gas discharge line 11A1 of the first electromagnetic valve 2A1 is provided with the first switching valve 3A1 for switching between the gas discharge from the first electromagnetic valve 2A1 and the gas supply to the first electromagnetic valve 2A1. When the power source is lost, in order to supply the first electromagnetic valve 2A1 with the air or nitrogen, the first switching valve 3A1 is switched to connection to the bomb 4 of the second air or nitrogen supply source via the isolation valve 6A.

Further, the isolation valve 6A described above is operated by the air or nitrogen supplied from the second air or nitrogen supply source (bomb 4A) by the use of the second power source at the time of the normal operation. However, when the second power is lost, the second switching valve 3B1 is supplied with the air or nitrogen from the fourth electromagnetic valve 5B1 connected to the gas supply line 17B1 of the third air or nitrogen supply source (bomb 4B). Then, the second switching valve 3B1 is switched to the gas discharge line 11B1 side of the second electromagnetic valve 2B1, thereby being able to supply the air or nitrogen to the isolation valve 6A. Hence, the isolation valve 6A can be opened and closed.

In this way, the isolation valve 6A can be opened, so the air or nitrogen for control can be supplied to the first switching valve 3A1 through the isolation valve 6A via the third electromagnetic valve 5A1 from the bomb 4A of the second air or nitrogen supply source which is placed outside the nuclear reactor building 58 and in which air or nitrogen is stored. In this way, the first switching valve 3A1 connected to the gas discharge side at the time of the normal operation is switched to the gas supply side to thereby supply the air or nitrogen for operation to the first electromagnetic valve 2A1, so even when the first power source and the second power source are lost, the forcible operating cylinder 47A for operating the pressure relief valve 57 can be supplied with the air or nitrogen and hence can be operated.

According to this construction of the present embodiment, even if the pressurizer relief valve 57 and the main steam relief valve 61 cannot be operated at the time of the SBO, by switching the first switching valves 3A1 and 3A2 and the second switching valves 3B1 and 3B2, the air or nitrogen can be supplied from the air or nitrogen supply sources such as the bombs 4A and 4B. Hence, it is possible to produce the same effect as the embodiments described above.

In this regard, in the embodiment described above, the air or nitrogen operated valve has been described but the present invention can be applied also to the safety valve and the relief valve, and the safety relief valve. Further, the present invention can be applied to a chemical plant, a petroleum plant, and an electrical power plant in addition to the nuclear plant. Still further, in addition to the air or nitrogen, carbon dioxide can be thought as the gas to be supplied.

[Embodiment 10]

Figure 43:
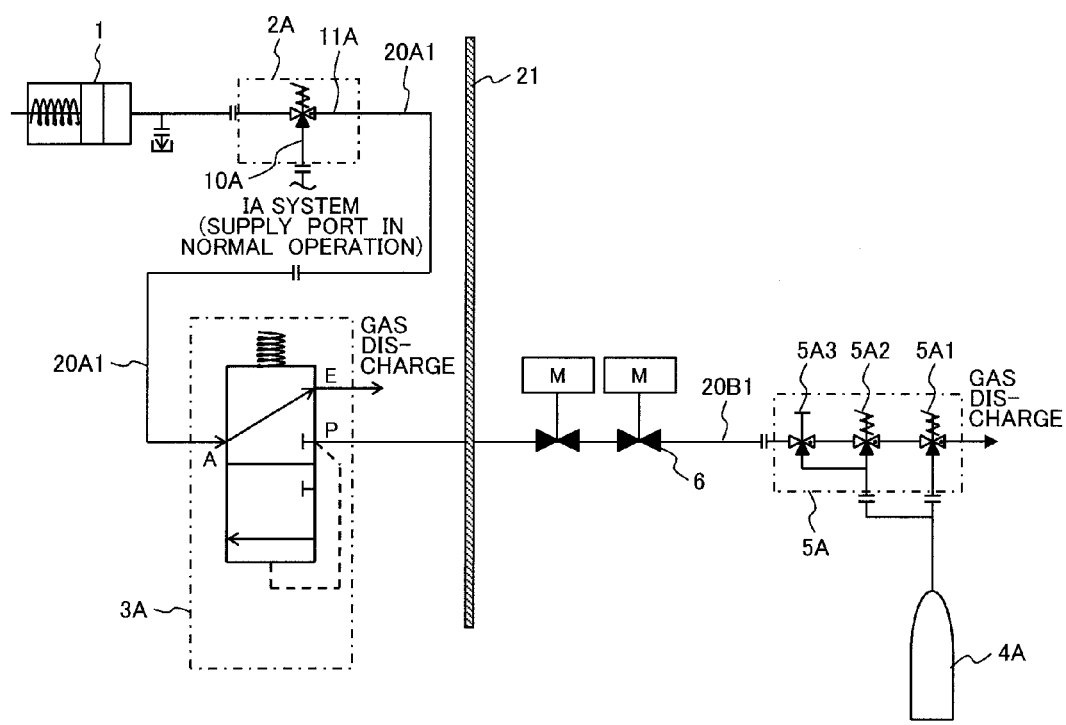
FIG. 43 is a diagram to show a gas supply apparatus that is an embodiment 10 of the present invention and that is provided with an electrically operated valve as an isolation valve.

In FIG. 43 is shown an embodiment 10 of a gas supply apparatus of the present invention. The present embodiment shown in the drawing has a first switching valve 3A connected to a gas discharge side of a first electromagnetic valve 2A and has an electrically operated valve as an isolation valve 6.

In this way, in a case in which the first electromagnetic valve 2A cannot be operated because of the loss of power source or the like, by opening the isolation valve 6 constructed of the electrically operated valve, the first switching valve 3A can be supplied with gas from a bomb 4A of a third gas supply source.

In this regard, the present embodiment is not provided with a third gas supply source (bomb 4B), which is a backup when the second power source is lost, and a fourth electromagnetic valve 5B.

[Embodiment 11]

Figure 44:
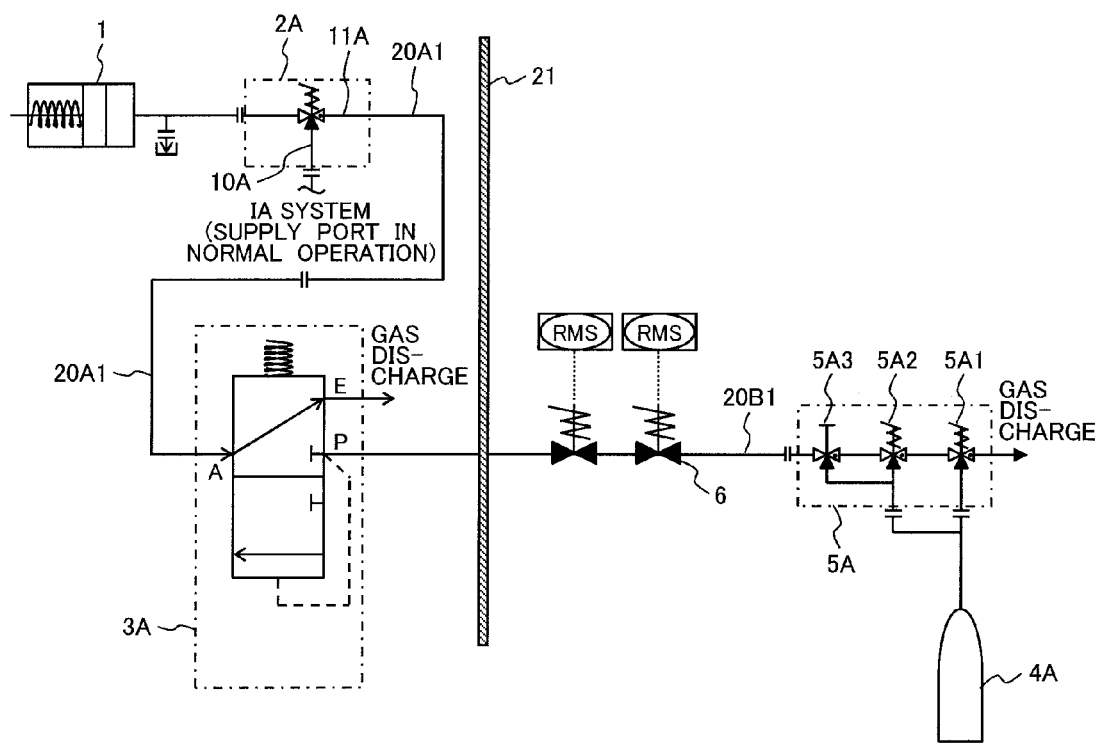
FIG. 44 is a diagram to show a gas supply apparatus that is an embodiment 11 of the present invention and that is provided with an electromagnetic valve as an isolation valve.

In FIG. 44 is shown an embodiment 11 of a gas supply apparatus of the present invention. The present embodiment shown in the drawing has a first switching valve 3A connected to a gas discharge side of a first electromagnetic valve 2A and has an electromagnetic valve as an isolation valve 6.

In this way, in a case in which the first electromagnetic valve 2A cannot be operated because of the loss of power source or the like, by opening the isolating valve 6 constructed of the electromagnetic valve, the first switching valve 3A can be supplied with gas from a bomb 4A of a third gas supply source.

In this regard, the present embodiment is not provided with a third gas supply source (bomb 4B), which is a backup when the second power source is lost, and a fourth electromagnetic valve 5B.

[Embodiment 12]

Figure 45:
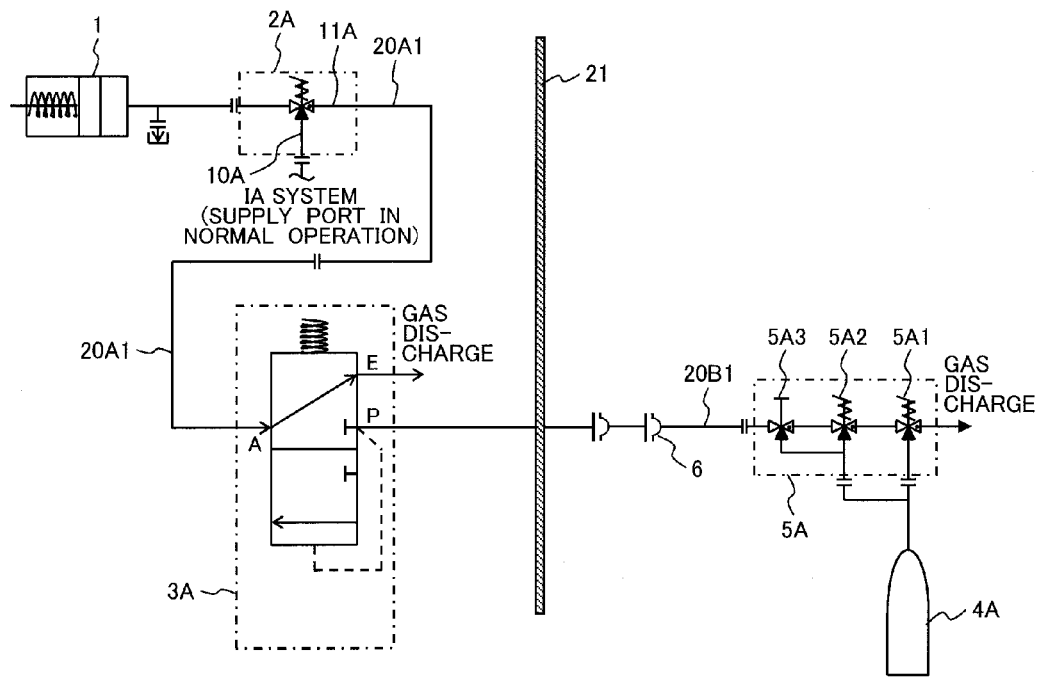
FIG. 45 is a diagram to show a gas supply apparatus that is an embodiment 12 of the present invention and that is provided with a rupture disk as an isolation valve.

In FIG. 45 is shown an embodiment 12 of a gas supply apparatus of the present invention. The present embodiment shown in the drawing has a first switching valve 3A connected to a gas discharge side of a first electromagnetic valve 2A and has a rupture disk as an isolation valve 6.

In this way, in a case in which the first electromagnetic valve 2A cannot be operated because of the loss of power source or the like, by rupturing the isolating valve 6 constructed of the rupture disk, the first switching valve 3A can be supplied with gas from a bomb 4A of a third gas supply source.

In this regard, the present embodiment is not provided with a third gas supply source (bomb 4B), which is a backup when the second power source is lost, and a fourth electromagnetic valve 5B.

[Embodiment 13]

In FIG. 46 to FIG. 52 is shown an embodiment 13 of a gas supply apparatus of the present invention. The present embodiment shown in the drawing has an isolation valve A (6C) placed in the middle of a gas supply line 10A of a first electromagnetic valve 2A and has an isolation valve B (6D) placed in a piping on a second gas supply source (bomb 4A) side of the first switching valve 3A, respectively. The isolation valves A (6C) and B (6D) are different from the isolation valve 6 in the embodiments described above and are supplied with gas from a first gas supply source (IA system: instrument air supply system) and a second gas supply source (bomb 4A) via the same gas supply piping 20C.

The isolation valve A (6C) placed in the middle of the gas supply line 10A of the first electromagnetic valve 2A is held in an opened state during a standby period at the time of the normal operation, so gas can be supplied from a first gas supply source. When the gas is supplied at the time of the normal operation, the first electromagnetic valve 2A is supplied with the gas from the first gas supply source via the isolation valve A (6C). When the gas is discharged at the time of the normal operation, the supply of the gas to the first electromagnetic valve 2A from the first gas supply source is stopped and the gas supplied to an air-operated valve actuator 1 is discharged from a gas discharge line 13A of a first switching valve 3A via the first electromagnetic valve 2A and a first switching valve 3A. When the power is lost and the gas is supplied, the isolation valve B (6D) placed in the middle of a piping on the bomb 4A side of the first switching valve 3A is held in an open state and the gas from the first gas supply source or a second gas supply source (bomb 4A) is sent to the first electromagnetic valve 2A via the first switching valve 3A. Here, a reference numeral 64 designates a bomb master valve and a reference numeral 65 designates a gas discharge stop valve.

Hereinafter, the present embodiment will be described by the use of the drawings.

Figure 46:
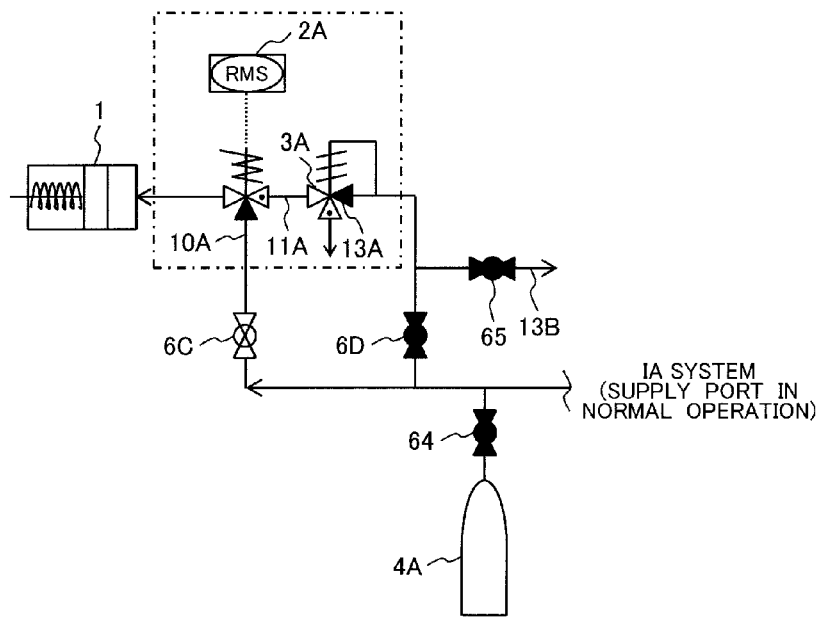
FIG. 46 is a diagram to show a standby state at the time of the normal operation of a gas supply apparatus that is an embodiment 13 of the present invention.

FIG. 46 shows a standby state at the time of the normal operation of the present embodiment. In the standby state at the time of the normal operation, the isolation valve A (6C) is held in an open state and hence passes the gas supplied from the IA system of an normal gas supply source (first gas supply source). At that time, all of the gas supply line 10A of the first electromagnetic valve 2A, the isolation valve B (6D), and the bomb master valve 64 are closed.

Figure 47:
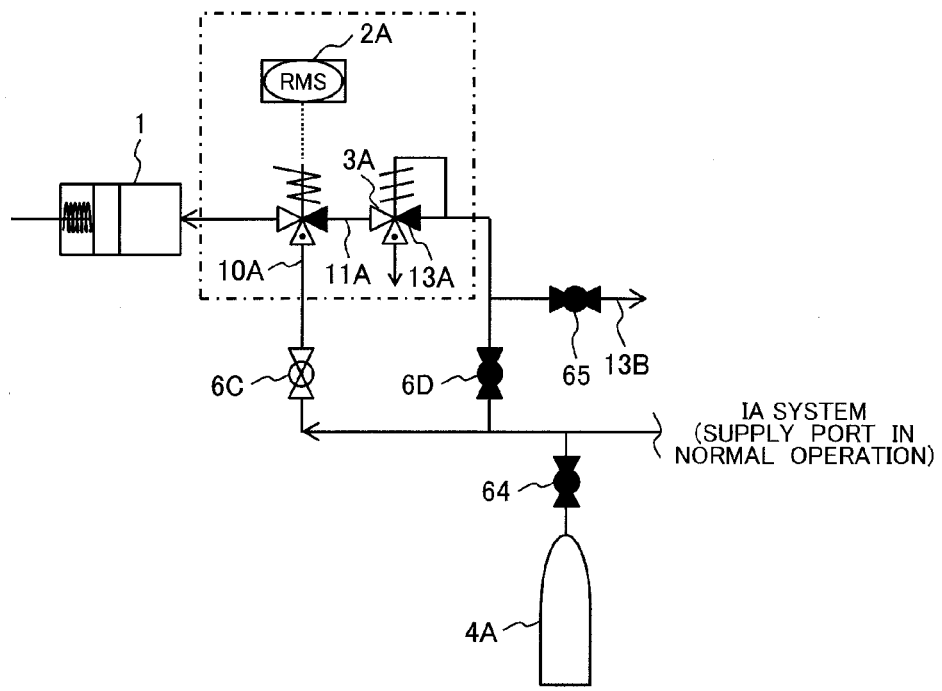
FIG. 47 is a diagram to show a gas supply state at the time of the normal operation of the gas supply apparatus that is the embodiment 13 of the present invention.

FIG. 47 shows a gas supply state at the time of the normal operation of the present embodiment. In the gas supply state at the time of the normal operation, the gas supplied from the IA system of the normal gas supply source (first gas supply source) is sent to the first electromagnetic valve 2A, which is opened, via the isolation valve A (6C), whereby the air-operated valve actuator 1 for opening/closing a valve main body (not shown in the drawing) is supplied with the gas. Hence, a gas discharge state at the time of the normal operation is caused and the valve main valve is operated (is opened in FIG. 47, but can also be operated reversely).

Figure 48:
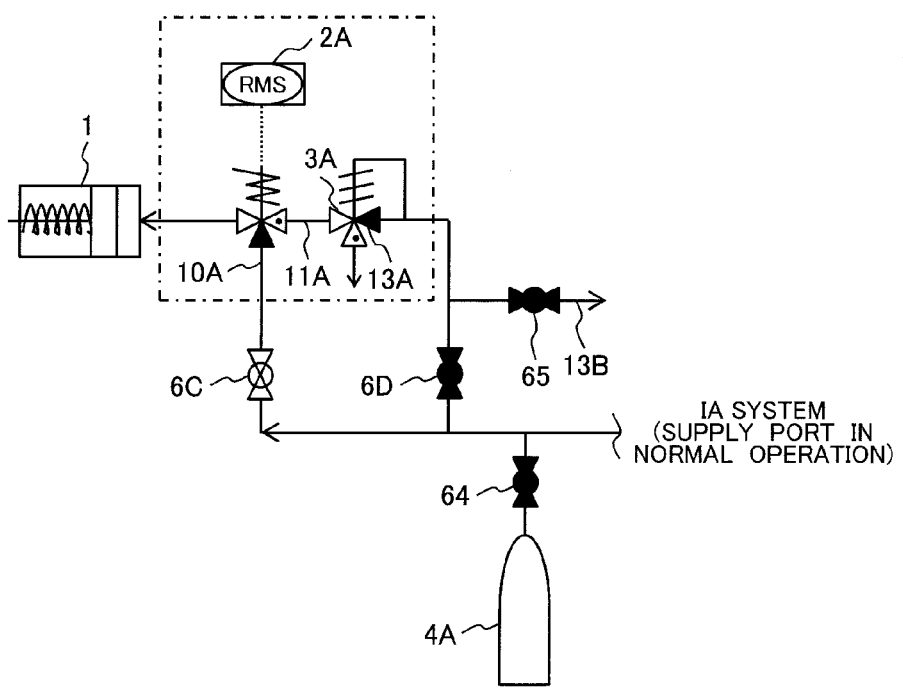
FIG. 48 is a diagram to show a gas discharge state at the time of the normal operation of the gas supply apparatus that is the embodiment 13 of the present invention.

FIG. 48 shows a gas discharge state at the time of the normal operation of the present embodiment. In the gas discharge state at the time of the normal operation, the gas supplied from the IA system of the normal gas supply source (first gas supply source) is sent to the first electromagnetic valve 2A, which is closed, whereby the gas supplied to the air-operated valve actuator 1 is discharged from a gas discharge line 13A via the first electromagnetic valve 2A and the first switching valve 3A. Hence, the air-operated valve actuator 1 for opening or closing the valve main body (not shown in the drawing) is operated and the valve main valve is operated (is closed in FIG. 48, but can also be operated reversely).

Figure 49:
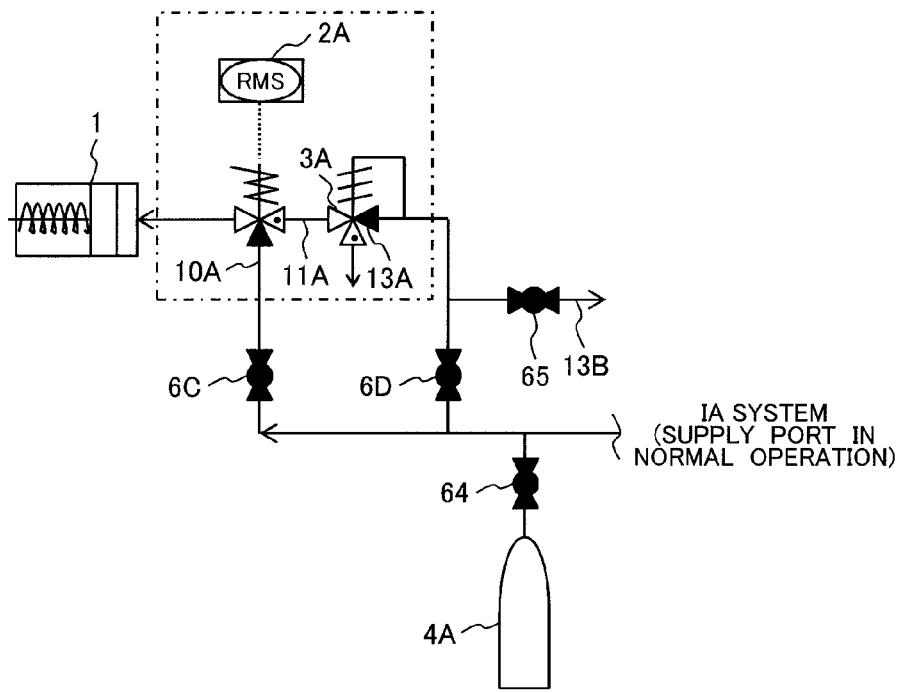
FIG. 49 is a diagram to show a standby state when a power source is lost in the gas supply apparatus that is the embodiment 13 of the present invention.

FIG. 49 shows a standby state when the power source is lost in the present embodiment. In the standby state when the power source is lost, the isolation valve A (6C) is brought into a closed state because of the loss of the power source and is on standby. At that time, all of the gas supply line 10A of the first electromagnetic valve 2A, the isolation valve B (6D), and the bomb master valve 64 are closed.

Figure 50:
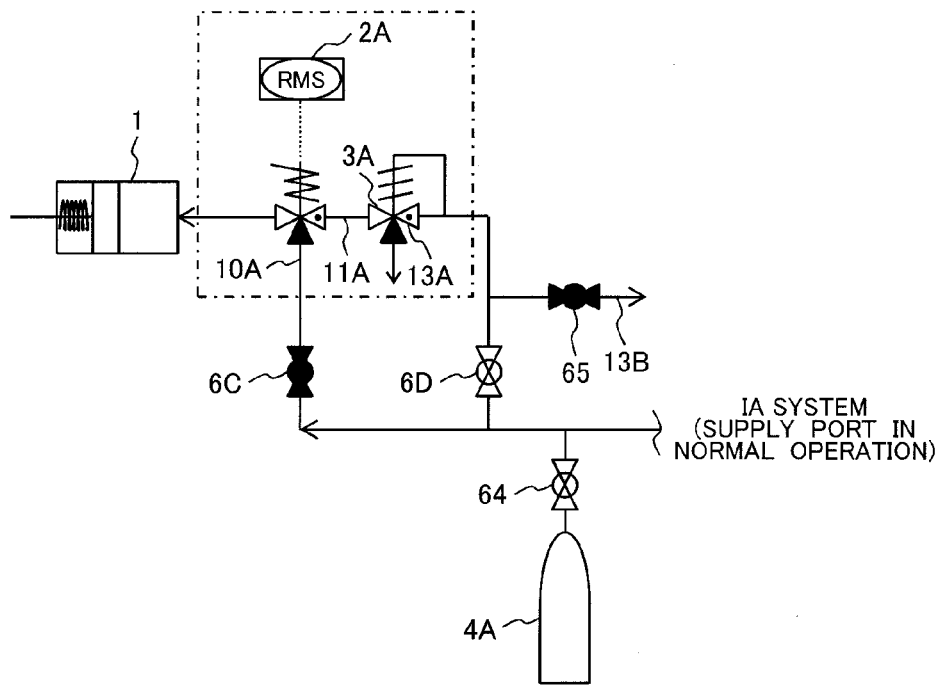
FIG. 50 is a diagram to show a gas supply state when a power source is lost in the gas supply apparatus that is the embodiment 13 of the present invention.

FIG. 50 shows a gas supply state when the power source is lost in the present embodiment. In the gas supply state when the power source is lost, via the isolation valve A (6C), the gas of the IA system of the normal gas supply source (first gas supply source) or the bomb 4 of the second gas supply source is sent to the first electromagnetic valve 2A via the isolation valve B (6D), which is opened, and via the first switching valve 3A, whereby the air-operated valve actuator 1 for opening/closing the valve main body (not shown in the drawing) is operated and hence the valve main valve is operated (is opened in FIG. 50, but can also be operated reversely).

Figure 51:
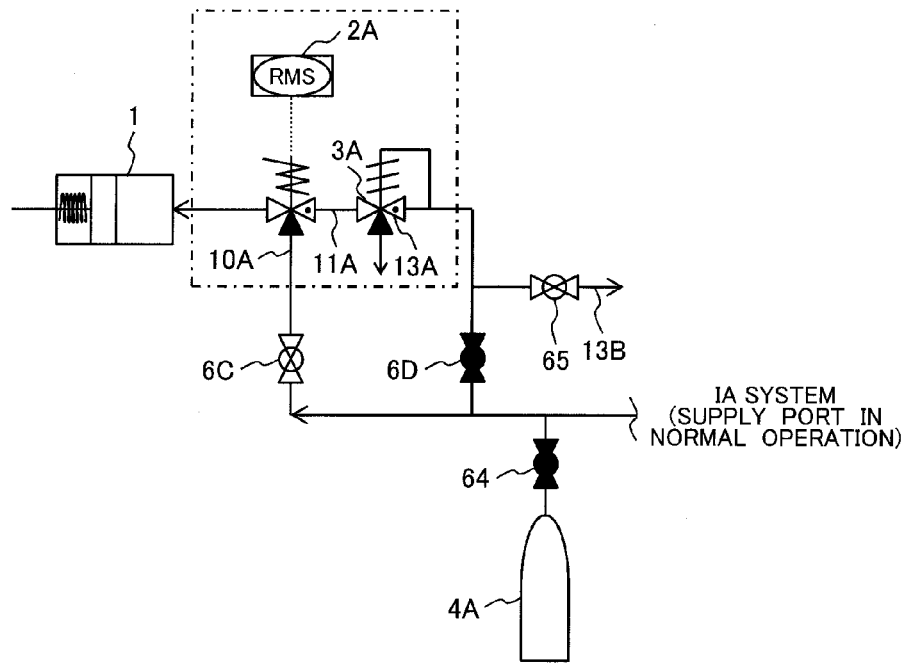
FIG. 51 is a diagram to show a gas discharge state when a power source is lost in the gas supply apparatus that is the embodiment 13 of the present invention and to show a state in which an isolation valve A is opened and in which a master valve of a bomb is closed.
Figure 52:
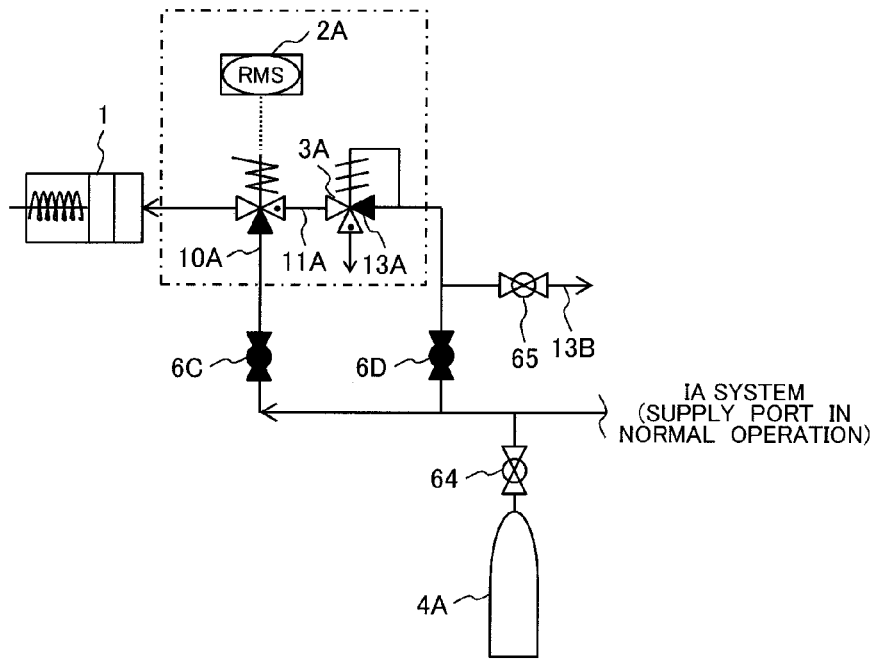
FIG. 52 is a diagram to show a gas discharge state when a power source is lost in the gas supply apparatus that is the embodiment 13 of the present invention and to show a state in which an isolation valve A is opened and in which a master valve of a bomb is opened.

FIG. 51 and FIG. 52 show a gas discharge state when the power source is lost in the present embodiment. In the gas discharge state when the power source is lost, by opening the gas discharge stop valve 65, the gas of the IA system of the normal gas supply source (first gas supply source) is supplied to the air-operated valve actuator 1 and the supplied gas is discharged from a gas discharge line 13B via the first electromagnetic valve 2A and the first switching valve 3A. Hence, the air-operated valve actuator 1 for opening or closing the valve main body (not shown in the drawing) is operated and the valve main valve is operated (is closed in FIG. 51 and FIG. 52, but can also be operated reversely).

Figure 53:
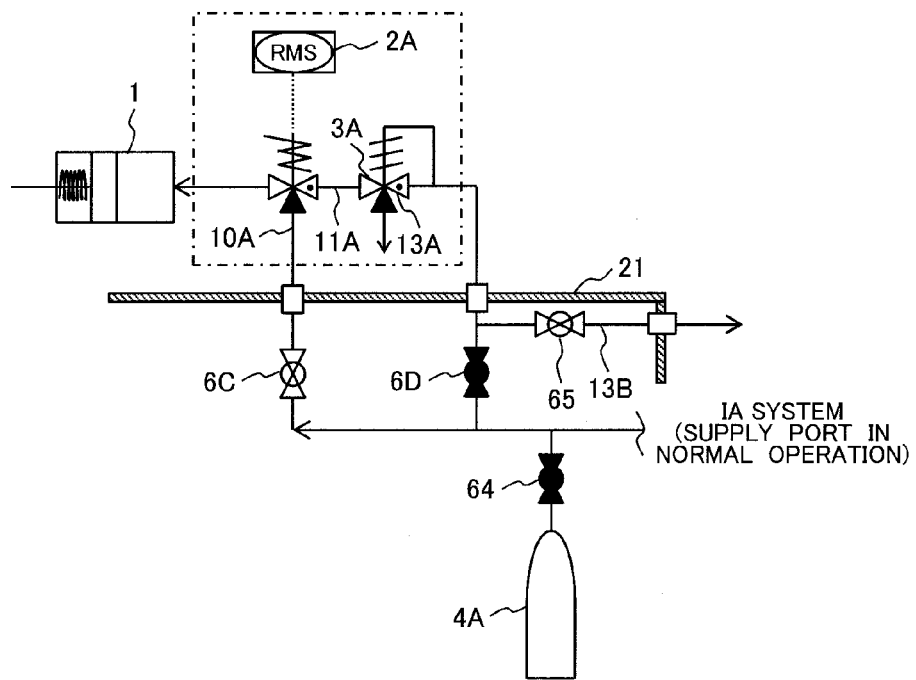
FIG. 53 is a diagram to show a modified example of the gas supply apparatus that is the embodiment 13 of the present invention.
Figure 54:
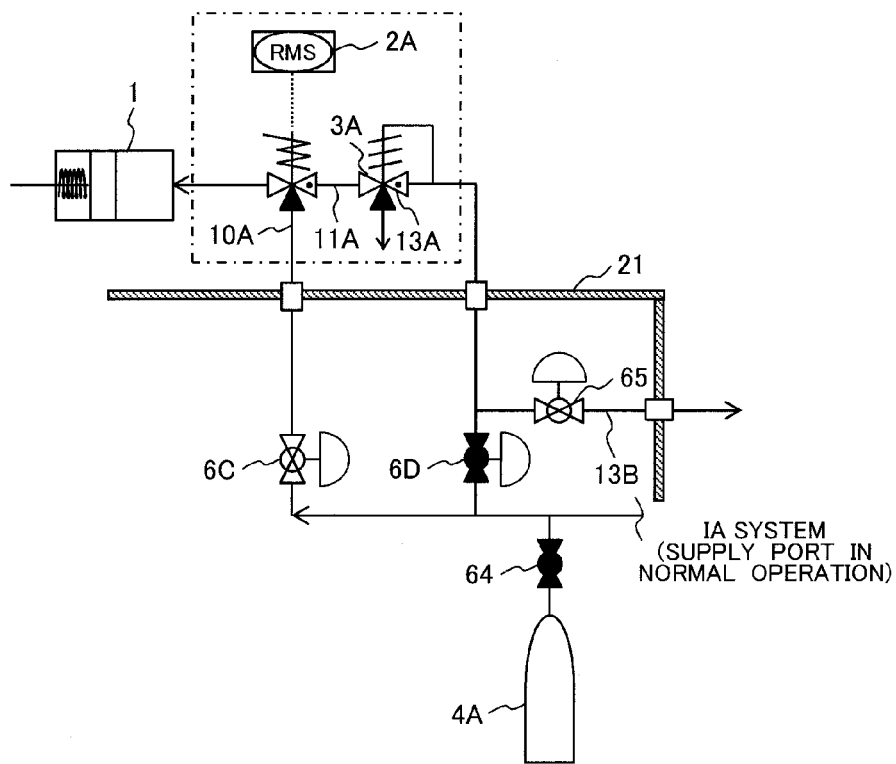
FIG. 54 is a diagram to show an example in which isolation valves A, B and a gas discharge stop valve are air-operated valves in the modified example of the gas supply apparatus that is the embodiment 13 of the present invention.

FIG. 53 and FIG. 54 show modified examples of the gas supply apparatus of the embodiment 13 described above. In FIG. 53, the electromagnetic valve B (6D) is closed and the gas discharge stop valve 65 is opened, so the gas supplied to the air-operated valve actuator 1 placed inside the building 31 is returned (discharged) to the inside of the building 21 via the first electromagnetic valve 2A and the first switching valve 3A. In FIG. 54, each of the isolation valve A (6C), the isolation valve B (6D), and the gas discharge stop valve 65 in FIG. 53 is made of an air-operated valve.

This construction of the present embodiment can also produce the same effect as the embodiment 5.

Here, the present invention is not limited to the embodiments described above but includes various modified examples. For example, the embodiments described above have been described in detail so as to describe the present invention clearly, and the present invention is not necessarily limited to a gas supply apparatus including all constructions described above. Further, it is possible to replace a part of the construction of a certain embodiment with the construction of the other embodiment. Still further, it is also possible to add the construction of the other embodiment to the construction of a certain embodiment. Still further, it is also possible to add, remove, or replace the construction of other construction to, from, or with a part of the construction of each embodiment.

What is claimed is:

1. A gas supply apparatus comprising:
   an operating valve actuator that is placed in a piping for letting at least gas in a plant flow and that operates a valve main body by the gas flowing in the piping;
   a first electromagnetic valve that is placed in the piping and that opens or closes a flow of the gas to the operating valve actuator; and
   a gas supply source that supplies the first electromagnetic valve with the gas,
      wherein a gas discharge line of the first electromagnetic valve has a switching valve and has a second electromagnetic valve placed between the switching valve and the gas supply source,
      wherein the switching valve switches between a gas discharge from the first electromagnetic valve and a gas supply to the first electromagnetic valve,
      wherein the switching valve is switched to connect the piping in which the first electromagnetic valve is placed to the gas supply source so as to supply the first electromagnetic valve with the gas when a power source is lost,
      wherein at the time of a normal operation, the second electromagnetic valve opens a gas discharge line side and closes a switching valve side, and
      wherein the second electromagnetic valve opens the switching valve side and closes the gas discharge line side when the power source is lost.

2. The gas supply apparatus according to claim 1, wherein the operating valve actuator is for operating any one of an air-perated valve, a safety valve, a relief valve, and a safety relief valve.

3. The gas supply apparatus according to claim 1,
wherein the gas supply source is connected to the piping via a third electromagnetic valve or a manual valve, the third electromagnetic valve being driven by a power source different in kind from the first electromagnetic valve.

4. The gas supply apparatus according to claim 3,
wherein the third electromagnetic valve has at least a direct current power source as a power source, and
wherein the third electromagnetic valve is driven by using the direct current power source as a driving source to thereby supply the first electromagnetic valve with the gas from the gas supply source when the power source is lost.

5. The gas supply apparatus according to claim 3,
wherein the third electromagnetic valve is constructed of a single switching valve or a plurality of switching valves among three switching valves which have power sources of an alternating current power source or a direct current power source, a direct current power source, and a manual force, respectively, and
wherein the electromagnetic valve having the direct current power source as a driving source is driven or a manual valve is operated to thereby supply the first electromagnetic valve with the gas from the gas supply source when the power source is lost.

6. The gas supply apparatus according to claim 4,
wherein the direct current power source is a battery.

7. The gas supply apparatus according to claim 1,
wherein a piping on a gas supply source side of the switching valve has an isolation valve placed in the piping, the isolation valve preventing a leak to a gas supply side of the switching valve.

8. The gas supply apparatus according to claim 1,
wherein the gas supply source is a bomb in which any one of air, nitrogen, and carbon dioxide is stored.

* * * * *